US012055439B2

(12) United States Patent
Takeuchi et al.

(10) Patent No.: US 12,055,439 B2
(45) Date of Patent: Aug. 6, 2024

(54) QUANTUM ABSORPTION SPECTROSCOPY SYSTEM AND QUANTUM ABSORPTION SPECTROSCOPY METHOD

(71) Applicant: Kyoto University, Kyoto (JP)

(72) Inventors: Shigeki Takeuchi, Kyoto (JP); Ryo Okamoto, Kyoto (JP); Yu Mukai, Kyoto (JP)

(73) Assignee: KYOTO UNIVERSITY, Kyoto (JP)

(*) Notice: Subject to any disclaimer, the term of this patent is extended or adjusted under 35 U.S.C. 154(b) by 105 days.

(21) Appl. No.: 17/757,100

(22) PCT Filed: Dec. 4, 2020

(86) PCT No.: PCT/JP2020/045244
§ 371 (c)(1),
(2) Date: Jun. 9, 2022

(87) PCT Pub. No.: WO2021/117632
PCT Pub. Date: Jun. 17, 2021

(65) Prior Publication Data

US 2023/0020945 A1 Jan. 19, 2023

(30) Foreign Application Priority Data

Dec. 13, 2019 (JP) ................................ 2019-225400
Jul. 30, 2020 (JP) ................................ 2020-129518

(51) Int. Cl.
*G01J 3/42* (2006.01)
*G01N 21/45* (2006.01)
*G02F 1/35* (2006.01)

(52) U.S. Cl.
CPC ................ *G01J 3/42* (2013.01); *G01N 21/45* (2013.01); *G02F 1/3526* (2013.01); *G01N 2201/06113* (2013.01)

(58) Field of Classification Search
CPC ..................................................... G02F 1/3526
See application file for complete search history.

(56) References Cited

U.S. PATENT DOCUMENTS

| | | | |
|---|---|---|---|
| 7,570,365 B2 * | 8/2009 | Trifonov ................ | G02F 1/395 356/480 |
| 10,648,908 B2 | 5/2020 | Krivitskiy et al. | |

(Continued)

FOREIGN PATENT DOCUMENTS

| | | |
|---|---|---|
| CN | 109656078 A | 4/2019 |
| JP | 2006-242771 A | 9/2006 |
| WO | WO 2021/048321 A1 | 3/2021 |

OTHER PUBLICATIONS

Ducci, S. et al.: "Semiconductor sources of twin photons for quantum information," J. Optics B: Quantum and Semiclassical Optics, vol. 7, No. 7, Jul. 1, 2005, pp. S158-S165.

(Continued)

*Primary Examiner* — Rhonda S Peace
(74) *Attorney, Agent, or Firm* — Knobbe, Martens, Olson & Bear, LLP

(57) ABSTRACT

A quantum absorption spectroscopy system (100) includes a laser light source (1), a quantum optical system (201), a photodetector (31), and a controller (4). The laser light source (1) emits pump light. The quantum optical system (201) includes a nonlinear optical crystal (23) that generates a quantum entangled photon pair of a signal photon and an idler photon by irradiation with pump light, and a moving mirror (25) that changes a phase of the idler photon, and causes quantum interference between a plurality of physical processes in which the quantum entangled photon pair is generated. The photodetector (31) detects the signal photon when the phase of the idler photon is changed by the nonlinear optical crystal (23) in a state where a sample is disposed on an optical path of the idler photon, and outputs (Continued)

a quantum interference signal corresponding to the detected number of photons. The controller (4) calculates an absorption spectroscopy characteristic of the sample by performing Fourier transform on the quantum interference signal.

18 Claims, 34 Drawing Sheets

(56) References Cited

U.S. PATENT DOCUMENTS

| | | | | |
|---|---|---|---|---|
| 11,454,541 | B2 * | 9/2022 | Steinlechner | G01N 21/636 |
| 2013/0230270 | A1 | 9/2013 | Horn | |
| 2015/0177128 | A1 * | 6/2015 | Zeilinger | G01N 21/64<br>250/339.06 |
| 2019/0086330 | A1 | 3/2019 | Krivitskiy et al. | |
| 2023/0020945 | A1 * | 1/2023 | Takeuchi | G01N 21/35 |

OTHER PUBLICATIONS

Herzog, T.J. et al.: "Frustrated two-photon creation via interference," Phys. Rev. Lett., vol. 72, No. 5, pp. 629-632, Jan. 1, 1994.
Lee, Joong-Sung et al.: "Quantum plasmonic sensing using single photons," arXiv:1806.10300v2 [quant-ph], doi:10.1364/OE.26.029272, Jun. 27, 2018.
Lanin, A.A. et al.: "Time-domain spectroscopy in the mid-infrared," Scientific Reports, vol. 4:6670, doi: 10.1038/srep06670, Oct. 20, 2014.
Lindner, Chiara et al.: "Fourier transform infrared spectroscopy with visible light," arXiv:1909.06864v2 [physics.optics], Nov. 1, 2019.
McCracken, R.A. et al.: "Numerical investigation of mid-infrared single-photon generation," J. Op. Soc. B., vol. 35, No. 12, pp. C38-C48, Nov. 12, 2018.
Jepsen, P.U. et al.: "Terahertz spectroscopy and imaging—Modern techniques and applications," Laser & Photonics Reviews, vol. 5, No. 1, pp. 124-166, Oct. 4, 2010.
Extended European Search Report received in European Patent Application No. 20899445.9, dated Dec. 5, 2023.
Arahata, Masaya et al., "Generation of visible-infrared entangled photon pairs using a LiNbO3 crystal", Lecture preprints of the JSAP Autumn Meeting, Sep. 4, 2019 in 3 pages.
"Developed optical technology that can observe the vibration of molecules at a time—A new way to the analysis of complex molecules by skillfully use of nonlinear optical effects-", Japan Science and Technology Agency [online], Sep. 27, 2019 in 6 pages.
Okano, Masayuki et al."0.54 μm resolution two-photon interference with dispersion cancellation for quantum optical coherence tomography", Scientific Reports vol. 5, Article No. 18042, Dec. 14, 2015 in 8 pages.
Paterova, Anna et al, "Measurement of infrared optical constants with visible photons", New Journal of Physics, 2018, vol. 20, Apr. 30, 2015 in 11 pages.
International Search Report and Written Opinion received in PCT Application No. PCT/JP2020/045244 as mailed Feb. 22, 2021 in 12 pages.
Office Action received in Chinese Application No. 202080096440.5, dated Jun. 3, 2024.

* cited by examiner

FIG.2
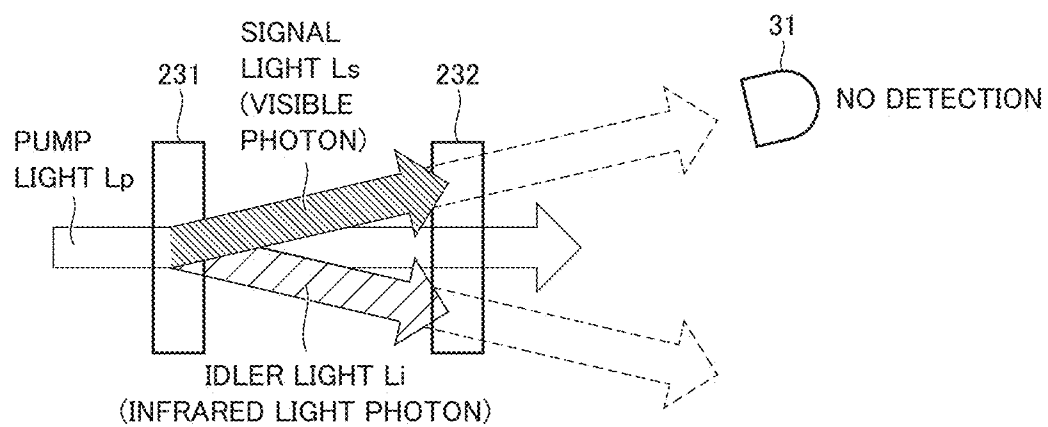
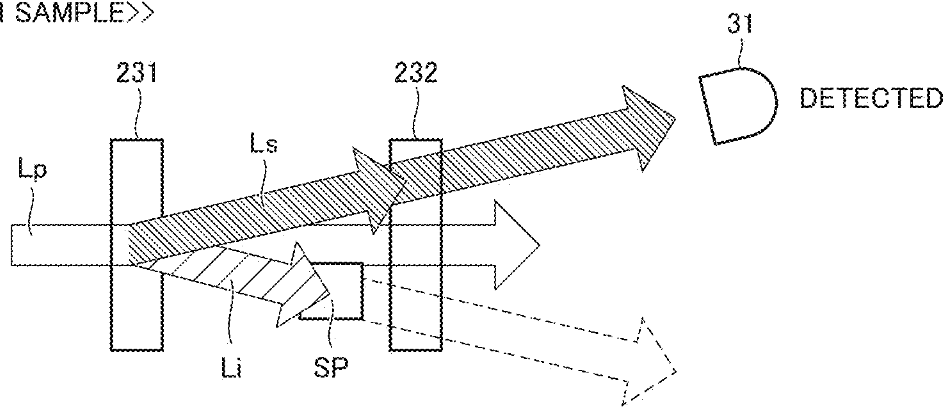

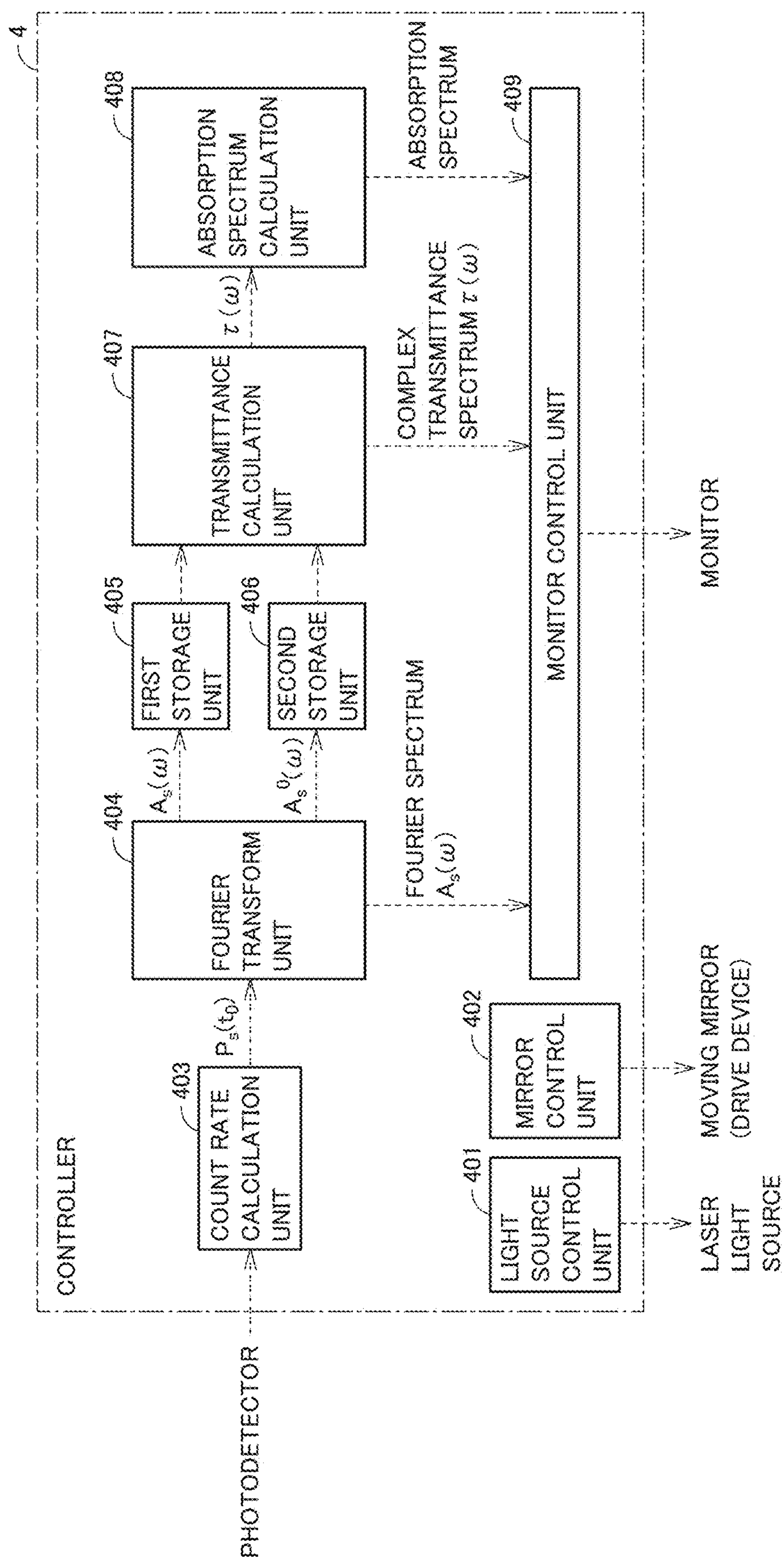
FIG.3
4
CONTROLLER
PHOTODETECTOR
403
COUNT RATE CALCULATION UNIT
$P_s(t_0)$
404
FOURIER TRANSFORM UNIT
$A_s(\omega)$
$A_s^0(\omega)$
405
FIRST STORAGE UNIT
406
SECOND STORAGE UNIT
407
TRANSMITTANCE CALCULATION UNIT
$\tau(\omega)$
408
ABSORPTION SPECTRUM CALCULATION UNIT
FOURIER SPECTRUM $A_s(\omega)$
COMPLEX TRANSMITTANCE SPECTRUM $\tau(\omega)$
ABSORPTION SPECTRUM
409
MONITOR CONTROL UNIT
MONITOR
402
MIRROR CONTROL UNIT
401
LIGHT SOURCE CONTROL UNIT
MOVING MIRROR (DRIVE DEVICE)
LASER LIGHT SOURCE

<MODIFICATION OF FIRST EMBODIMENT>

<SECOND EMBODIMENT>

<THIRD EMBODIMENT>
300
201
QUANTUM OPTICAL SYSTEM
Lp, Ls
222
23
221
214
Ls
32
SINGLE PIXEL PHOTODETECTOR
26
Li
213
212
Lp
25
SP
211
25
ΔX
250
LASER LIGHT SOURCE
1
4
CONTROLLER
PROCESSOR
MEMORY
I/O
41
42
43
5
MONITOR

<FIRST MODIFICATION OF THIRD EMBODIMENT>

FIG.10
<<MULTI-PIXEL TYPE>>
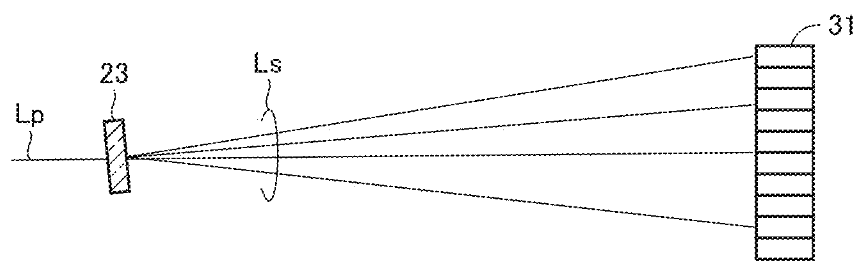
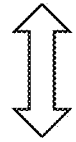
<<SINGLE-PIXEL TYPE>>
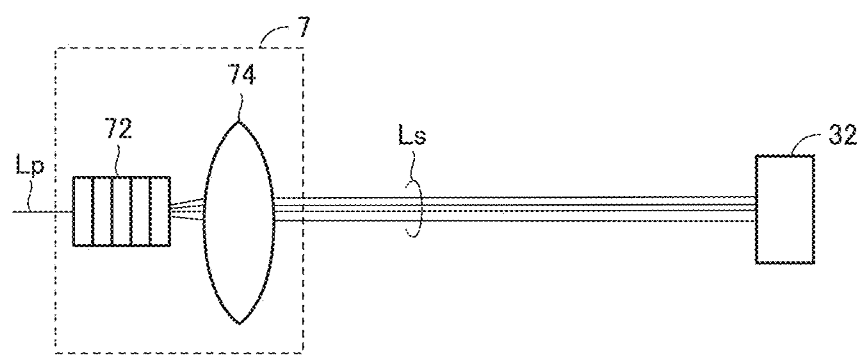

<SECOND MODIFICATION OF THIRD EMBODIMENT>

<FOURTH EMBODIMENT>

<<WITHOUT SAMPLE>>
<<WITH SAMPLE>>
<<WHOLE>>
<<VICINITY OF PEAK>>
$P_S$
0
$\Delta L_{idl}$ [$\mu$m]
-400
-200
0
200
400
-20
0
20

FIG.25

| CRYSTAL MATERIAL | TRANSPARENT WINDOW REGION | ADVANTAGES |
| --- | --- | --- |
| $LiNbO_3$ | 0.4 μm ~5.2 μm | · VISIBLE LIGHT EXCITATION IS POSSIBLE (>400nm)<br>· PRODUCTION TECHNOLOGY OF WAVEGUIDE STRUCTURE THAT CAN IMPROVE GENERATING EFFICIENCY OF QUANTUM ENTANGLED PHOTON PAIR IS ESTABLISHED |
| GaP | 0.7 μm ~12 μm | · INFRARED PHOTON OF FINGERPRINT REGION (<12 μm) IMPORTANT FOR ESTIMATING MOLECULAR STRUCTURE IS GENERATED TO ALLOW COMPLICATED MOLECULAR STRUCTURE TO BE ESTIMATED<br>· VISIBLE TO NEAR-INFRARED EXCITATION IS POSSIBLE<br>· GENERATING EFFICIENCY OF QUANTUM ENTANGLED PHOTON PAIR IS HIGH (ABOUT TWO TIMES OF $LiNbO_3$) |
| GaAs | 1 μm ~18 μm | · SPECTROSCOPY IN BROADER BANDWIDTH IS POSSIBLE COMPARED WITH GaP<br>· GENERATING EFFICIENCY OF QUANTUM ENTANGLED PHOTON PAIR IS VERY HIGH (FOUR TIMES OR MORE OF $LiNbO_3$)<br>· HIGH-QUALITY CRYSTAL GROWTH TECHNOLOGY IS ESTABLISHED |
| $LiTaO_3$ | 0.3 μm ~5.5 μm | · VISIBLE LIGHT EXCITATION IS POSSIBLE<br>· SINCE LIGHT DAMAGE THRESHOLD IS HIGHER THAN THAT OF $LiNbO_3$, HIGH BRIGHTNESS USING HIGH-INTENSITY PUMP LIGHT IS POSSIBLE<br>· PRODUCTION TECHNOLOGY OF WAVEGUIDE STRUCTURE IS ESTABLISHED |
| ZnSe | 0.4 μm ~22 μm | · TRANSPARENT REGION IS LARGE, AND BROAD-BANDWIDTH INFRARED GENERATION BY VISIBLE EXCITATION IS POSSIBLE<br>· ALMOST THE WHOLE REGION (<22 μm) OF FINGERPRINT REGION IS COVERED<br>· GENERATING EFFICIENCY OF QUANTUM ENTANGLED PHOTON PAIR IS HIGH (ABOUT THREE TIMES OF $LiNbO_3$) |

《WITHOUT SAMPLE》
$P_S$
0
−500
−1000
−1500
−2000
−2500
−3000
−3500
《WITH SAMPLE》
$P_S$
0
−500
−1000
−1500
−2000
−2500
−3000
−3500
$\Delta L_{idl}$ [$\mu$m]

FIG.30
<<SWEEPING IDLER OPTICAL PATH>>
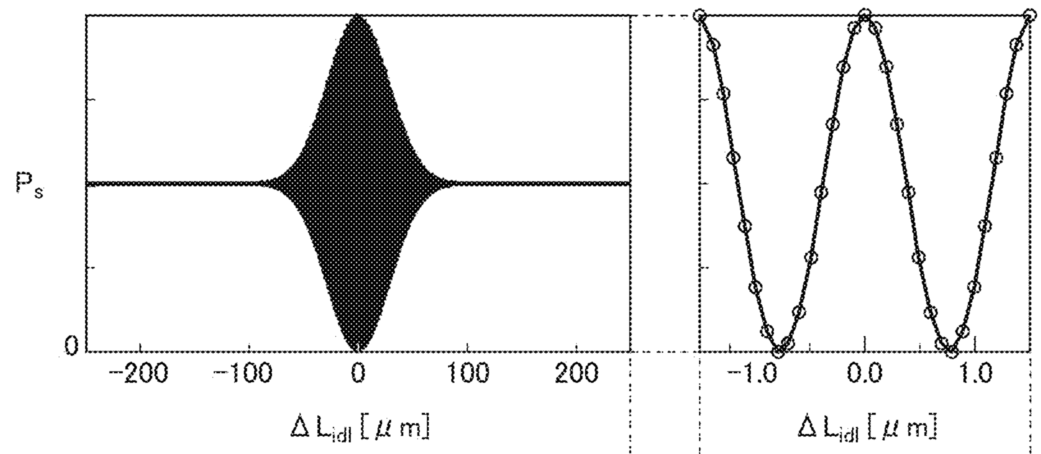
<<SWEEPING SIGNAL OPTICAL PATH>>
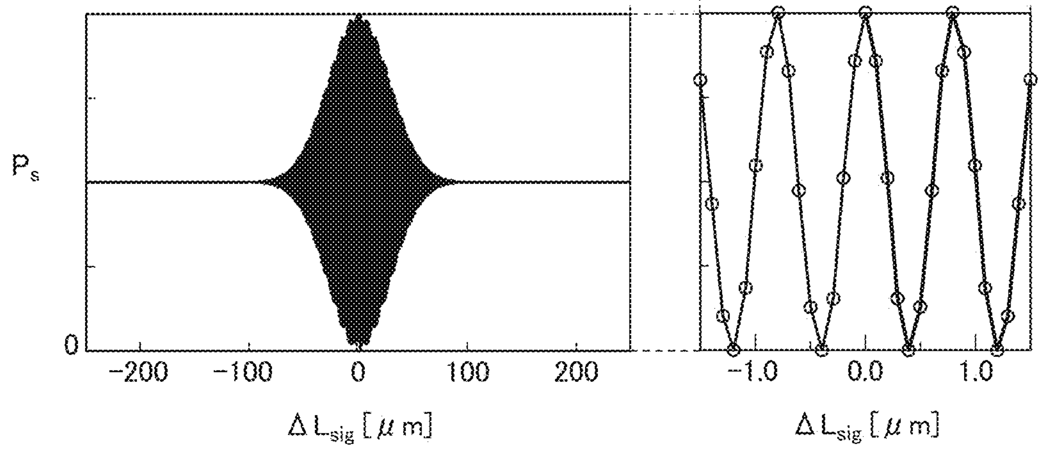

LIGHT INTENSITY
0
0.62
0.63
0.64
0.65
0.66
0.67
WAVE NUMBER [$10^4$cm$^{-1}$]
<<SWEEPING IDLER OPTICAL PATH>>
LIGHT INTENSITY
0
1.21
1.22
1.23
1.24
1.25
1.26
WAVE NUMBER [$10^4$cm$^{-1}$]
<<SWEEPING SIGNAL OPTICAL PATH>>

QUANTUM ABSORPTION SPECTROSCOPY SYSTEM AND QUANTUM ABSORPTION SPECTROSCOPY METHOD

CROSS-REFERENCE TO RELATED APPLICATIONS

This application is the U.S. National Phase under 35 U.S.C. § 371 of International Application No. PCT/JP2020/045244, filed Dec. 4, 2020, designating the United States and published in Japanese on Jun. 17, 2021 as International Publication No. WO2021/117632, which claims priority to Japanese Application No. 2019-225400, filed Dec. 13, 2019 and Japanese Application No. 2020-129518, filed Jul. 30, 2020, each disclosure of which is incorporated herein by reference in its entirety.

TECHNICAL FIELD

The present disclosure relates to a quantum absorption spectroscopy system and a quantum absorption spectroscopy method.

BACKGROUND ART

Generally, in an infrared absorption spectroscopy method, a sample is irradiated with infrared light. A change in intensity of infrared light associated with absorption by a sample is acquired as the infrared absorption spectrum of the sample. In particular, Fourier transform infrared spectroscopy (FTIR) is widely used to specify a molecular structure (the type of functional group, or a three-dimensional structure or the like) in fields such as chemistry, biology, and pharmacy.

CITATION LIST

Patent Literature

PTL 1: U.S. Pat. No. 10,648,908

Non Patent Literature

NPL 1: Anna Paterova, Hongzhi Yang, Chengwu An, Dmitry Kalashnikov and Leonid Krivitsky, "Measurement of infrared optical constants with visible photons", New Journal of Physics 20(2018)043015

NPL 2:Masayuki Okano, Hwan Hong Lim, Ryo Okamoto, Norihiko Nishizawa, Sunao Kurimura and Shigeki Takeuchi, "0.54 m resolution two-photon interference with dispersion cancellation for quantum optical coherence tomography", Scientific Reports volume 5, Article number: 18042 (2015)

SUMMARY OF INVENTION

Technical Problem

In recent years, in the fields of quantum technology such as quantum metrology, quantum communication, and quantum computing, research for achieving a new function using a "quantum entangled" photon pair in which two photons have a quantum mechanical correlation has been advanced. Hereinafter, such a photon pair is also referred to as a "quantum entangled photon pair". The present inventors have focused on the application of the quantum entangled photon pair to a spectroscopy system and a spectroscopy method. The inventors have found that a spectral wavelength range can be expanded by performing appropriate arithmetic processing to a detection signal from a photodetector.

The present disclosure has been made to solve such a problem, and an object of the present disclosure is to provide technology allowing spectroscopy in a wide wavelength range in a spectroscopy system or a spectroscopy method (quantum absorption spectroscopy system or quantum absorption spectroscopy method) in which a quantum entangled photon pair is applied.

Solution to Problem (1) A quantum absorption spectroscopy system according to a first aspect of the present disclosure includes a light source, a quantum optical system, a photodetector, and a processor. The light source emits pump light. The quantum optical system includes a nonlinear optical element that generates a quantum entangled photon pair of a signal photon and an idler photon by irradiation with the pump light, and a phase converter that changes a phase of one photon of the signal photon and the idler photon. The quantum optical system causes quantum interference between a plurality of physical processes in which the quantum entangled photon pair is generated. The photodetector outputs a quantum interference signal corresponding to a number of detected signal photons when the phase of the one photon is changed by the phase converter in a state where a sample is disposed on an optical path of the idler photon. The processor calculates an absorption spectroscopy characteristic of the sample by performing Fourier transform on the quantum interference signal.

(2) In an embodiment, the processor may calculate a Fourier spectrum by performing Fourier transform on the quantum interference signal in a state where the sample is disposed on the optical path of the idler photon, and further calculate a reference Fourier spectrum by performing Fourier transform on the quantum interference signal in a state where the sample is not disposed on the optical path of the idler photon. The processor may calculate a complex transmittance spectrum of the sample based on a ratio between the Fourier spectrum and the reference Fourier spectrum.

(3) In an embodiment, the processor may calculate an absorption spectrum of the sample by squaring an absolute value of the complex transmittance spectrum of the sample.

(4) In an embodiment, the processor may calculate the absorption spectroscopy characteristic of the sample by performing Fourier transform on the quantum interference signal, the quantum interference signal acquired without wavelength sweep of the quantum entangled photon pair and without the signal photon being wavelength-resolved in the quantum optical system.

(5) In an embodiment, the nonlinear optical element may be a chirp-type or fan-type quasi-phase-matched element.

(6) In another embodiment, the nonlinear optical element may be a quasi-phase-matched element including a nonlinear optical crystal. The quasi-phase-matched element may be configured such that a wavelength of an idler photon group including the idler photon is distributed over a wide wavelength range determined according to a material and a poling period of the nonlinear optical crystal when the quantum entangled photon pair occurs a plurality of times.

(7) In an embodiment, the material of the nonlinear optical crystal may contain lithium niobate. The poling period of the nonlinear optical crystal may be defined such that the idler photon group includes a plurality of photons having wavelengths different from each other in a wavelength range of 0.4 μm to 5.2 μm.

(8) In another embodiment, the material of the nonlinear optical crystal may contain gallium phosphide. The poling period of the nonlinear optical crystal may be defined such that the idler photon group includes a plurality of photons having wavelengths different from each other in a wavelength range of 0.7 μm to 12 μm.

(9) In still another embodiment, the material of the nonlinear optical crystal may contain gallium arsenide. The poling period of the nonlinear optical crystal may be defined such that the idler photon group includes a plurality of photons having wavelengths different from each other in a wavelength range of 1 μm to 18 μm.

(10) In still another embodiment, the material of the nonlinear optical crystal may contain lithium tantalate. The poling period of the nonlinear optical crystal may be defined such that the idler photon group includes a plurality of photons having wavelengths different from each other in a wavelength range of 0.3 μm to 5.5 μm.

(11) In still another embodiment, the material of the nonlinear optical crystal may contain zinc selenide. The poling period of the nonlinear optical crystal may be defined such that the idler photon group includes a plurality of photons having wavelengths different from each other in a wavelength range of 0.4 μm to 22 μm.

(12) In an embodiment, the photodetector may be a single-pixel photodetector.

(13) In an embodiment, the signal photon is a visible-range photon. The photodetector is a silicon-based photodetector.

(14) In an embodiment, the quantum optical system may further include a total reflection measuring device that performs total reflection measurement of the sample.

(15) In an embodiment, the phase converter may include a first moving mirror that is movable along a propagation direction of the signal photon, and a second moving mirror that is movable along a propagation direction of the idler photon. The quantum absorption spectroscopy system further includes a controller. The controller may selectively move one mirror of the first and the second moving mirrors.

(16) In an embodiment, the phase converter may include a moving mirror that is movable along a propagation direction of the signal photon.

(17) In an embodiment, the nonlinear optical element may generate the ultraviolet-region idler photon. The processor may calculate an ultraviolet absorption spectroscopy characteristic of the sample.

(18) A quantum absorption spectroscopy (QAS) method according to a second aspect of the present disclosure includes first to third steps: First step is step of generating a quantum entangled photon pair of a signal photon and an idler photon by irradiating a nonlinear optical element with pump light in a quantum optical system that causes quantum interference between a plurality of physical processes in which the quantum entangled photon pair is generated. Second step is step of acquiring a quantum interference signal corresponding to a number of detected photons by detecting the signal photon with a photodetector when a phase of one photon of the signal photon and the idler photon is changed by a phase converter in a state where a sample is disposed on an optical path of the idler photon. Third step is step of calculating an absorption spectroscopy characteristic of the sample by performing Fourier transform on the quantum interference signal of the photodetector.

Advantageous Effects of Invention

The present disclosure allows spectroscopy in a wide wavelength range in a quantum absorption spectroscopy system or a quantum absorption spectroscopy method.

BRIEF DESCRIPTION OF DRAWINGS

FIG. 2 is a conceptual diagram for describing the principle of quantum absorption spectroscopy.

FIG. 3 is a functional block diagram for schematically describing arithmetic processing by a processor.

FIG. 10 is a conceptual diagram for describing a difference in a detection principle according to the type of a photodetector.

FIG. 25 is a diagram in which the features of materials capable of being employed for the nonlinear optical crystal are arranged.

FIG. 30 is a diagram showing a quantum interference signal obtained by the simulation of sweeping an idler optical path or a signal optical path.

DESCRIPTION OF EMBODIMENTS

Figure 1:
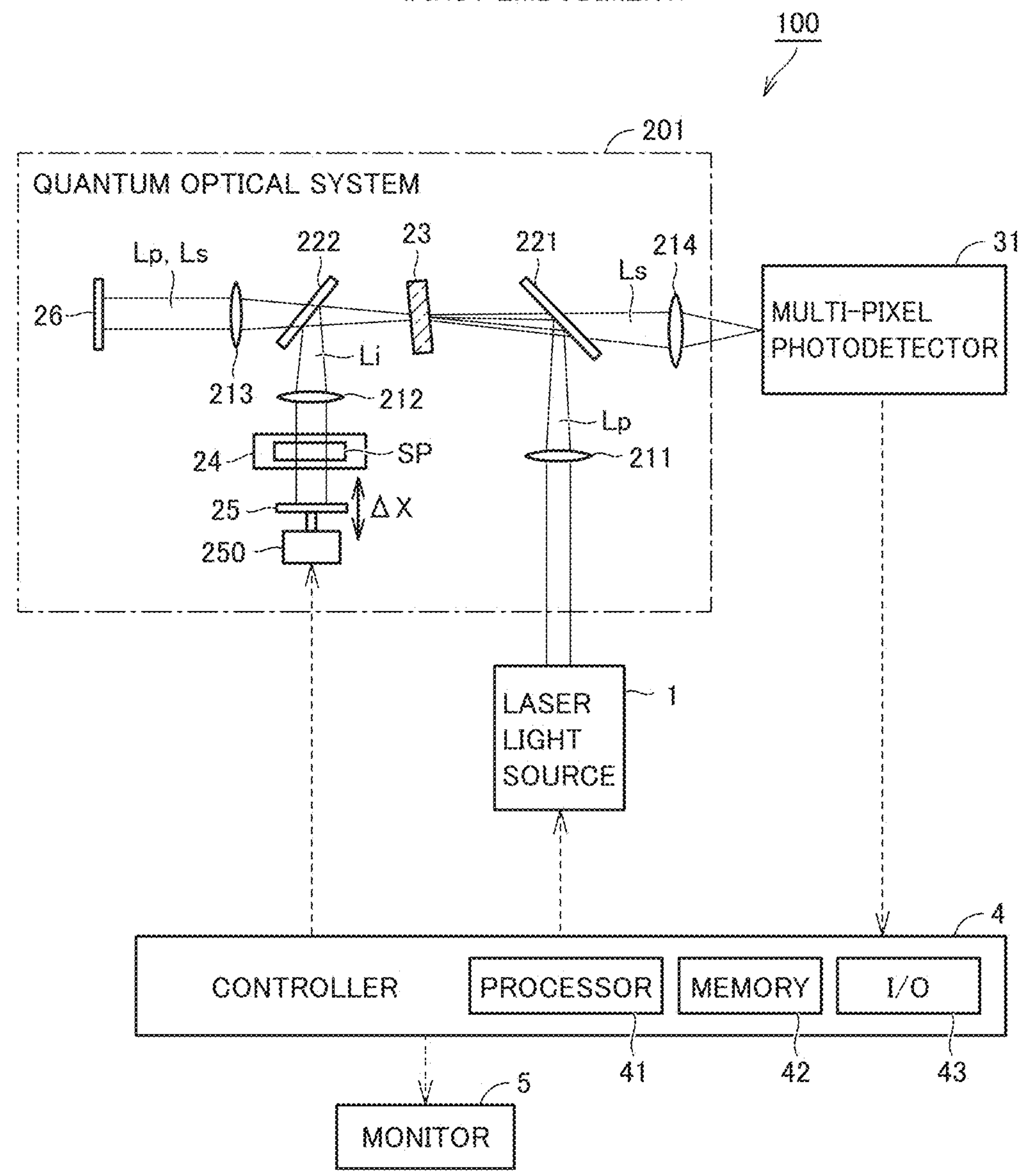
FIG. 1 is a diagram showing the overall configuration of a quantum absorption spectroscopy system according to a first embodiment of the present disclosure.

Hereinafter, embodiments of the present invention will be described in detail with reference to the drawings. Note that the same or corresponding parts in the drawings are denoted by the same reference numerals, and the description thereof will not be repeated.

In the present disclosure and the embodiments thereof, an ultraviolet range means a wavelength range of 10 nm to 360 nm. A visible range means a wavelength range of 360 nm to 1050 nm. A near-infrared range means a wavelength range of 1050 nm to 2 μm. A mid-infrared range means a wavelength range of 2 μm to 5 μm A far-infrared range means a wavelength range of 5 μm to 20 μm. An ultra-far infrared range (terahertz range) means a wavelength range of 20 μm to 1 mm. An infrared range may include all of a near-infrared range, a mid-infrared range, a far-infrared range, and an ultra-far-infrared range.

First Embodiment

In a first embodiment (and second to fourth embodiments to be described later), a configuration for measuring the absorption spectroscopy characteristic of a sample in an infrared range by a quantum absorption spectroscopy system according to the present disclosure will be described. However, as will be described in detail later, a wavelength range that can be measured by the quantum absorption spectroscopy system according to the present disclosure is not limited to the infrared range.

<System Configuration>

FIG. 1 is a diagram showing the overall configuration of a quantum absorption spectroscopy system according to a first embodiment of the present disclosure. A quantum absorption spectroscopy system 100 measures the infrared absorption spectroscopy characteristic (infrared absorption spectrum and the like) of a sample by applying a quantum entangled photon pair to infrared absorption spectroscopy.

Quantum absorption spectroscopy system 100 includes a laser light source 1, a quantum optical system 201, a photodetector 31, a controller 4, and a monitor 5.

Laser light source 1 emits pump light for exciting a nonlinear optical crystal 23 (described later). In the figure, the pump light is indicated by Lp. In the first embodiment, laser light source 1 emits a continuous wave (CW) laser beam included in the visible range. Specifically, for example, a semiconductor laser that emits a green laser beam having a wavelength of 532 nm can be employed as laser light source 1.

Quantum optical system 201 causes quantum interference between a plurality of physical processes that generate a quantum entangled photon pair of a signal photon and an idler photon. As will be described in detail later in FIG. 2, attention should be paid to the quantum interference because the quantum interference is different from normal light interference. In the figure, the optical path of signal light (light composed of a signal photon) is indicated by Ls, and the optical path of idler light (light composed of an idler photon) is indicated by Li. Hereinafter, the optical path of the signal light may be abbreviated as a "signal optical path", and the optical path of the idler light may be abbreviated as an "idler optical path".

In the present embodiment, quantum optical system 201 is an optical system to which a configuration similar to that of a Michelson interferometer is applied. Quantum optical system 201 includes lenses 211 to 214, dichroic mirrors 221, 222, a nonlinear optical crystal 23, a sample holder 24, a moving mirror 25, and a fixed mirror 26.

Lens 211 is disposed between laser light source 1 and dichroic mirror 221. Lens 211 collects the pump light from laser light source 1 and focus the collected pump light on nonlinear optical crystal 23.

Dichroic mirror 221 is disposed between lens 211 and nonlinear optical crystal 23. Dichroic mirror 221 transmits light in a wavelength range including the wavelength of the signal light and reflects light outside the wavelength range.

In this example, the wavelength of the pump light is 532 nm. The wavelength of the signal light is included in, for example, a wavelength range of greater than or equal to 603 nm and less than or equal to 725 nm. The wavelength of the idler light is included in, for example, a wavelength range of greater than or equal to 2 μm and less than or equal to 4.5 μm. Therefore, while dichroic mirror 221 transmits the signal light, dichroic mirror 221 reflects the pump light and the idler light. The pump light is reflected by dichroic mirror 221 and applied to nonlinear optical crystal 23.

Nonlinear optical crystal 23 generates the signal light and the idler light from the pump light collected by lens 211. More particularly, nonlinear optical crystal 23 generates a photon pair of a signal photon and an idler photon through spontaneous parametric down-conversion (SPDC) of the pump light. Nonlinear optical crystal 23 is, for example, a lithium niobate ($LiNbO_3$) crystal. In this case, the signal light is visible light and the idler light is infrared light (more specifically, near-infrared light or mid-infrared light). However, the type of nonlinear optical crystal 23 is not particularly limited. Other type of nonlinear optical crystal such as a gallium silver sulfide ($AgGaS_2$) crystal may be used. The principle of the quantum absorption spectroscopy using nonlinear optical crystal 23 will be described with reference to FIG. 2.

In the present specification, when a compound is expressed by a stoichiometric composition formula, the stoichiometric composition formula is merely a representative example. A composition ratio may be non-stoichiometric. For example, when lithium niobate is expressed as "$LiNbO_3$", unless otherwise specified, lithium niobate is not limited to the composition ratio of "Li/Nb/O=1/1/3", and may contain Li, Nb, and O in an optional composition ratio. The same applies to other compounds exemplified below.

Dichroic mirror 222 is disposed between nonlinear optical crystal 23 and moving mirror 25 and between nonlinear optical crystal 23 and fixed mirror 26. In the present embodiment, dichroic mirror 222 transmits the visible light and reflects the infrared light. The visible-range signal light is transmitted through dichroic mirror 222 together with the pump light and is directed toward fixed mirror 26. Meanwhile, the idler light in the infrared range is reflected by dichroic mirror 222 and is directed toward moving mirror 25. Dichroic mirror 222 may transmit the infrared light and reflect the visible light.

Lens 212 is disposed between dichroic mirror 222 and sample holder 24. Lens 212 collimates the idler light reflected by dichroic mirror 222. Lens 213 is disposed between dichroic mirror 222 and fixed mirror 26. Lens 213 collimates the pump light and the signal light transmitted through dichroic mirror 222.

Sample holder 24 is disposed between nonlinear optical crystal 23 and moving mirror 25. Sample holder 24 holds a sample (In the figure, indicated by SP). A material transparent to the idler light (the infrared light in this example) is used as the material of sample holder 24. The idler light is applied to the sample, and the transmitted light is directed to moving mirror 25.

Moving mirror 25 is movable along the propagation direction of the idler light. Specifically, the moving mirror 25 is provided with a drive device 250. Drive device 250 is an electric actuator controlled by controller 4, and is, for example, a motor drive device (a servo motor or a stepping motor or the like) that is mechanically displaced in accordance with a control command from controller 4. Drive device 250 may be a piezoelectric element (piezo element) that is displaced according to an applied voltage from controller 4. The idler optical path can be swept (in the drawing, the state of the sweep is represented by $\Delta X$) by periodically changing the position of moving mirror 25 (reciprocating moving mirror 25) using drive device 250.

Moving mirror 25 is preferably a flat mirror and reflects the idler light transmitted through the sample. The reflected idler light is further reflected by dichroic mirror 222 and returns to nonlinear optical crystal 23. The idler light passes through nonlinear optical crystal 23, but does not reach photodetector 31 because it is reflected by dichroic mirror 221.

Moving mirror 25 is an example of a phase converter according to the present disclosure. The phase converter according to the present disclosure may include a phase modulator (not shown) such as an electro-optic modulator (EOM) instead of or in addition to moving mirror 25. For example, after the optical path length is relatively roughly changed using moving mirror 25 provided with drive device 250, a fine optical path length change can be achieved using the phase modulator.

Fixed mirror 26 is, for example, a flat mirror, and reflects the pump light and the signal light each transmitted through dichroic mirror 222. The reflected light of the pump light and the reflected light of the signal light are transmitted through dichroic mirror 222 again and return to nonlinear optical crystal 23. The pump light passes through nonlinear optical crystal 23, but is reflected by dichroic mirror 221. Meanwhile, the signal light passes through nonlinear optical crystal 23 and is also transmitted through dichroic mirror 221. Fixed mirror 26 may be a concave mirror. In this case, lens 213 can be omitted.

Lens 214 is disposed between dichroic mirror 221 and photodetector 31. Lens 214 collects the signal light transmitted through dichroic mirror 221 and outputs the collected signal light to photodetector 31.

Photodetector 31 is a silicon-based photodetector and has optical characteristics capable of spectroscopy of visible light (and a part of near-infrared light). In the first embodiment, photodetector 31 is a multi-pixel photodetector including a plurality of pixels arranged in a two-dimensional array. Specifically, photodetector 31 is a charged-coupled device (CCD) image sensor, or a complementary metal-oxide-semiconductor (CMOS) image sensor or the like. Photodetector 31 detects the signal light in response to a control command from controller 4 and outputs the detection signal to controller 4. The intensity of the detection signal of the signal light is an intensity corresponding to the number of signal photons detected by photodetector 31 (more specifically, a signal intensity directly proportional to the number of photons). Therefore, it can be said that photodetector 31 outputs a detection signal (a quantum interference signal to be described later) corresponding to the detected number of photons.

Controller 4 is, for example, a microcomputer. Controller 4 includes a processor 41 such as a central processing unit (CPU), a memory 42 such as a read only memory (ROM) or a random access memory (RAM), and an input/output port 43. Controller 4 controls the devices (laser light source 1 and drive device 250) in quantum absorption spectroscopy system 100.

Controller 4 executes various types of arithmetic processing for achieving quantum absorption spectroscopy. More specifically, controller 4 calculates the infrared absorption spectroscopy characteristic of the sample based on the detection signal from photodetector 31. The infrared absorption spectroscopy characteristic of the sample may include the Fourier spectrum, complex transmittance spectrum, and infrared absorption spectrum of the sample. Although the arithmetic processing by controller 4 will be described in detail later, controller 4 first calculates the Fourier spectrum of the sample. Controller 4 performs predetermined calculation using the Fourier spectrum to calculate the complex transmittance spectrum and infrared absorption spectrum of the sample. Controller 4 is an example of a processor and a controller according to the present disclosure. The processor and the controller according to the present disclosure may be separately configured.

Monitor 5 is, for example, a liquid crystal display, and displays the results of the arithmetic processing by controller 4. Thus, an operator can confirm the infrared absorption spectroscopy characteristics such as the Fourier spectrum of the sample.

Dichroic mirror 221 may transmit light having a wavelength of idler light (or longer wavelength). In this case, a short-pass filter (not shown) may be installed between diclhroic mirror 221 and lens 214. The short-pass filter transmits the signal light while it reflects (or absorbs) the idler light. Accordingly, it is possible to suppress the idler light from reaching photodetector 31. However, when photodetector 31 has low sensitivity in the wavelength range of the idler light, the installation of the short-pass filter may be omitted to allow the arrival of the idler light to photodetector 31.

Nonlinear optical crystal 23 is an example of a nonlinear optical element according to the present disclosure. The nonlinear optical element according to the present disclosure is not limited to this, and may be, for example, a ring resonator or an optical waveguide (not shown) formed of silicon (Si) and/or silicon nitride (SiN) and the like.

In quantum optical system 201 shown in FIG. 1, a quantum interferometer similar to a Michelson interferometer is employed. However, the quantum optical system according to the present disclosure may have a configuration similar to that of a Mach-Zehnder interferometer including a plurality of nonlinear optical elements.

In a typical existing quantum absorption spectroscopy system, a light source that emits infrared light and a photodetector that is highly sensitive to the infrared light are combined, but there may be room for improvement in performance of the light source and the photodetector. As a specific example, most of light sources (tungsten lamps and the like) that emit infrared light utilize black-body radiation, and thus, the light sources have a low energy conversion efficiency. In general, compound semiconductor-based infrared photodetectors such as indium gallium arsenide (InGaAs) are less sensitive than visible photodetectors (a silicon-based photodetector or the like). Meanwhile, in recent years, downsizing and cost reduction ofvisible-light laser light sources such as semiconductor lasers have been advanced. As digital cameras and smart phones and the like become widespread, silicon-based photodetectors have become highly sensitive and inexpensive. The employment of such a laser light source and a photodetector makes it possible to achieve high sensitivity and low cost of quantum absorption spectroscopy system 100.

<Measurement Principle>

FIG. 2 is a conceptual diagram for describing the principle of quantum absorption spectroscopy. In FIG. 1, the configuration in which only one nonlinear optical crystal 23 is disposed on the optical path of the pump light has been described. In FIG. 2, in order to facilitate understanding of the measurement principle, a configuration in which two nonlinear optical crystals are disposed on the optical path of the pump light will be described as an example. The two nonlinear optical crystals are described as a first crystal 231 and a second crystal 232.

When first crystal 231 is irradiated with the pump light from laser light source 1, one photon having relatively large energy is divided into two photons having smaller energy while satisfying the energy conservation law by the SPDC in first crystal 231. In the example shown in FIG. 2, from one visible photon (pump photon), a quantum entangled photon pair of one visible photon (signal photon) and one infrared photon (idler photon) is generated. Irradiation of second crystal 232 with the pump light similarly generates a quantum entangled photon pair of one visible photon and one infrared photon. In this example, photodetector 31 is disposed in the direction of travel of the visible photon of the quantum entangled photon pair.

Quantum interference occurs between an event in which a quantum entangled photon pair is generated by first crystal 231 (hereinafter, referred to as a "first physical process") and an event in which a quantum entangled photon pair is generated by second crystal 232 (hereinafter, referred to as a "second physical process"). More specifically, when a probability amplitude representing the first physical process and a probability amplitude representing the second physical process are added, if the two probability amplitudes are in the same phase, the first physical process and the second physical process intensify each other, whereas, if the two probability amplitudes are in opposite phases, the first physical process and the second physical process cancel each other (quantum interference effect). Hereinafter, interference (destructive interference) in which the first physical process and the second physical process cancel each other will be described as an example. However, quantum optical system 201 may cause interference (constructive interference) in which the first physical process and the second physical process intensify each other.

When a sample that is an infrared absorber is not disposed on the idler optical path, the first physical process and the second physical process are indistinguishable from each other, and the first physical process and the second physical process cause quantum interference (cancel each other in this example). In this case, it is observed that a quantum entangled photon pair is not generated at a post stage of the second crystal 232, That is, the signal light (visible photon) is not detected by photodetector 31.

In contrast, when the sample is disposed on the idler optical path, the idler light is absorbed by the sample. Then, the first physical process and the second physical process can be distinguished, whereby quantum interference between the first physical process and the second physical process becomes incomplete. As a result, the signal light is detected by photodetector 31.

As described above, in the quantum absorption spectroscopy, one visible photon (signal photon) of the quantum entangled photon pair is detected by photodetector 31, which makes it possible to determine that the other infrared photon (idler photon) is absorbed by the sample.

Configuration of quantum optical system 201 shown in FIG. 1 is a configuration in which nonlinear optical crystal 23 serves as both first crystal 231 and second crystal 232. By reciprocating the pump light on the nonlinear optical crystal 23, the number of installed nonlinear optical crystals can be reduced.

In the conceptual diagram shown in FIG. 2, an example in which quantum optical system 201 causes the quantum interference between the two physical processes (first and second physical processes) has been described. However, the quantum optical system according to the present disclosure may cause quantum interference during greater than or equal to three physical processes. That is, the quantum optical system according to the present disclosure may cause quantum interference between at least two physical processes.

<Arithmetic Processing by Controller>

FIG. 3 is a functional block diagram for schematically describing arithmetic processing by a controller 4. Controller 4 includes a light source control unit 401, a mirror control unit 402, a count rate calculation unit 403, a Fourier transform unit 404, a first storage unit 405, a second storage unit 406, a transmittance calculation unit 407, an absorption spectrum calculation unit 408, and a monitor control unit 409. First, the outline of the function of each block will be described.

Light source control unit 401 controls the light output (laser power) of laser light source 1. The laser power during the measurement by quantum absorption spectroscopy system 100 is basically kept constant.

Mirror control unit 402 controls the movement (reciprocating motion) of moving mirror 25. When the position of moving mirror 25 changes, an idler optical path length changes, whereby the propagation time (hereinafter, abbreviated as an "idler propagation time") to of the idler light changes. Therefore, by reciprocating moving mirror 25, the detection signal of the signal light from photodetector 31 is acquired as the time waveform of idler propagation time to.

Count rate calculation unit 403 calculates a "signal photon count rate $P_s$" as the function of the idler propagation time to on the basis of the detection signal of the signal light from photodetector 31. Signal photon count rate $P_s(t_0)$ is the number of counts of signal photons per unit time. The calculation results of signal photon count rate $P_s(t_0)$ are output to Fourier transform unit 404.

Fourier transform unit 404 performs Fourier transform on signal photon count rate $P_s(t_0)$. In quantum absorption spectroscopy system 100, signal photon count rate $P_s(t_0)$ is acquired in both a state where the sample is disposed in sample holder 24 and a state where the sample is not disposed in sample holder 24. A Fourier spectrum obtained by Fourier transform of signal photon count rate $P_s(t_0)$ acquired in a state where the sample is disposed in sample holder 24 is described as "$A_s(\omega)$".

Meanwhile, a Fourier spectrum obtained by Fourier transform of signal photon count rate $P_s(t_0)$ acquired in a state where the sample is not disposed in sample holder 24 is described as "$A_s^0(\omega)$". Fourier transform unit 404 outputs Fourier spectrum $A_s^0(\omega)$ to first storage unit 405 and monitor control unit 409, and outputs Fourier spectrum $A_s^0(\omega)$ to second storage unit 406. Fourier spectrum $A_s^0(\omega)$ corresponds to a "reference Fourier spectrum" according to the present disclosure.

First storage unit 405 non-volatilely stores Fourier spectrum $A_s(\omega)$ in a state where the sample is disposed in sample holder 24. Second storage unit 406 non-volatilely stores Fourier spectrum $A_s^0(\omega)$ in a state where the sample is not disposed in the sample holder 24. Stored Fourier spectrum ($A_s(\omega)$ or $A_s^0(\omega)$) is appropriately read by transmittance calculation unit 407.

Transmittance calculation unit 407 calculates a complex transmittance spectrum $\tau(\omega)$ of the sample on the basis of Fourier spectrum $A_s(\omega)$ and Fourier spectrum $A_s^0(\omega)$. Transmittance calculation unit 407 outputs the calculation results of complex transmittance spectrum $\tau(\omega)$ to absorption spectrum calculation unit 408 and monitor control unit 409.

Absorption spectrum calculation unit 408 calculates an infrared absorption spectrum of the sample based on complex transmittance spectrum $\tau(\omega)$ of the sample. Absorption spectrum calculation unit 408 outputs the calculation results of the infrared absorption spectrum to monitor control unit 409.

Monitor control unit 409 causes monitor 5 to display the calculation results (the Fourier spectrum $A_s(\omega)$, complex transmittance spectrum $\tau(\omega)$, and infrared absorption spectrum of the sample) by controller 4.

<Details of Arithmetic Processing>

Next, the functions of some blocks will be described in detail. Hereinafter, a parameter denoted by "signal" is a parameter related to the signal photon. A parameter denoted by "idler" is a parameter related to the idler photon.

First, calculation processing by count rate calculation unit 403 will be described. A state vector |Ψ> obtained by superimposing two events (the above-described first and second physical processes) in which a quantum entangled photon pair is generated by nonlinear optical crystal 23 is described as the following formula (I).

[Expression 1]

$$|\Psi\rangle = |\Psi\rangle_1 + \Psi\rangle_2 = |vac\rangle + \sqrt{\eta}\int\int d\omega_s d\omega_i F(\omega_s, \omega_i) a_{s1}^{\dagger} a_{i1,in}^{\dagger} |vac\rangle + \sqrt{\eta}\, e^{-i\omega_p} \int\int d\omega_s d\omega_i F(\omega_s, \omega_i) a_{s2}^{\dagger} a_{i2,in}^{\dagger} |vac\rangle \tag{1}$$

In formula (1), a vacuum state vector is represented by |vac>. An SPDC generation efficiency is represented by $\eta$. A signal frequency is represented by $\omega_s$, and an idler frequency is represented by $\omega_i$. A two-photon field amplitude is represented by $F(\omega_s, \omega_i)$. Signal generation operators in the first and second physical processes are respectively represented by $a_{s1}^{+}$ and $a_{s2}^{+}$. An idler generation operator in the first physical process is represented by $a_{i1,in}^{+}$ or $a_{il,out}^{+}$. When the idler light generated in the first physical process is transmitted through the sample disposed on the idler optical path, before and after the transmission of the sample are distinguished by adding a subscript in to the generation operator corresponding to the idler light before being transmitted through the sample, and adding a subscript out to the generation operator corresponding to the idler light after being transmitted through the sample. An idler generation operator in the second physical process is represented by $a_{i2}^{+}$. Phase delay obtained by the pump light corresponding to the optical path difference of the pump light between the first physical process and the second physical process is represented by $\varphi_p$.

When optical loss due to the sample disposed on the idler optical path is evaluated according to a beam splitter model, an idler extinction operator $a_{i1,out}$ after being transmitted through the sample is represented as the following formula (2).

[Expression 2]

$$\alpha_{i1,out} = \tau^2 \alpha_{i1,in} + r\tau\alpha_{v1} + r\alpha_{v2} \tag{2}$$

In formula (2), the complex transmittance (complex transmission amplitude) of the sample is represented by r, and the complex reflectance (complex reflection amplitude) of the sample is represented by r. In a beam splitter model representing the j-th (=1, 2) transmission of the sample, a vacuum field incident from a port different from a port to which the idler photon is input is represented by $a_{vj}$.

The mode of the signal light generated in the first physical process is adjusted to spatially coincide with the mode of the signal light generated in the second physical process. The mode of the idler light generated in the first physical process is adjusted to spatially coincide with the mode of the idler light generated in the second physical process. These modes can be represented by the same generation/extinction operator except for a change in phase due to propagation as shown by the following formulae (3) and (4).

[Expression 3]

$$a_{s1} = e^{-i\omega_s t_1} a_{s2} \tag{3}$$

$$a_{i1,out} = e^{-i\omega_i t_0} a_{i2} \tag{4}$$

In formulae (3) and (4), a propagation time until the signal light generated in the first physical process reaches nonlinear optical crystal 23 again is represented by $t_1$. Similarly, in a situation where the sample is not disposed on the idler optical path, a propagation time until the idler light generated in the first physical process reaches nonlinear optical crystal 23 again is represented by $t_0$.

Next, the electric field $E_s^{(+)}(t)$ of the signal light in photodetector 31 is represented by the following formula (5).

[Expression 4]

$$E_s^{+}(t)|\Psi\rangle \propto \int \alpha_{s2}(\omega) e^{-i\omega t} d\omega |\Psi\rangle \tag{5}$$

Signal photon count rate Ps is described as the following formula (6) using state vector |Ψ> represented by formula (1).

[Expression 5]

$$P_s = \langle \Psi | E_s^{-} E_s^{+} | \Psi \rangle \tag{6}$$

The following formula (7) is derived by substituting formulae (1) to (4) into formula (5). Formula (7) represents the time waveform of the quantum interference (quantum beat) between the first and second physical processes generating the quantum entangled photon pair.

[Expression 6]

$$E_s^{+}(t)|\Psi\langle \propto \iint d\omega_s d\omega_i F(\omega_s,\omega_i)[e^{-i\omega_s{}^{t+i(\Psi}{}_{p-\omega i}{}^{t}{}_{0)}}(\tau^{*2}{}_{ai1,in}{}^{t} + r\tau\alpha_{v1}{}^{t} + r\alpha_{v2}{}^{t}) + e^{-t\omega_s{}^{(t-t}{}_{1)}}\alpha_{i1,in}{}^{t}]|vac\rangle \tag{7}$$

Here, a signal frequency $\omega_s$ is redefined using detuning Ω from a center frequency $\omega_{s0}$. That is, $\omega_s=\omega_{s0}-\Omega$ is represented. Similarly, an idler frequency $\omega_i$ is represented as $\omega_i=\omega_{i0}+\Omega$ using detuning Ω from a center frequency $\omega_{i0}$. Then, from the above formulae (6) and (7), signal photon count rate $P_s$ is transformed as in the following formula (8).

[Expression 7]

$$P_s \propto \int d\Omega |F(\Omega)|^2 + \left(|r|^2|r|^2 + |r|^2 + \left|e^{-i(\omega_{s0}-\Omega)(t-t_1)} + \tau^{*2} e^{-i((\omega_{s0}-\Omega)t-\varphi_p+(\omega_{i0}+\Omega)t_0)}\right|^2\right) = \int d\Omega |F(\Omega)|^2 \left(2 + \tau^{*2} e^{-i\Omega(t_0-t_1)} e^{i(\varphi_p-\omega_{s0}t_1-\omega_{i0}t_0)} + c.c.\right) \tag{8}$$

In an experimental apparatus disclosed in NPL 1, a spectroscope (monochromator) is disposed at the preceding stage of an avalanche photodiode (APD) (see FIG. 2 of NPL 1). The installation of the spectroscope indicates that the signal photon reaching the APD are limited to a narrow-bandwidth photon, thereby narrowing the infrared absorption spectrum. This is because, in NPL 1, the absorption at the wavelength of the idler photon corresponding to the signal photon is estimated by limiting the wavelength of the signal photon to a narrow wavelength range to the same degree of the resolution of the spectroscope and measuring light intensity for each wavelength range of the signal photon upon the limitation.

As described above, in NPL 1, it is essential in nature to spectrally disperse (measure the wavelength) the signal light using the spectroscope and to measure the light intensity of the signal light for each of the spectrally dispersed wavelengths. In general, a device including a spectroscope may increase in size or price. Since the wavelength scanning of the spectroscope requires time, it may be an obstacle in shortening the measurement time.

Also in an optical system disclosed in PTL 1, a filter system 524 is disposed at the preceding stage of a photodetector 510 (see FIG. 5A and a second paragraph from the bottom of an 11th column in PTL 1). Filter system 524 subjects signal light to wavelength selection in addition to removal of unnecessary pump light. As described above, PTL 1 considers that only the signal photon in a specific narrow wavelength range is limited in advance to reach photodetector 510, and the signal photon is merely measured upon the limitation.

In contrast, in the present embodiment, the entire frequency-bandwidth signal photon generated by nonlinear optical crystal 23 is detected by photodetector 31 without passing through a spectroscope or an unnecessary filter. This is based on the idea of not limiting any frequency band in which the frequency (signal frequency) $\omega_s$ of the signal photon detected by photodetector 31 is included, and including all possibilities when signal photon count rate $P_s$ is obtained. This idea is also expressed by integrating a frequency component (detuning Ω) in the above formula (8).

Furthermore, in the present embodiment, in consideration of the frequency dependence of the complex transmittance T and the complex reflectance r of the sample, both the complex transmittance c and the complex reflectance r are functions of the idler frequency $\omega_i$($\tau \rightarrow \tau(\omega_i)$, $r \rightarrow r(\omega_i)$). In this case, the following formula (9) is obtained from formula (8).

[Expression 8]

$$P_s(t_0) \propto \int d\Omega |F(\Omega)|^2 + \left(2 + (\tau^*(\omega_{i0}+\Omega))^2 e^{-i\Omega(t_0-t_1)} e^{i(\varphi_p-\omega_{s0}t_1-\omega_{i0}t_0)} + c.c.\right) = 2 + e^{i(\varphi_p-\omega_{s0}t_1)} \int d\Omega |F(\Omega)|^2 \left((\tau^*(\omega_{i0}+\Omega))^2 e^{-i\Omega(t_0-t_1)-i\omega_{i0}t_0}\right) + c.c. \tag{9}$$

In formula (9), the first term (constant term of 2) represents an offset component of signal photon count rate $P_s$. The second term (integral term) and the third term (complex conjugate term) represent a quantum interference component of signal photon count rate $P_s$. Since the optical path length of the signal light in the two physical processes of generating the quantum entangled photon pair is constant, a propagation time $t_1$ is a fixed value. The following formula (10) representing the normalization condition of the two-photon field amplitude is established. Therefore, it can be seen from formula (9) that signal photon count rate $P_s$ is a value depending on idler propagation time $t_0$. Therefore, signal photon count rate $P_s(t_0)$ with respect to various idler propagation times to can be measured by periodically changing the idler optical path length (sweeping the idler optical path) in accordance with the reciprocation of moving mirror 25. A signal related to signal photon count rate $P_s$ measured in this manner is referred to as a "quantum interference signal" (or a quantum interference waveform).

[Expression 9]

$$d\Omega |F(\Omega)|^2 = 1 \tag{10}$$

Next, arithmetic processing provided by Fourier transform unit 404 will be described. Fourier transform unit 404 performs Fourier transform on the quantum interference signal (see the above formula (9)) measured while changing the idler optical path length. Thus, Fourier spectrum $A_s(\omega)$ is obtained as in the following formula (11), and information for each wavelength of infrared light absorbed by the sample is reproduced. In the Fourier integral shown by formula (11), an integral term of a constant that gives a DC component and a complex conjugate term that gives a −ω component are omitted.

[Expression 10]

$$
\begin{aligned}
A_s(\omega) &= \frac{1}{2\pi}\int P_s(t_0)e^{i\omega t_0}dt_0 \qquad (11)\\
&\propto e^{i(\varphi_p-\omega_{s0}t_1)}\int\int dt_0 d\Omega |F(\Omega)|^2((\tau^*(\omega_{i0}+\\
&\quad \Omega))^2 e^{-i\Omega(t_0-t_1)-i\omega_{i0}t_0}e^{i\omega t_0})\\
&= e^{i(\varphi_p-\omega_{s0}t_1)}\int\int dt_0 d\Omega |F(\Omega)|^2((\tau^*(\omega_{i0}+\\
&\quad \Omega))^2 e^{i\Omega t_1}e^{-i(\Omega-(\omega-\omega_{i0}))t_0})\\
&= e^{i(\varphi_p-\omega_{s0}t_1)}\int d\Omega |F(\Omega)|^2((\tau^*(\omega_{i0}+\\
&\quad \Omega))^2 e^{i\Omega t_1}\delta(\Omega-(\omega-\omega_{i0})))\\
&= e^{i(\varphi_p-\omega_{s0}t_1)}|F(\omega-\omega_{i0})|^2(\tau^*(\omega))^2 e^{i(\omega-\omega_{i0})t_1}\\
&= e^{i(\varphi_p-(\omega_{s0}-\omega_{i0})t_1))}|F(\omega-\omega_{i0})|^2(\tau^*(\omega))^2 e^{i\omega t_1}
\end{aligned}
$$

Next, calculation processing by transmittance calculation unit 407 will be described. As described above, the Fourier spectrum when the sample is disposed on the idler optical path is described as $A_s(\omega)$, and the Fourier spectrum when the sample is not disposed on the idler optical path is described as $A_s^0(\omega)$, thereby distinguishing both the Fourier spectra from each other. Fourier spectrum $A_s^0(\omega)$ corresponds to the complex transmittance $\tau=1$ of the sample in the above formula (11). Therefore, when the difference in the Fourier spectrum due to the presence or absence of the sample, more specifically, the amplitude ratio of Fourier spectrum $A_s(\omega)$ to Fourier spectrum $A_s^0(\omega)$ is calculated, the following formula (12) is derived.

[Expression 11]

$$A_s(\omega)/A_s^0(\omega)=(\tau^*(\omega))^2 \qquad (12)$$

From formula (12), it can be seen that the frequency dependence of the complex transmittance $\tau$ of the sample (that is, complex transmittance spectrum $\tau(\omega)$) is obtained by performing two measurements with and without the sample and taking the ratio of the two Fourier spectra.

Finally, calculation processing by absorption spectrum calculation unit 408 will be described. Absorption spectrum calculation unit 408 calculates the (intensity) absorption spectrum of the sample in the infrared range by calculating the square of the absolute value of complex transmittance spectrum $\tau(\omega)$.

As described above, the quantum interference signal in the present embodiment is not generated on the basis of light in a specific wavelength range obtained from the signal light being wavelength-resolved using a spectroscope. The quantum interference signal in the present embodiment is generated on the basis of the signal light in all the wavelength ranges produced by nonlinear optical crystal 23 and enters photodetector 31 after passing through quantum optical system 201. Therefore, according to the present embodiment, infrared absorption spectroscopy in a wide wavelength range can be achieved as compared with the case of using a spectroscope. In other words, according to the present embodiment, it is possible to obtain a complex transmittance spectrum of a sample for a wide wavelength range by one light detection without requiring light detection for each wavelength range in principle (more specifically, without requiring the wavelength sweep of the quantum entangled photon pair using a micro electro mechanical systems (MEMS) based wavelength tunable resonator or the like, and without requiring the signal light being wavelength-resolved using a spectroscope or the like).

By sweeping the idler optical path, signal photon count rate $P_s$ (quantum interference signal) is calculated as the function of idler propagation time $t_0$ (see the above formula (9)). The quantum interference signal in a time region is Fourier-transformed into a frequency region, thereby obtaining Fourier spectrum $A_s(\omega)$ (see the above formula (11)). By analyzing Fourier spectrum $A_s(\omega)$, the absolute value of the transmittance of the sample can be calculated from the intensity change of the transmitted light of the sample. In addition, in the present embodiment, how the phase of the transmitted light is shifted depending on the presence or absence of the sample is obtained. More specifically, a ratio between Fourier spectrum $A_s(\omega)$ when the sample is disposed on the idler optical path and Fourier spectrum $A_s^0(\omega)$ when the sample is not disposed on the idler optical path is calculated (see the above formula (11)). By this calculation, it is also possible to calculate complex transmittance spectrum $\tau(\omega)$ of the sample in a wide wavelength range. Furthermore, the infrared absorption spectrum of the sample in a wide wavelength range can also be calculated based on complex transmittance spectrum $\tau(\omega)$ of the sample.

<Measurement Flow>

Figure 4:
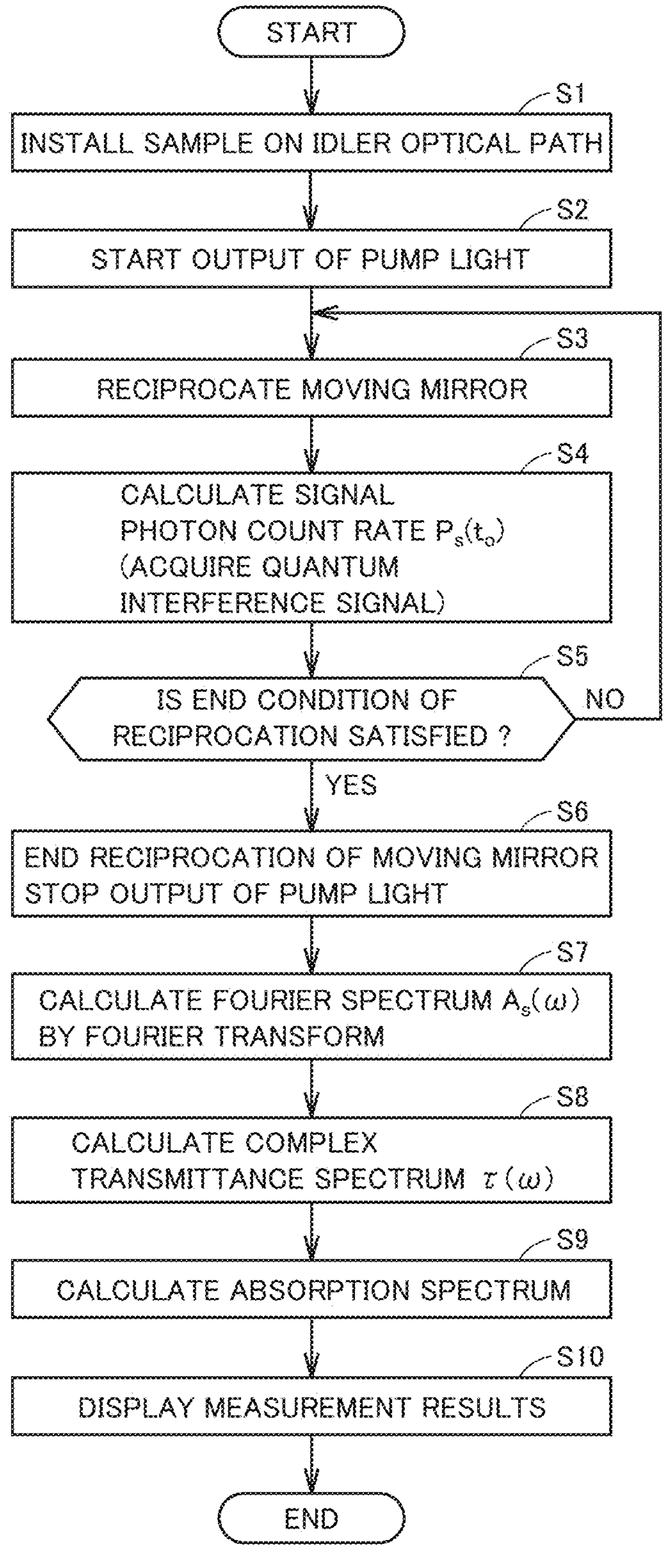
FIG. 4 is a flowchart showing the processing procedure of a quantum absorption spectroscopy method in the first embodiment.

FIG. 4 is a flowchart showing the processing procedure of a quantum absorption spectroscopy method in the first embodiment. This flowchart is called from a main routine and executed, for example, when an input device (not shown) such as an operation button receives the operation of an operator. Each step is basically achieved by software processing by a controller 4, but may be achieved by hardware processing by an electronic circuit produced in controller 4. Hereinafter, step is abbreviated as "S".

In S1, a sample is installed in a sample holder 24 disposed on an idler optical path. The sample is usually installed by an operator. However, the placement can also be automated by providing a feed device (not shown) that conveys the sample.

In S2, controller 4 controls a laser light source 1 to start the output of pump light.

In S3, controller 4 controls a drive device 250 provided with a moving mirror 25 so as to start or continue a high-speed reciprocating motion. Generally, the signal-noise ratio of an infrared absorption spectrum can be improved by integrating light detection results. Therefore, in S3, moving mirror 25 reciprocates several tens of times per second in a range of sub millimeters (for example, several tens of micrometers) to several centimeters (for example, maximum of 5 cm). However, when the integration is not required, or when high speed performance is required such as acquisition of the time change of the infrared absorption spectrum, the reciprocating motion may be performed only once.

In order to calculate the complex transmittance spectrum of the sample with high accuracy, it is required to measure the phase change of transmitted light according to the presence or absence of the sample with high accuracy. For this purpose, it is desirable to stabilize the optical path length of each of signal light and pump light at a subwavelength scale of, for example, less than or equal to 25 nm. It is desirable that a drive device 250 that drives moving mirror 25 has positioning accuracy of a subwavelength scale. However, the accuracy of the optical path length, and the positioning accuracy of drive device 250, and the like can be appropriately determined according to performance (resolution and/or stability) and the like required for a quantum absorption spectroscopy system 100.

In S4, controller 4 calculates a signal photon count rate $P_s(t_0)$ based on a detection signal from a photodetector 31.

In S5, controller 4 determines whether a condition (end condition) for ending the reciprocating motion of moving mirror 25 is satisfied. For example, controller 4 can determine that the end condition is satisfied when signal photon count rate $P_s(t_0)$ is calculated while moving mirror 25 is reciprocated for a specified number of times or a specified time. When the end condition is not satisfied (NO in S5), controller 4 returns the processing to S3. As a result, the processing of S3 and S4 are repeated until data for the specified number of times or the specified time is acquired. When the end condition is satisfied (YES in S5), controller 4 advances the processing to S6.

In S6, controller 4 controls laser light source 1 to stop the output of the pump light. Controller 4 controls drive device 250 of moving mirror 25 so as to stop the reciprocating motion of moving mirror 25.

In S7, controller 4 calculates a Fourier spectrum $A_s(\omega)$ by performing Fourier transform on signal photon count rate $P_s(t_0)$ (quantum interference signal) in a state where the sample is disposed on the idler optical path.

Although not shown, a Fourier spectrum $A_s^0(\omega)$ has been acquired by the same processing in a state where the sample is not disposed (so-called background measurement) on the idler optical path before the series of processing S1 to S7 are executed. In S8, controller 4 calculates a complex transmittance spectrum $\tau(\omega)$ of the sample based on Fourier spectrum $A_s^0(\omega)$ calculated by the series of processing and Fourier spectrum $A_s^0(\omega)$ acquired in advance. When the background measurement is not performed, Fourier spectrum $A_s^0(\omega)$ can be acquired by executing the same processing as the processing of S1 to S7 without disposing the sample.

In S8, controller 4 calculates a complex transmittance spectrum $\tau(\omega)$ of the sample by calculating a ratio between Fourier spectrum $A_s^0(\omega)$ (reference Fourier spectrum) in a state where the sample is not disposed on the idler optical path and Fourier spectrum $A_s(\omega)$ in a state where the sample is disposed on the idler optical path.

In S9, controller 4 calculates the infrared absorption spectrum of the sample by calculating the square of the absolute value of complex transmittance spectrum $\tau(\omega)$ of the sample.

In S10, controller 4 controls a monitor 5 so as to display the measurement results of the infrared absorption spectroscopy characteristic of the sample by the processing of S1 to S9. Specifically, controller 4 outputs the results of the processing of S7, and causes monitor 5 to display Fourier spectrum $A_s(\omega)$ in a state where the sample is disposed on the idler optical path. Controller 4 outputs the results of the processing of S8 and causes monitor 5 to display the complex transmittance spectrum $\tau(\omega)$ of the sample. Furthermore, controller 4 outputs the results of the processing of S9 and causes monitor 5 to display the infrared absorption spectrum of the sample.

As described above, in first embodiment, all the signal lights having passed through a quantum optical system 201 are detected by photodetector 31 without being spectrally dispersed (wavelength-resolved or frequency-resolved) by a spectroscope or removed by a filter. Fourier spectrum $A_s(\omega)$ is calculated by Fourier transform of the quantum interference signal. Since information in all wavelength ranges is reflected in Fourier spectrum $A_s(\omega)$, infrared absorption spectroscopy in a wide wavelength range can be performed as compared with a configuration including a spectroscope that reflects only information in a specific wavelength range (see NPL 1). Furthermore, the phase information of the sample can be acquired from the difference in the Fourier spectrum depending on the presence or absence of the sample disposed on the idler optical path.

In general Fourier transform infrared spectroscopy (FTIR) in which a classical optical system is used, light intensity incident on a sample is relatively large, whereby the sample may have a high temperature. Meanwhile, in the first embodiment in which the quantum optical system is used, the light intensity incident on the sample is significantly reduced. As described with reference to specific numerical values, in First Example to be described later, the intensity of idler light was about 100 fW ($1\times10^{-13}$ W). This means that the light intensity is smaller at least nine orders of magnitude than that of general FTIR. Therefore, according to the first embodiment, it is possible to measure the infrared absorption spectroscopy characteristic of the sample while suppressing characteristic change of the sample (which may include degradation and damage of the sample) due to heating by infrared light irradiation.

In the first embodiment, visible-range laser light source 1 and visible-range photodetector 31 are used instead of the conventional infrared-range light source and infrared-range photodetector. By using the visible-range light source, heat countermeasures are facilitated, whereby the system can be downsized. By using a photodetector having high sensitivity in the visible range, cooling with liquid nitrogen for reducing thermal noise becomes unnecessary, whereby the system can also be downsized. As a result, according to the first embodiment, it is possible to achieve measurement at a site where the sample is collected (so-called on-site measurement).

In the first embodiment, the infrared absorption spectroscopy in the near-infrared range has been described as an example, but the infrared light used for the infrared absorption spectroscopy is not limited to the near-infrared light. The quantum absorption spectroscopy according to the present disclosure is also applicable to mid-infrared light, far-infrared light, or terahertz light. When an infrared range is to be measured, the quantum absorption spectroscopy (QAS) according to the present disclosure can be referred to as quantum Fourier transform infrared spectroscopy (Q-FTIR). The light with which nonlinear optical crystal 23 is irradiated is not also limited to visible light, and may be ultraviolet light or infrared light.

Furthermore, although it has been described that the SPDC of the pump light is used to generate the quantum entangled photon pair, a four-wave mixing process may be used instead of the SPDC. When the four-wave mixing process is used, a signal photon and/or an idler photon having a shorter wavelength than the wavelength of the pump light can be generated. Therefore, it is also possible to measure the absorption spectroscopy characteristic of the sample in the ultraviolet range or the visible range by the quantum absorption spectroscopy system according to the present disclosure (see Eighth Example to be described later).

Hereinafter, various variations of the quantum absorption spectroscopy system according to the present disclosure will be described in order. For the sake of organization, the features of embodiments and modifications are briefly summarized below.

First Embodiment: Basic Configuration

Modification of First Embodiment: Basic Configuration+ Dispersive Element

Second Embodiment: Quasi-Phase-Matched Device

Third Embodiment: Single-Pixel Photodetector

First Modification of Third Embodiment: Single-Pixel Photodetector+Quasi-Phase-Matched Device Second Modification of Third Embodiment: Single-Pixel Photodetector+Circular Polarization Measurement Fourth Embodiment: Idler Optical Path Sweep+Signal Optical Path Sweep Modification of Embodiment 4: Signal Light Path Sweep+Total Reflection Measurement

Modification of First Embodiment

Figure 5:
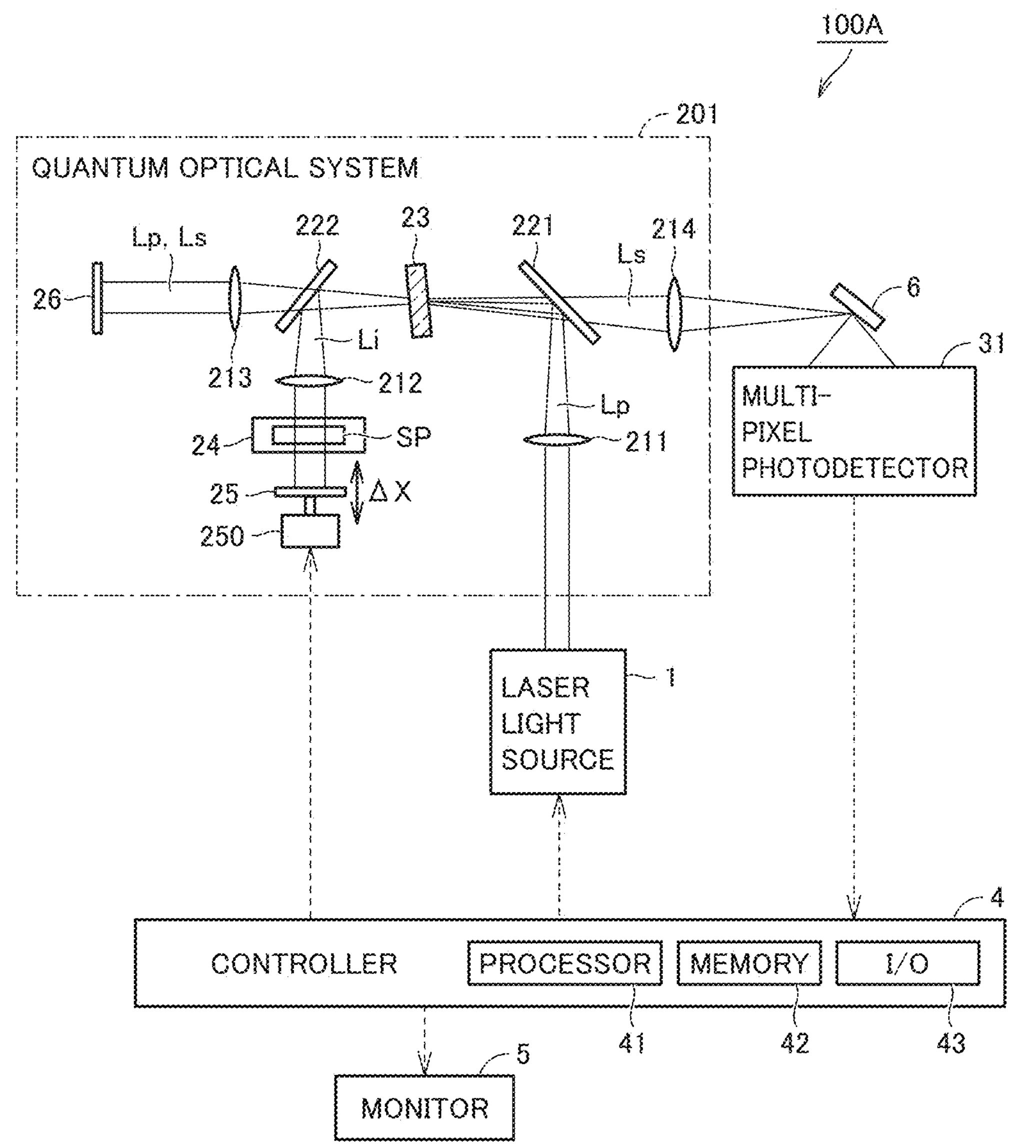
FIG. 5 is a diagram showing the overall configuration of a quantum absorption spectroscopy system according to a modification of the first embodiment.

FIG. 5 is a diagram showing the overall configuration of a quantum absorption spectroscopy system according to a modification of the first embodiment. A quantum absorption spectroscopy system 100A is different from quantum absorption spectroscopy system 100 according to the first embodiment (see FIG. 1) in that a dispersive optical element 6 is further provided between the output side (lens 214) of a quantum optical system 201 and a photodetector 31.

Dispersive optical element 6 is, for example, a diffraction grating (grating) or a prism, and disperses signal light output from quantum optical system 201 in different directions according to wavelengths. Thus, multi-pixel photodetector 31 measures the light intensities of signal lights having different wavelengths by each of a plurality of pixels arranged in an array. Features of calculating a Fourier spectrum $A_s(\omega)$ in quantum absorption spectroscopy system 100A will be described later with reference to FIG. 10.

Second Embodiment

In the second embodiment, a configuration for achieving infrared absorption spectroscopy in a wider wavelength range by expanding the wavelength range of idler light will be described.

Figure 6:
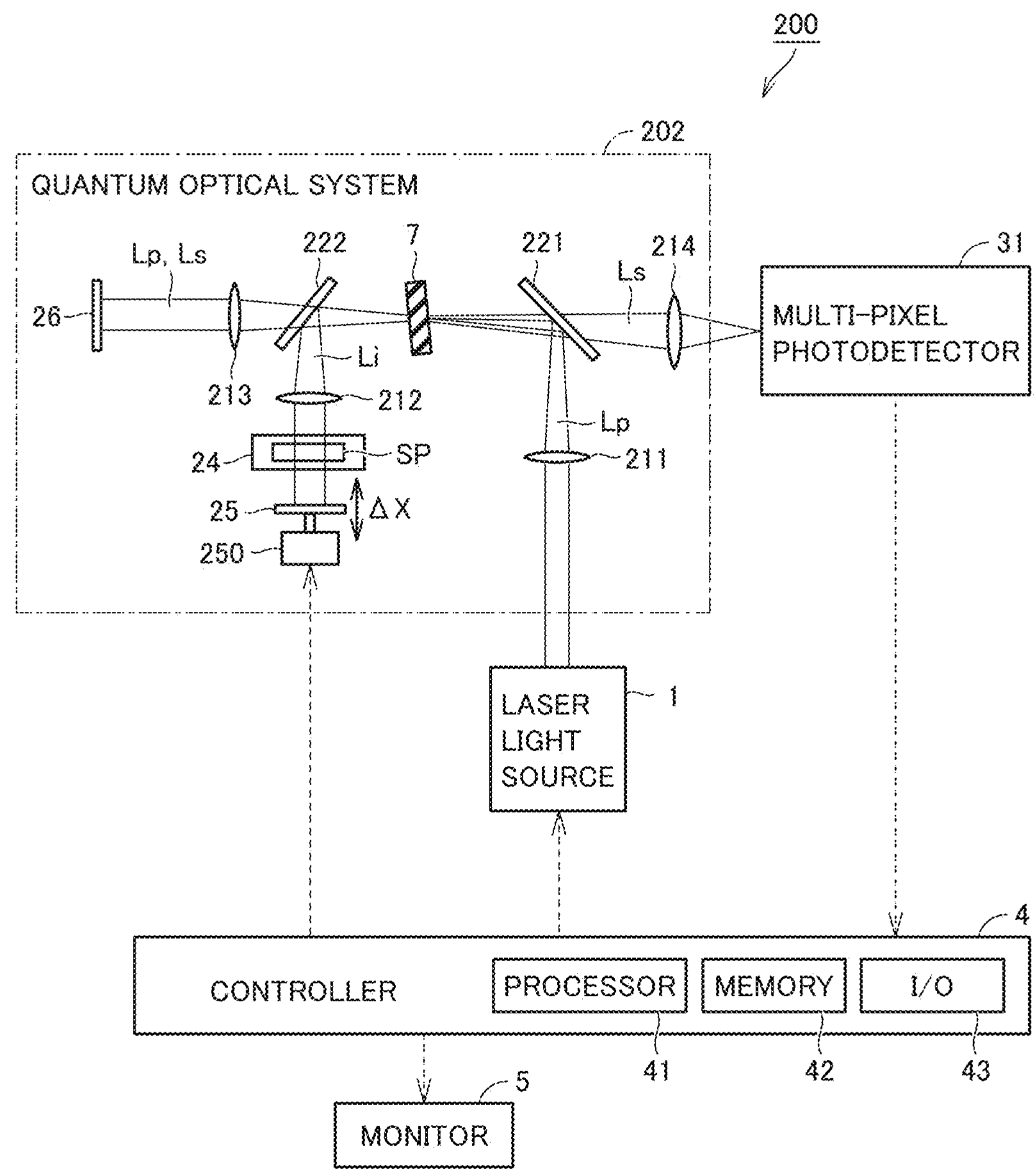
FIG. 6 is a diagram showing the overall configuration of a quantum absorption spectroscopy system according to a second embodiment.

FIG. 6 is a diagram showing the overall configuration of a quantum absorption spectroscopy system according to a second embodiment. A quantum absorption spectroscopy system 200 is different from quantum absorption spectroscopy system 100 according to the first embodiment (see FIG. 1) in that a quantum optical system 202 is included instead of quantum optical system 201. Quantum optical system 202 includes a quasi-phase-matched (QPM) device 7 instead of nonlinear optical crystal 23.

Figure 7:
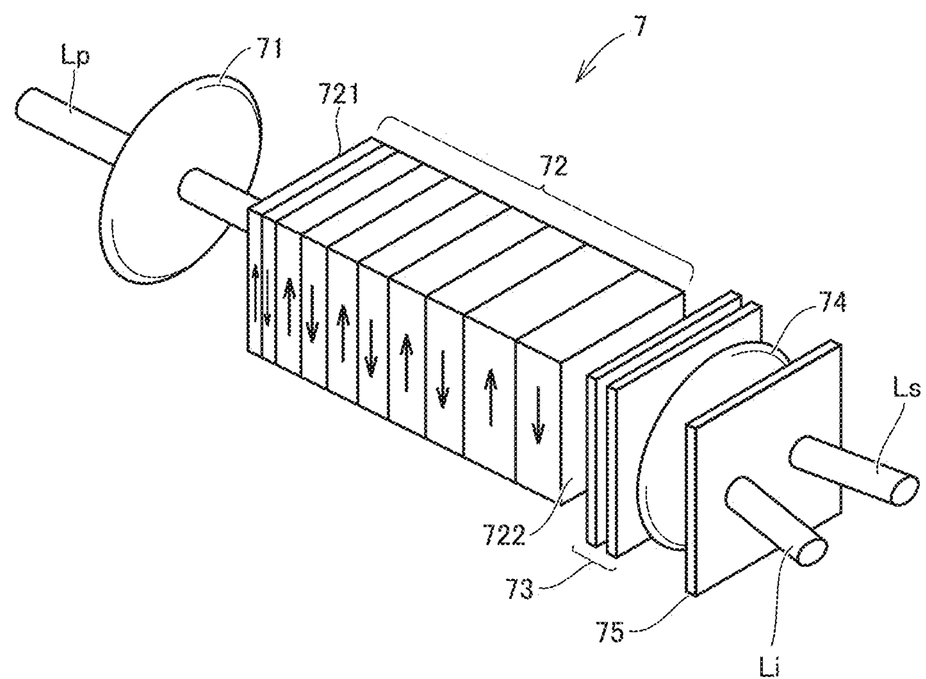
FIG. 7 is a diagram showing the configuration example of a quasi-phase-matched device.

FIG. 7 is a diagram showing the configuration example of QPM device 7. QPM device 7 includes a lens 71, a nonlinear optical crystal 72, a long pass filter 73, a lens 74, and a sharp cut filter 75.

Nonlinear optical crystal 72 has a periodical poling structure. An arrow in the drawing indicates a spontaneous polarization direction. The material of nonlinear optical crystal 72 is, for example, Mg doped stoichiometric lithium tantalate, also referred to as Mg: SLT. Nonlinear optical crystal 72 has a rectangular parallelepiped shape. When pump light is incident on one end (first end) 721 of end surfaces facing each other of nonlinear optical crystal 72, a signal photon and an idler photon are emitted from the other end (second end) 722. Nonlinear optical crystal 72 has, for example, five poling structures (also referred to as sections or segments) between first end 721 and second end 722. The typical number of divisions of the section provided in nonlinear optical crystal 72 is about several tens. As shown in FIG. 7, the width (poling period Λ) of the section gradually increases from first end 721 toward second end 722. By appropriately designing the number of divisions of the section and poling period Λ, it is possible to generate a quantum entangled photon pair over a wide wavelength range (see FIGS. 21 and 22 for details).

Nonlinear optical crystal 72 can be manufactured using a nanoengineering polarization technology. In the nanoengineering polarization technology, first, a resist pattern is drawn by electron beam lithography. Next, the resist pattern is transferred to aluminum by dry etching. Thereafter, a strong electric field is applied to an aluminum electrode in vacuum. The structure and manufacturing method of QPM device 7 can be described in detail with reference to NPL 2.

Each of long pass filter 73 and sharp cut filter 75 cuts light having a wavelength shorter than a specific wavelength among the pump light. However, long pass filter 73 and sharp cut filter 75 may be omitted.

QPM device 7 corresponds to a “quasi-phase-matched element” according to the present disclosure. QPM device 7 shown in FIG. 7 is a chirp-type element in which a poling period changes along an optical path. However, the quasi-phase-matched element according to the present disclosure may be a fan-type (fan-out structure) element in which the poling period changes into a fan shape.

As described above, in the second embodiment, the idler photon is generated using QPM device 7 disposed on the optical path of the pump light. As will be described in detail later with reference to FIGS. 21 to 23, it is possible to generate idler light having a flat intensity distribution over the entire wavelength range by selecting an appropriate material for nonlinear optical crystal 72 and appropriately designing poling period Λ. Therefore, according to the second embodiment, the wavelength range in which infrared absorption spectroscopy can be performed can be further expanded as compared with the first embodiment.

In the present disclosure, a method for expanding the wavelength range in which infrared absorption spectroscopy can be performed is not limited to the method using the “quasi-phase-matched element”. Even when bulk-type nonlinear optical crystal 23 is used as in the first embodiment, it is possible to expand the wavelength range in which infrared absorption spectroscopy can be performed. Specifically, a sample holder 24 holding nonlinear optical crystal 23 may be disposed on a rotation stage (not shown), and the rotation stage may be rotated by a predetermined angle every time a signal photon count rate Ps is measured. The idler photons having various wavelengths can be generated by changing the orientation of the nonlinear optical crystal 23 (the inclination of the optical axis of nonlinear optical crystal 23 with respect to the incident direction of the pump light) by the rotation of the rotation stage.

However, in the above case, the procedure of measuring signal photon count rate Ps by rotating the rotation stage needs to be repeatedly performed, whereby the measurement time may be long. In addition, arithmetic processing for calculating the complex transmittance spectrum of the sample may be complicated. That is, the complex transmittance is calculated using the measurement results of signal photon count rate Ps for each angle of the rotation stage, and then the frequency dependence of the calculated complex transmittance is plotted, whereby the complex transmittance spectrum is obtained for the first time. Meanwhile, when the "quasi-phase-matched element" is used, the complex transmittance spectrum can be calculated only from the measurement results of one signal photon count rate Ps.

Third Embodiment (+ First Modification)

In the first and second embodiments, the configuration in which multi-pixel photodetector 31 in which a plurality of pixels are arranged in a two-dimensional array is employed has been described. However, when the arithmetic processing of the quantum absorption spectroscopy according to the present disclosure is used, a multi-pixel photodetector (multi-channel detector) is not necessarily required. In the third embodiment (and modification), a configuration in which a single-pixel photodetector (single-channel detector) is employed will be described.

Figure 8:
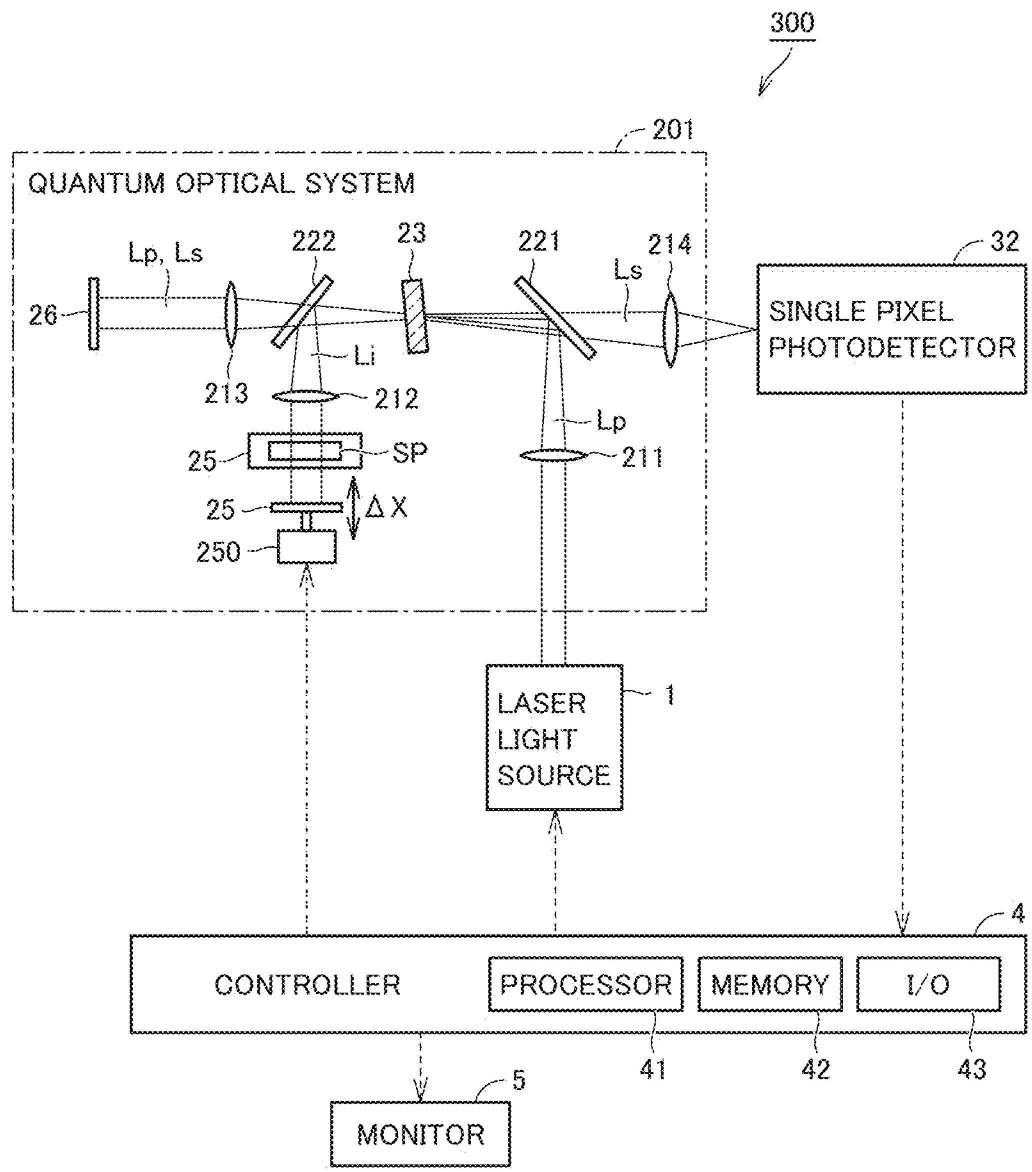
FIG. 8 is a diagram showing the overall configuration of a quantum absorption spectroscopy system according to a third embodiment.

FIG. 8 is a diagram showing the overall configuration of a quantum absorption spectroscopy system according to a third embodiment. A quantum absorption spectroscopy system 300 is different from quantum absorption spectroscopy system 100 according to the first embodiment (see FIG. 1) in that a single-pixel photodetector 32 is provided instead of multi-pixel photodetector 31.

Figure 9:
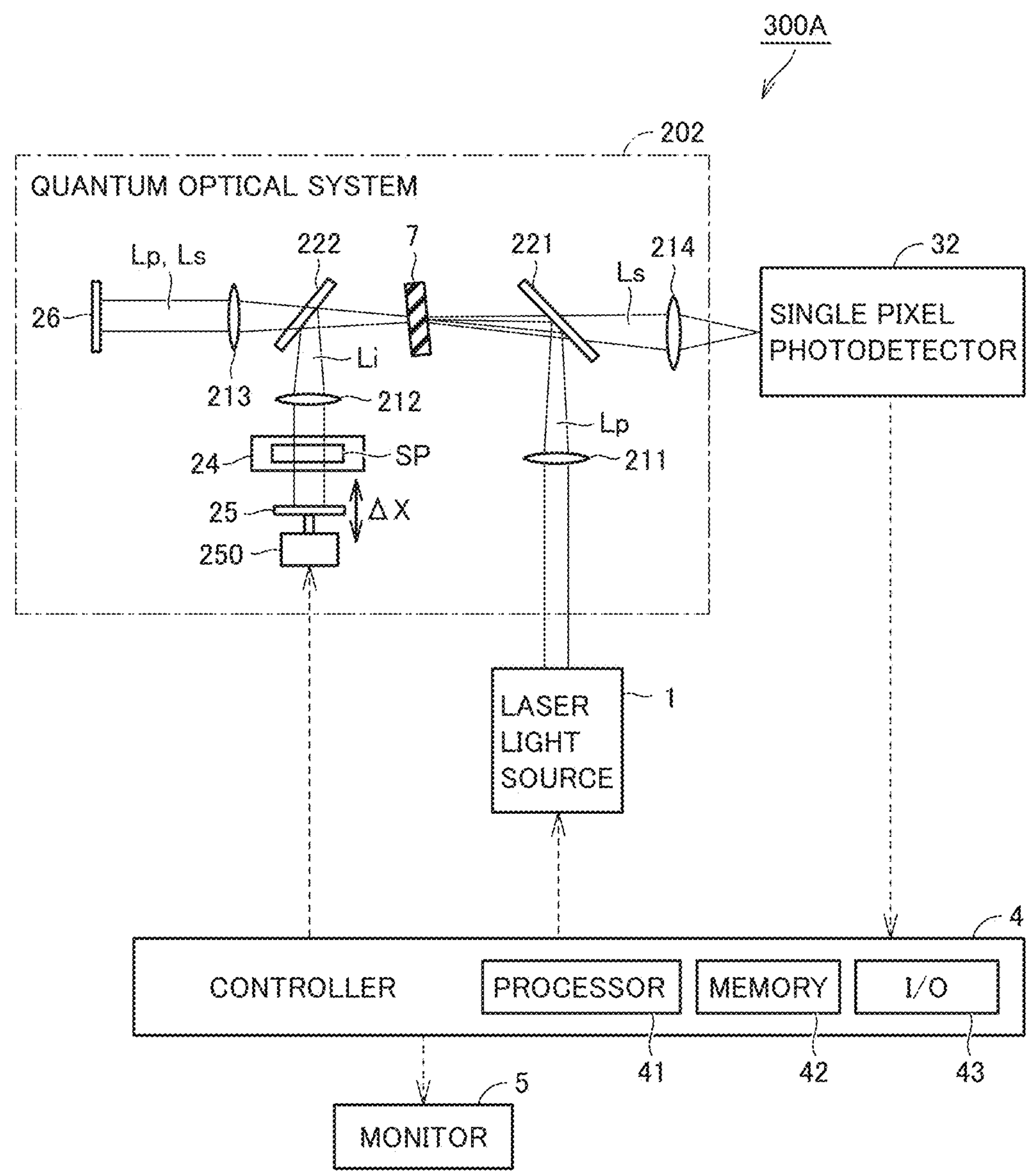
FIG. 9 is a diagram showing the overall configuration of a quantum absorption spectroscopy system according to a first modification of the third embodiment.

FIG. 9 is a diagram showing the overall configuration of a quantum absorption spectroscopy system according to a first modification of the third embodiment. A quantum absorption spectroscopy system 300A is different from quantum absorption spectroscopy system 100 according to the first embodiment (see FIG. 1) in that single-pixel photodetector 32 is included, and quantum optical system 202 including QPM device 7 (see FIG. 7) is included instead of quantum optical system 201.

Referring to FIGS. 8 and 9, single-pixel photodetector 32 is, for example, a photodiode such as a PIN photodiode or an APD. However, a photoelectric tube or a photomultiplier tube may be used instead of the photodiode. In order to obtain a high signal-noise ratio, a superconducting single photon detector (SSPD) can also be employed. Photodetector 32 detects signal light in response to a control command from a controller 4 and outputs the detection signal to controller 4.

The configuration of quantum absorption spectroscopy system 300 other than photodetector 32 is common to the corresponding configuration of quantum absorption spectroscopy system 100 according to the first embodiment. The configuration of quantum absorption spectroscopy system 300A other than photodetector 32 is common to the corresponding configuration of quantum absorption spectroscopy system 200 according to the second embodiment (see FIG. 6). Furthermore, the processing procedure of the quantum absorption spectroscopy method in the third embodiment and the modification thereof is also similar to the processing procedure of the quantum absorption spectroscopy method in the first embodiment (see FIG. 4). Therefore, the detailed description will not be repeated.

FIG. 10 is a conceptual diagram for describing a difference in a detection principle according to the type of a photodetector. Here, the two configurations will be described in comparison. The first configuration (see above) is a configuration in which a typical nonlinear optical crystal 23 and a multi-pixel photodetector 31 are combined. Although not shown in FIG. 10, a dispersive optical element 6 (see FIG. 5) may be disposed between nonlinear optical crystal 23 and photodetector 31. The second configuration (see below) is a configuration in which QPM device 7 and single-pixel photodetector 32 are combined.

First, referring to the first configuration, the emission direction of a signal photon generated by SPDC in nonlinear optical crystal 23 has wavelength dependency. Therefore, when multi-pixel photodetector 31 is used, signal lights having different frequencies are detected by respective pixels. In other words, in each pixel of photodetector 31, the signal light divided into a single color is detected. Therefore, in order to provide the wide bandwidth of the infrared absorption spectroscopy, it is conceivable to calculate a Fourier spectrum $A_s(\omega)$ by Fourier transform of a signal photon count rate $P_s(t_0)$ for each pixel. However, it is necessary to synthesize Fourier spectra $A_s(\omega)$ obtained from the respective pixels to achieve infrared absorption spectroscopy in a wide wavelength range.

In contrast, in the second configuration, the signal photon generated by the SPDC in QPM device 7 is guided to single-pixel photodetector 32 without being spatially divided. Then, signal light that may include all frequency components is detected by one single-pixel photodetector 32. Therefore, infrared absorption spectroscopy in a wide wavelength range can be achieved only by performing Fourier transform on single signal photon count rate $P_s(t_0)$ (quantum interference signal) acquired using photodetector 32 to calculate Fourier spectrum $A_s(\omega)$.

As described above, in the third embodiment, signal photon count rate $P_s(t_0)$ is calculated using single-pixel photodetector 32, and Fourier spectrum $A_s(\omega)$ is calculated therefrom. In the first configuration, the signal light divided into single colors must be aligned pixel by pixel in multi-pixel photodetector 31. Meanwhile, in the third embodiment corresponding to the second configuration, it is only necessary to take the signal light into single-pixel photodetector 32, so that the optical system can be easily adjusted. In the third embodiment, it is not necessary to calculate Fourier spectrum $A_s(\omega)$ for each pixel. Furthermore, the synthesis of Fourier spectra $A_s(\omega)$ from a plurality of pixels is not also required. Therefore, the calculation load of controller 4 can also be reduced. These effects are particularly remarkable when QPM device 7 having a wide bandwidth is employed as shown in the lower part of FIG. 10.

Second Modification of Third Embodiment

An idler photon with which a sample is irradiated is linearly polarized light. In this case, when the sample has optical rotatory power and/or circular dichroism, transmission through the sample changes the polarization state of the idler photon, and the idler photon after transmission through the sample becomes elliptically polarized light. The optical rotatory power means a property of rotating the polarization axis of a photon. The circular dichroism means a property in which absorbance differs between counterclockwise circularly polarized light and clockwise circularly polarized light. Such a change in the polarization state of the idler photon reduces the visibility of the quantum interference, and thus the measurement accuracy of the infrared absorption spectroscopy characteristic of the sample may be reduced.

Figure 11:
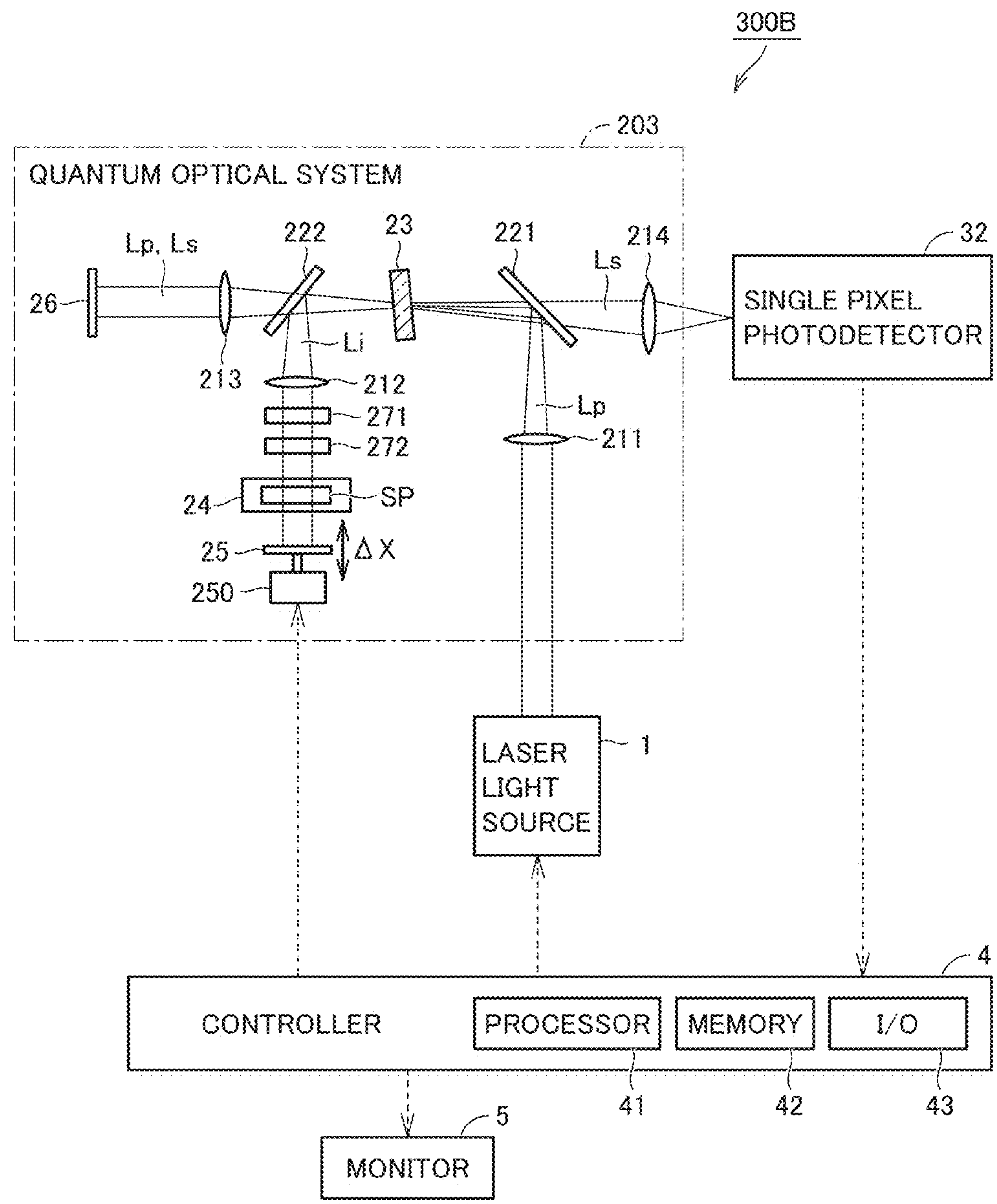
FIG. 11 is a diagram showing the overall configuration of a quantum absorption spectroscopy system according to a second modification of the third embodiment.

FIG. 11 is a diagram showing the overall configuration of a quantum absorption spectroscopy system according to a second modification of the third embodiment. A quantum absorption spectroscopy system 300B is different from quantum absorption spectroscopy system 100 according to the first embodiment (see FIG. 1) in that a single-pixel photodetector 32 is included, and a quantum optical system 203 is included instead of quantum optical system 201. Quantum optical system 203 is different from quantum optical system 201 in that a Faraday rotator 271 and a λ/4 wavelength plate 272 are further included.

Faraday rotator 271 is disposed between a lens 212 and λ/4 wavelength plate 272. Faraday rotator 271 compensates for the rotation of the polarization axis of the idler photon by λ/4 wavelength plate 272.

λ/4 wavelength plate 272 is disposed between λ/4 wavelength plate 272 and a sample holder 24. λ/4 wavelength plate 272 converts the idler photon directed from a dichroic mirror 222 to the sample from linearly polarized light into circularly polarized light. λ/4 wavelength plate 272 converts the idler photon, which are transmitted through the sample from a moving mirror 25 and return to dichroic mirror 222, from circularly polarized light into linearly polarized light.

As described above, in the second modification of the third embodiment, Faraday rotator 271 and λ/4 wavelength plate 272 are added at the preceding stage of the sample, and the idler photon with which the sample is irradiated is converted into circularly polarized light. When incident light is circularly polarized light, the disturbance of the polarization state of the incident light does not occur. Therefore, according to the second modification of the third embodiment, it is possible to suppress a decrease in visibility of quantum interference caused by the optical rotatory power and/or circular dichroism of the sample. As a result, the infrared absorption spectroscopy characteristic of the sample can be measured with high accuracy.

Fourth Embodiment

In quantum optical systems 201 to 203 described above, moving mirror 25 is disposed on the idler optical path. However, in order to cause quantum interference between a signal photon and an idler photon, the phase (more specifically, the effective optical path length) of one photon of the signal photon and the idler photon may be changed with respect to the phase of the other photon. Therefore, the moving mirror may be disposed on a signal optical path.

Figure 12:
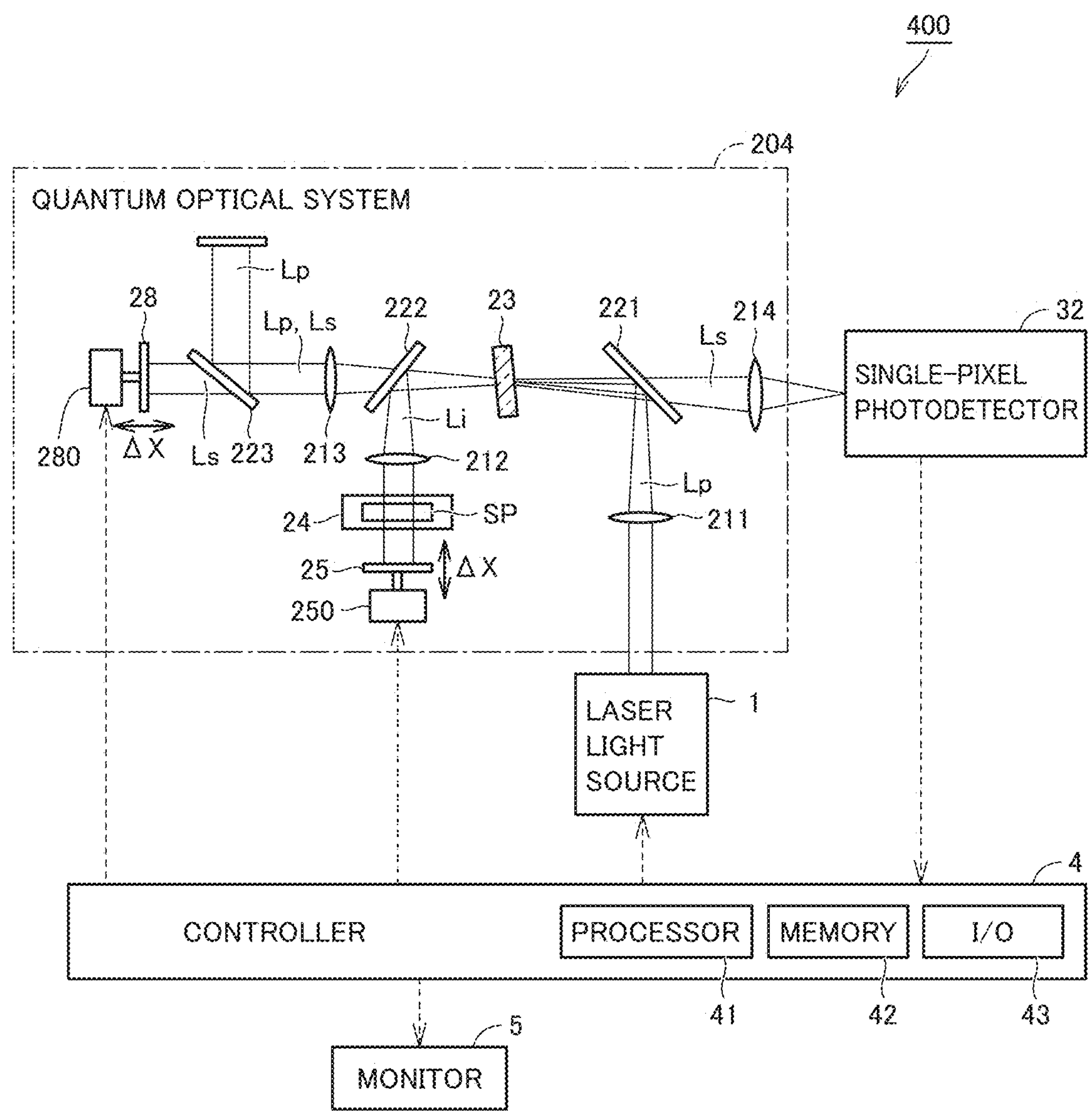
FIG. 12 is a diagram showing the overall configuration of a quantum absorption spectroscopy system according to a fourth embodiment.

FIG. 12 is a diagram showing the overall configuration of a quantum absorption spectroscopy system according to a fourth embodiment. A quantum absorption spectroscopy system 400 is different from quantum absorption spectroscopy system 100 according to the first embodiment (see FIG. 1) in that a quantum optical system 204 is included instead of quantum optical system 201. Quantum optical system 204 is different from quantum optical system 201 in that a moving mirror 28 disposed on the signal optical path is included in addition to moving mirror 25 disposed on an idler optical path. Moving mirror 28 is provided with a drive device 280.

A controller 4 can sweep the idler optical path by reciprocating moving mirror 25, and can sweep the signal optical path by reciprocating moving mirror 28. However, the sweep of the idler optical path and the sweep of the signal optical path are selectively performed.

In this example, a dichroic mirror 223 is added between a lens 213 and moving mirror 28. Among pump light and signal light transmitted through a dichroic mirror 222, the signal light is transmitted through dichroic mirror 223 and directed to moving mirror 28. Meanwhile, the pump light is reflected by dichroic mirror 223. Although not essential, it is desirable to separate the signal light from the pump light in this manner.

In the example shown in FIG. 12, a single-pixel photodetector 32 is employed as with the second embodiment, but a multi-pixel photodetector 31 may be employed (see FIG. 1). QPM device 7 may be employed instead of nonlinear optical crystal 23 (see FIG. 6).

First, with respect to a state where a sample is not disposed on the idler optical path, a case where the idler optical path is swept by reciprocating moving mirror 25 and a case where the signal optical path is swept by reciprocating moving mirror 28 are compared with each other. The sweep width of the idler optical path (the movement distance of moving mirror 25) is described as $\Delta L_{idl}$, and the sweep width of the signal optical path (the movement distance of moving mirror 28) is described as $\Delta L_{sig}$.

As already described with reference to formula (9) in the first embodiment, signal photon count rate $P_s$ when the idler optical path is swept depends on idler propagation time $t_0$. For convenience, formula (9) will be described again below.

[Expression 12]

$$P_s(t_0) \propto 2 + e^{i(\Psi_p - w_{s0} t_1)} \int d\Omega |F(\Omega)|^2 ((\tau^*(\omega_{i0}+\Omega))^2 e^{-i\omega(t_0 - t_1) - i\Omega i0\ t0}) + c.c. \tag{9}$$

When observing formula (9), it can be seen that formula (9) shows that signal photon count rate $P_s$ also depends on a signal propagation time $t_1$ in addition to idler propagation time $t_0$. Signal propagation time $t_1$ is a time until the signal light generated by nonlinear optical crystal 23 is reflected by moving mirror 28 and returns $t_0$ nonlinear optical crystal 23.

Here, it is assumed that the spectral shape of a two-photon field amplitude F (Ω) is a Gaussian function as shown by the following formula (13). In formula (13), the spectral width of the idler photon generated by nonlinear optical crystal 23 is described as σ.

[Expression 13]

$$|F(\Omega)|^2 = \frac{1}{\sqrt{2\pi\sigma^2}} \exp\left(-\frac{\Omega^2}{2\sigma^2}\right) \tag{13}$$

For further simplification, optical loss inside quantum optical system 204 is ignored, and the complex transmittance τ of the sample not installed on the idler optical path is approximated to 1. Then, the above formula (9) can be transformed into the following formula (14).

[Expression 14]

$$P_s(t_0, t_1) \propto 2 + e^{i(\varphi_p - \omega_{s0} t_1 - \omega_{i0} t_0)} \int d\Omega |F(\Omega)|^2 e^{-i\Omega(t_0 - t_1)} + c.c. = 2 + 2\cos(\varphi_p - \omega_{s0} t_1 - \omega_{i0} t_0) \exp\left(-\sigma^2 (t_0 - t_1)^2 / 2\right) \tag{14}$$

Formula (14) represents the dependency of signal photon count rate $P_s$ on idler propagation time $t_0$ and signal propagation time $t_1$. By converting the time in formula (14) into a distance, formula (14) can be transformed into formula representing the dependency of signal photon count rate $P_s$ on an idler distance $L_{idl}$ and a signal distance $L_{sig}$. Specifically, idler propagation time $t_0$ is converted into idler distance $L_{idl}$ and signal propagation time $t_1$ is converted into signal distance $L_{sig}$ according to the relational formula of $L_{idl}=ct_0$ and $L_{sig}=ct_1$. The center frequency $\omega_{i0}$ of the idler photon is converted into a center wave number $k_{i0}$ using the dispersion relationship of $\omega_{i0}=ck_{i0}$, and the center frequency $w_{s0}$ of the signal photon is converted into a center wave number $k_{s0}$ using the dispersion relationship of $\omega_{s0}=ck_{s0}$. Then, the following formula (15) is derived from formula (14). By using formula (15), it is possible to simulate what kind of quantum interference signal is obtained when the idler optical path or the signal optical path is swept.

[Expression 15]

$$P_s(L_{idl}, L_{sig}) \propto 2+2\cos(\varphi_p - k_{s0}L_{sig} - k_{i0}L_{idl})\exp(-\sigma^2 (L_{idl}-L_{sig})^2/2c^2) \tag{15}$$

Next, a Fourier spectrum obtained when a sample that is an infrared absorber is disposed on the idler optical path will be described. For distinction, a Fourier spectrum obtained by sweeping the idler optical path is referred to as $A_s^{idl}$, and a Fourier spectrum obtained by sweeping the signal optical path is referred to as $A_s^{sig}$. The Fourier spectrum $A_s^{idl}$ when the idler optical path is swept is derived as the following formula (16) in the wake of the above formula (11).

[Expression 16]

$$\begin{aligned} A_s^{idl}(\omega) &= \frac{1}{2\pi}\int P_s(t_0)e^{i\omega t_0}\,dt_0 \\ &\propto e^{i(\varphi_p-\omega_{s0}t_1)}\int\int dt_0 d\Omega |F(\Omega)|^2((\tau^*(\omega_{i0} + \\ &\quad \Omega))^2 e^{-i\Omega(t_0-t_1)-i\omega_{i0}t_0} e^{i\omega t_0}) \\ &= e^{i(\varphi_p-\omega_{s0}t_1)}\int\int dt_0 d\Omega |F(\Omega)|^2((\tau^*(\omega_{i0} + \\ &\quad \Omega))^2 e^{i\Omega t_1} e^{-i(\Omega-(\omega-\omega_{i0}))t_0}) \\ &= e^{i(\varphi_p-\omega_{s0}t_1)}\int d\Omega |F(\Omega)|^2\left((\tau^*(\omega_{i0}+\Omega))^2 e^{i\Omega t_1}\delta(\Omega-(\omega-\omega_{i0}))\right) \\ &= e^{i(\varphi_p-\omega_{s0}t_1)}|F(\omega-\omega_{i0})|^2(\tau^*(\omega))^2 e^{i(\omega-\omega_{i0})t_1} \\ &= e^{i(\varphi_p-(\omega_{s0}-\omega_{i0})t_1))}|F(\omega-\omega_{i0})|^2(\tau^*(\omega))^2 e^{i\omega t_1} \end{aligned} \tag{16}$$

The following formula (17) is obtained from formula (16).

[Expression 17]

$$|A_s^{idl}(\omega)| \propto |F(\omega-\omega_{i0})|^2 |\tau(\omega)|^2 \tag{17}$$

An idler frequency $\omega_i$ is expressed as $\omega_i=\omega_{i0}+\Omega$ using detuning $\Omega$ from the center frequency $\omega_{i0}$ of the idler photon. When this relational formula is substituted into formula (17), formula (17) can also be described as the following formula (18). As seen from formula (18), the amplitude $|A_s^{idl}(\omega_{i0}+\Omega)|$ of the Fourier spectrum distributed in the frequency range (infrared range) of the idler photon is proportional to the product of the square of the two-photon field amplitude F $(\Omega)$ and the square of the complex transmittance $\tau(\omega_{i0}+\Omega)$ in the infrared range of the sample.

[Expression 18]

$$|A_s^{idl}(\omega_{i0}+\Omega| \propto |F(\Omega)|^2 |\tau(\omega_{i0}+\Omega)|^2 \tag{18}$$

Similarly, the Fourier spectrum $A_s^{sig}$ when the signal optical path is swept is derived as the following formula (19).

[Expression 19]

$$\begin{aligned} A_s^{sig}(\omega) &= \frac{1}{2\pi}\int P_s(t_1)e^{i\omega t_1}\,dt_1 \\ &\propto e^{i(\varphi_p-\omega_{i0}t_0)}\int\int dt_1 d\Omega |F(\Omega)|^2((\tau^*(\omega_{i0} + \\ &\quad \Omega))^2 e^{-i\Omega(t_0-t_1)-i\omega_{s0}t_1} e^{i\omega t_1}) \\ &= e^{i(\varphi_p-\omega_{i0}t_0)}\int\int dt_1 d\Omega |F(\Omega)|^2((\tau^*(\omega_{i0} + \\ &\quad \Omega))^2 e^{-i\Omega t_0} e^{-i(-\Omega+(\omega_{s0}-\omega))t_1}) \\ &= e^{i(\varphi_p-\omega_{i0}t_0)}\int d\Omega |F(\Omega)|^2\left((\tau^*(\omega_{i0}+\Omega))^2 e^{-i\Omega t_0}\delta(\Omega-(\omega_{s0}-\omega))\right) \\ &= e^{i(\varphi_p-\omega_{i0}t_0)}|F(\omega_{s0}-\omega)|^2(\tau^*(\omega_{i0}+\omega_{s0}-\omega))^2 e^{-i(\omega_{s0}-\omega)t_0} \\ &= e^{i(\varphi_p-\omega_{i0}t_0-\omega_{s0}t_0)}|F(\omega_{s0}-\omega)|^2(\tau^*(\omega_{i0}+\omega_{s0}-\omega))^2 e^{i\omega t_0} \end{aligned} \tag{19}$$

1 The following formula (20) is obtained from formula (19).

[Expression 20]

$$|A_s^{sig}(\omega)| \propto |F(\omega_{s0}-\omega)|^2 |\tau(\omega_{i0}+\omega_{s0}-\omega)|^2 \tag{20}$$

A signal frequency $\omega_s$ is expressed as $\omega_s=\omega_{s0}-\Omega$ using detuning $\Omega$ from the center frequency $\omega_{s0}$ of the signal photon. Therefore, formula (20) is described as the following formula (21). Formula (21) represents that the amplitude $|A_s^{sig}(\omega_{s0}\Omega)|$ of the Fourier spectrum distributed in the frequency range of the signal photon, which is the visible range in this example, is proportional to the product of the square of the two-photon field amplitude $F(-\Omega)$ and the square of the complex transmittance $\tau(\omega_{i0}-\Omega)$ in the infrared range of the sample.

[Expression 21]

$$|A_s^{sig}(\omega_{s0}+\Omega| \propto |F(-\Omega|^2 |\tau(\omega_{i0}-\Omega)|^2 \tag{21}$$

As described above, in the fourth embodiment, quantum absorption spectroscopy system 400 can sweep the idler optical path and sweep the signal optical path. As described later in Seventh Example, equal wave number resolution can be achieved when the idler optical path is swept and when the signal optical path is swept. Therefore, one of the idler optical path and the signal optical path that is convenient may be swept according to the absorption spectroscopy characteristic and the like of the sample.

When moving mirror 25 is reciprocated to sweep the idler optical path, moving mirror 25 corresponds to the phase converter according to the present disclosure, and the idler photon corresponds to "one photon" according to the present disclosure.

Meanwhile, when moving mirror 28 is reciprocated to sweep the signal optical path, moving mirror 28 corresponds to the phase converter according to the present disclosure, and the signal photon corresponds to "one photon" according to the present disclosure.

In the fourth embodiment, the configuration capable of sweeping both the idler optical path and the signal optical path has been described. However, a system configuration capable of sweeping only the signal optical path may be employed.

This is because the swept optical path is the signal optical path, whereby the implementation advantages of the quantum absorption spectroscopy system can be provided as in the following modification.

Modification of Fourth Embodiment

It is also possible to use a reflection method instead of a transmission method in which transmitted light from a sample is detected by a photodetector. For example, attenuated total reflection (ATR) may be applied to the quantum absorption spectroscopy system according to the present disclosure.

Figure 13:
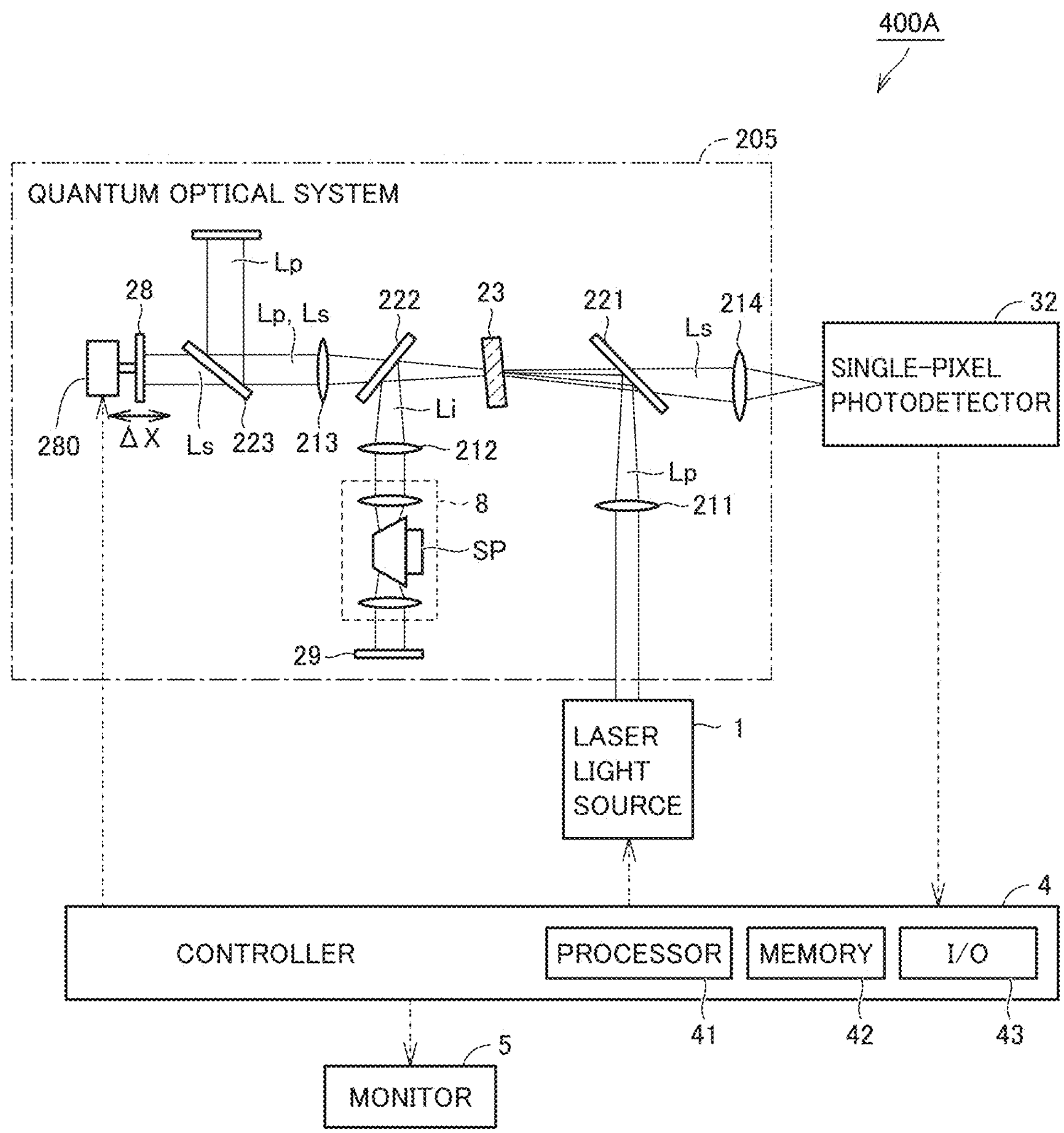
FIG. 13 is a diagram showing the overall configuration of a quantum absorption spectroscopy system according to a modification of the fourth embodiment.

FIG. 13 is a diagram showing the overall configuration of a quantum absorption spectroscopy system according to a modification of the fourth embodiment. A quantum absorption spectroscopy system 400A is different from quantum absorption spectroscopy system 400 according to the fourth embodiment (see FIG. 12) in that a quantum optical system 205 is included instead of quantum optical system 204.

Quantum optical system 205 is different from quantum optical system 204 in that an ATR unit 8 is included instead of sample holder 24, and an idler optical path includes a fixed mirror 29 instead of moving mirror 25 and drive device 250.

Figure 14:
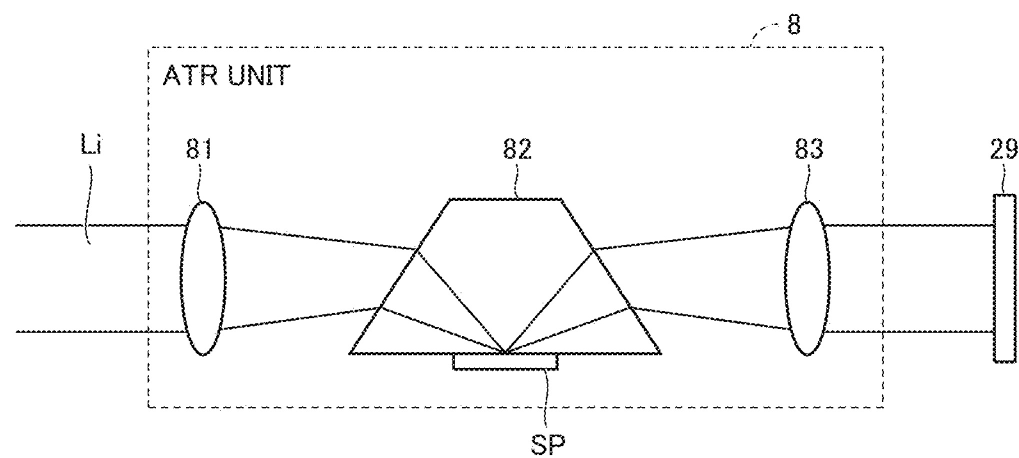
FIG. 14 is a diagram showing the configuration example of an attenuated total reflection unit.

FIG. 14 is a diagram showing the configuration example of ATR unit 8. ATR unit 8 includes a lens 81, a prism 82, and a lens 83. Lens 81, prism 82, and lens 83 are disposed in this order along the propagation direction of idler photon. ATR unit 8 may include a mirror for optical axis adjustment instead of or in addition to lenses 81 and 83.

Prism 82 has a high refractive index, and is in contact with the surface of a sample. An Idler photon incident from lens 81 into prism 82 is totally reflected at the interface between prism 82 and the sample. At this time, since the idler photon (evanescent waves) oozing out toward the sample side is absorbed by the surface of the sample, the infrared absorption spectroscopy characteristic of the surface of the sample can be measured by detecting totally reflected light.

In the ATR, it is necessary to adjust the optical axis of idler light so that the idler light enters one end of a prism and is emitted from the other end of the prism toward the subsequent mirror (fixed mirror 29 in FIG. 14). When the idler optical path is swept by the reciprocation of moving mirror 25 disposed on the idler optical path as described in the first embodiment (see FIG. 1), the optical axis of the idler light may periodically change with the reciprocation of moving mirror 25. Therefore, it is necessary to construct a quantum optical system 201 so that the optical axis of the idler light is always maintained at an appropriate position even during the sweep of the idler optical path. However, such adjustment of the optical system is not easy.

ATR unit 8 may be enlarged as compared with sample holder 24 used in a transmission method or other reflection methods because of prism 82 (and optical systems such as lenses 81 and 82 before and after the above). While the device size is limited, it may be difficult to secure a space where moving mirror 25 can reciprocate at the post stage of the sample while avoiding mechanical contact between the sample and moving mirror 25.

In contrast, in the modification of the fourth embodiment, a signal optical path is swept by reciprocating the moving mirror 28 disposed on the signal optical path. Accordingly, the optical axis of the idler light does not change with time as moving mirror 28 reciprocates. Therefore, according to the modification of the fourth embodiment, the difficulty of constructing quantum optical system 205 can be reduced. Since mechanical contact between the sample and the moving mirror does not occur, a problem of securing space can also be avoided. Therefore, the implementation of the quantum absorption spectroscopy system can be easily achieved.

Minute irregularities may be present on the surface of the sample. In other words, the surface of the sample may be microscopically rough. In that case, in a typical transmission method, a plurality of modes may occur as the idler photon is scattered and/or reflected by the surface of the sample. As a result, the measurement accuracy of the infrared absorption spectroscopy characteristic of the sample may decrease due to a decrease in signal intensity and an increase in noise. Meanwhile, since, in the ATR, prism 82 is in contact with the surface of the sample, the above-described problem hardly occurs even if the minute irregularities are present on the surface of the sample. Therefore, the infrared absorption spectroscopy characteristic of the sample can be measured with high accuracy.

The first to fourth embodiments and the modifications of the respective embodiments can be appropriately combined. For example, the second embodiment, the third embodiment, and the fourth embodiment may be combined such that QPM device 7 is employed, single-pixel photodetector 32 is employed, and both the idler optical path and the signal optical path can be swept. The modification of the first embodiment and the fourth embodiment may be combined such that dispersive optical element 6 is disposed in the front stage of multi-pixel photodetector 31, and both the idler optical path and the signal optical path can be swept. The second embodiment and the modification of the fourth embodiment may be combined such that QPM device 7 is employed, and measurement by the attenuated total reflection is performed.

EXAMPLES

Hereinafter, the results of simulating or measuring a Fourier spectrum and the absorption spectroscopy characteristic of a sample using the quantum absorption spectroscopy system according to any one of the first to fourth embodiments (and the modifications) will be described.

First Example

In First Example, the results of calculating a Fourier spectrum $A_s^0$ (reference Fourier spectrum) by performing Fourier transform on a quantum interference signal acquired without disposing a sample on an idler optical path will be described. This measurement is so-called background measurement, and it can also be said that the absorption spectroscopy characteristic of air on the idler optical path is measured. The measurement was performed using the system configuration of quantum absorption spectroscopy system 200 (see FIG. 6) according to the second embodiment. A single crystal of $LiNbO_3$ was used for nonlinear optical crystal 23 (the same applies to Second and Third Examples to be described later).

Figure 15:
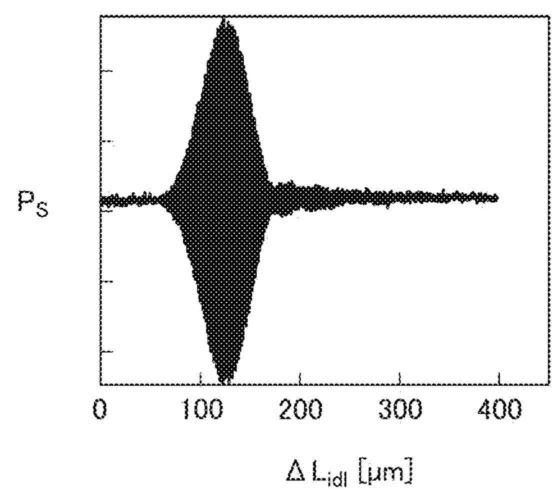
FIG. 15 is a diagram showing an example of the measurement results of a quantum interference signal.
Figure 16:
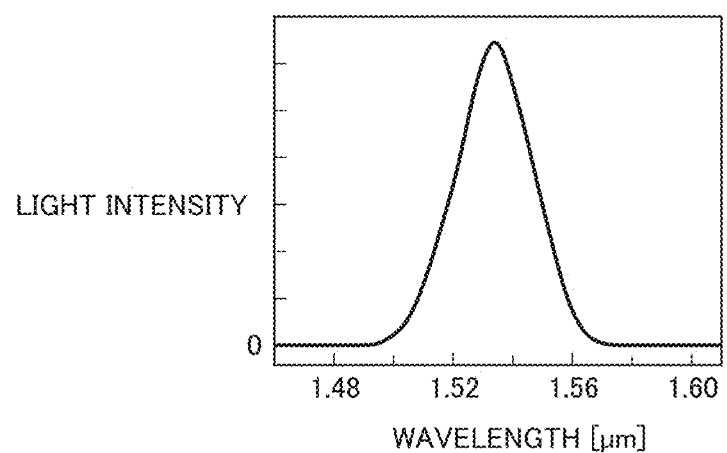
FIG. 16 is a diagram showing a Fourier spectrum obtained by performing Fourier transform on the quantum interference signal shown in FIG. 15.

FIG. 15 is a diagram showing an example of the measurement results of a quantum interference signal. In FIG. 15, a horizontal axis represents the sweep width $\Delta L_{idl}$ of the idler optical path, and a vertical axis represents a signal photon count rate $P_s$. FIG. 16 is a diagram showing a Fourier spectrum $A_s^0$ obtained by Fourier transform of the quantum interference signal shown in FIG. 15. In FIG. 16, a horizontal axis represents a wavelength and a vertical axis represents light intensity.

The center wavelength $\lambda_s$ of a signal photon generated by nonlinear optical crystal 23 was 816 nm, and the center wavelength $\lambda_i$ of an idler photon was 1530 nm. By this measurement, it was confirmed that the obtained Fourier spectrum $A_s^0$ has a peak in the vicinity of 1530 nm, which is the design wavelength of idler light. The bandwidth (full width at half maximum) of the Fourier spectrum $A_s^0$ was about 30 nm. From this measurement result, it was confirmed that an appropriate Fourier spectrum $A_s^0$ is obtained by Fourier transform of signal photon count rate $P_s$.

Second Example

In second Example, the results of experimentally confirming how the quantum interference effect is reflected in the signal photon spectrum will be described. The measurement was performed using the system configuration of quantum absorption spectroscopy system 100A according to the modification of the first embodiment (see FIG. 5). The center wavelength $\lambda_i$ of a signal photon was 810 nm, and the center wavelength $\lambda_s$ of an idler photon was 1550 nm. A sample was not disposed on an idler optical path.

Figure 17:
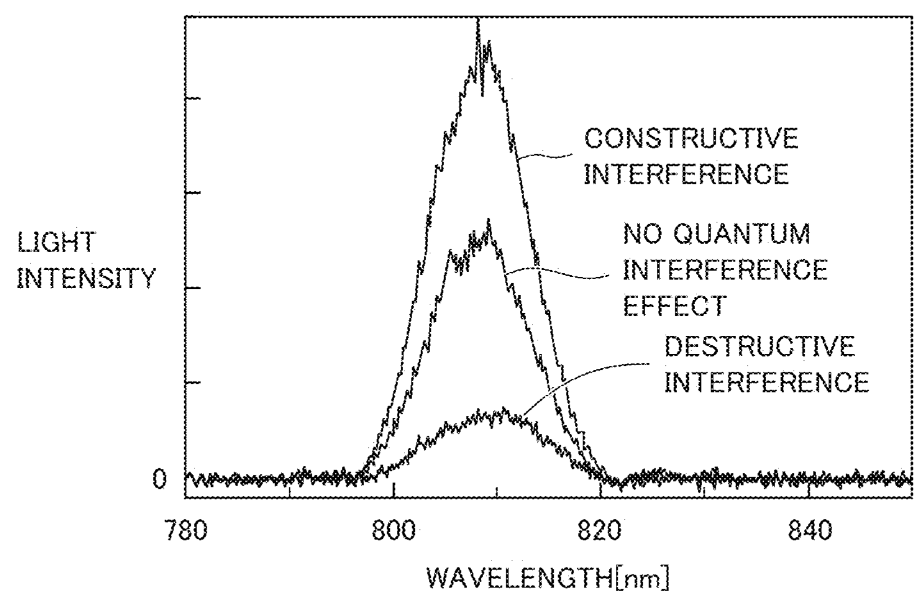
FIG. 17 is a diagram showing a difference in signal photon spectrum due to a quantum interference effect.

FIG. 17 is a diagram showing a difference in signal photon spectrum due to a quantum interference effect. A horizontal axis represents a wavelength, and a vertical axis represents the light intensity of a signal photon.

FIG. 17 shows a signal photon spectrum in constructive interference in which two processes (the above-described first and second physical processes) in which a quantum entangled photon pair is generated in a nonlinear optical crystal 23 intensify each other and a signal photon spectrum in destructive interference in which the two processes cancel each other. Furthermore, for comparison, a signal photon spectrum when the quantum interference effect is completely eliminated by blocking idler light is also shown. As shown in FIG. 17, it was possible to confirm that, using a case where no quantum interference effect occurs as the basis, the intensity of the signal photon spectrum increases due to the constructive interference, whereas, the intensity of the signal photon spectrum decreases due to the destructive interference.

Third Example

In Third Example, the results of disposing a sample on an idler optical path and calculating the refractive index of the sample from the complex transmittance spectrum of the sample will be described. The measurement was performed using the system configuration of quantum absorption spectroscopy system 200 according to the second embodiment (see FIG. 6).

As the sample, quartz glass having a known refractive index (specifically, a quartz glass substrate having a thickness of 140 μm) was used. The literature value of the refractive index of the quartz glass is 1.506 (wavelength of 1550 nm). The sweep width $\Delta L_{idl}$ of the idler optical path was set to 400 μm for each of the case where the quartz glass was disposed on the idler optical path and the case where the quartz glass was not disposed. The step width of the idler optical path was set to 100 nm, and signal photons detected for 50 milliseconds in each step were integrated.

Figure 18:
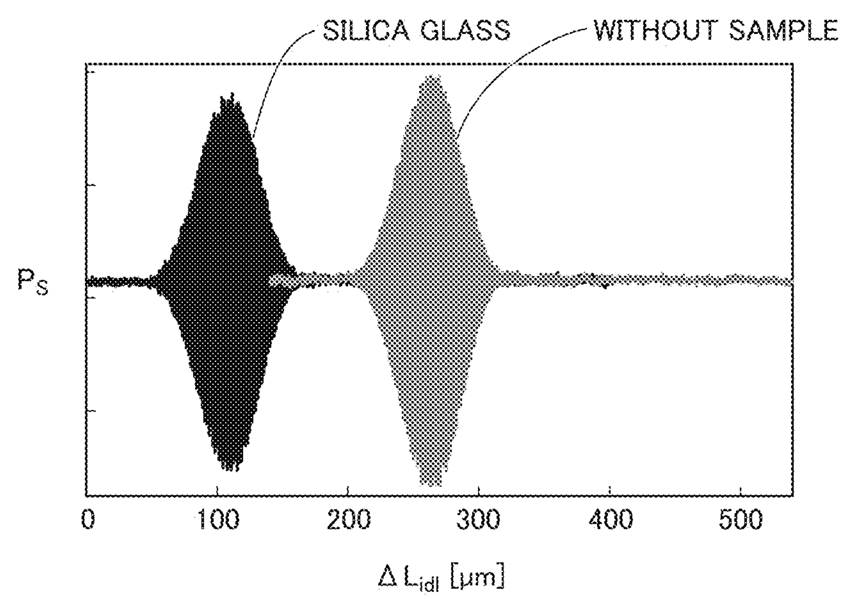
FIG. 18 is a diagram showing an example of the measurement results of a quantum interference signal regarding quartz glass.

FIG. 18 is a diagram showing an example of the measurement results of a quantum interference signal regarding quartz glass. Due to phase delay caused by the quartz glass, the peak of the quantum interference signal was shifted by about 150 μm in the case where the quartz glass was disposed as compared with the case where the quartz glass was not disposed.

Figure 19:
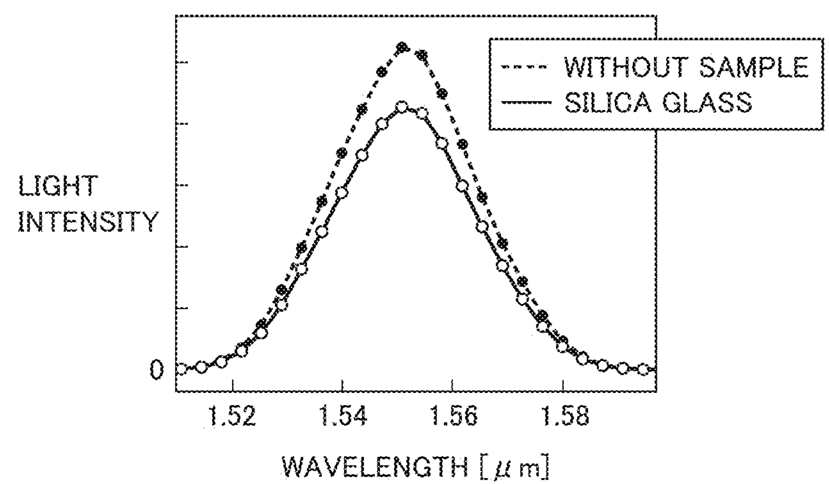
FIG. 19 is a diagram showing a Fourier spectrum obtained by performing Fourier transform on the quantum interference signal shown in FIG. 18.

FIG. 19 is a diagram showing Fourier spectra $A_s$ and $A_s^0$ obtained by Fourier transform of the quantum interference signal shown in FIG. 18. In order to obtain the measurement results of the entire two Fourier spectra, the sweep width $\Delta L_{idl}$ of the idler optical path is expanded from 400 μm to 680 μm.

As described in formula (12), the complex transmittance spectrum $\tau(\omega)$ of the quartz glass can be obtained by calculating an amplitude ratio between Fourier spectrum $A_s^0(\omega)$ when the quartz glass is not disposed on the idler optical path and Fourier spectrum $A_s(\omega)$ when the quartz glass is disposed on the idler optical path. Since it is difficult to illustrate complex transmittance spectrum $\tau(\omega)$ on a two-dimensional plane, complex transmittance spectrum $\tau(\omega)$ is separately illustrated as the absolute value T of a transmittance and a phase difference $\varphi$ between the two Fourier spectra, on the basis of the relationship with $\tau(\omega)=T\exp(i\varphi(\omega))$.

Figure 20:
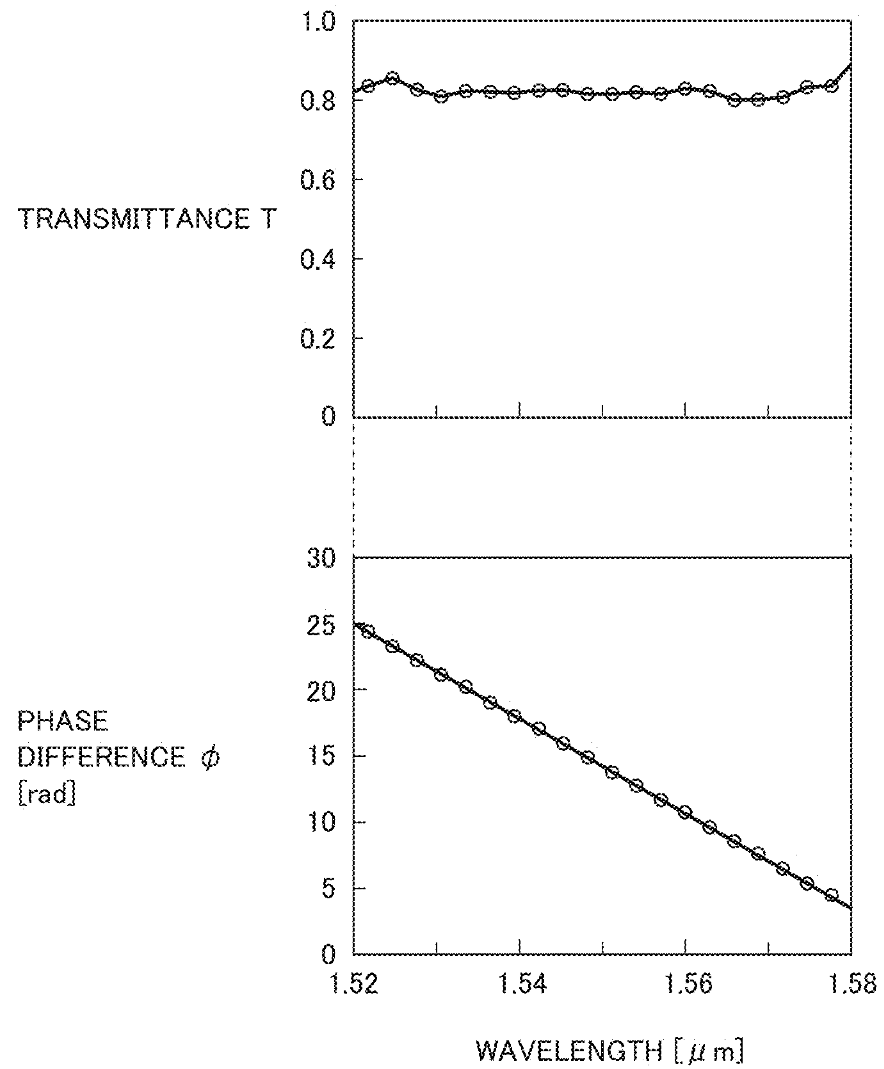
FIG. 20 is a diagram showing the absolute value of a transmittance and a phase difference obtained by the measurement of quartz glass.

FIG. 20 is a diagram showing the absolute value T of a transmittance and a phase difference p obtained by the measurement of quartz glass. A horizontal axis represents a wavelength. A vertical axis represents transmittance T (absolute value) on the upper side and phase difference $\varphi$ on the lower side.

As a result of obtaining the complex transmittance $\tau$ from the amplitude ratio ($|A_s|/|A_s^0|$) of the two Fourier spectra $A_s$ and $A_s^0$, the refractive index of the quartz glass was calculated to be 1.53. It can be said that this value is sufficiently close to the literature value (about 1.51). Therefore, it was confirmed that complex transmittance spectrum $\tau(\omega)$ can be calculated with high accuracy by quantum absorption spectroscopy system 200.

Fourth Example

In fourth to sixth Examples, various results of simulating infrared absorption spectroscopy over a wide wavelength range will be described. In Fourth Example, the system configuration of quantum absorption spectroscopy system 300A according to the first modification of the third embodiment (see FIG. 9) was assumed.

In the following FIGS. 21 to 23, the material of a nonlinear optical crystal 72 of a QPM device 7 was a single crystal of $LiNbO_3$. The length of nonlinear optical crystal 72 in a light propagation direction was set to 2 cm. The wavelength of pump light was set to 532 nm.

Figure 21:
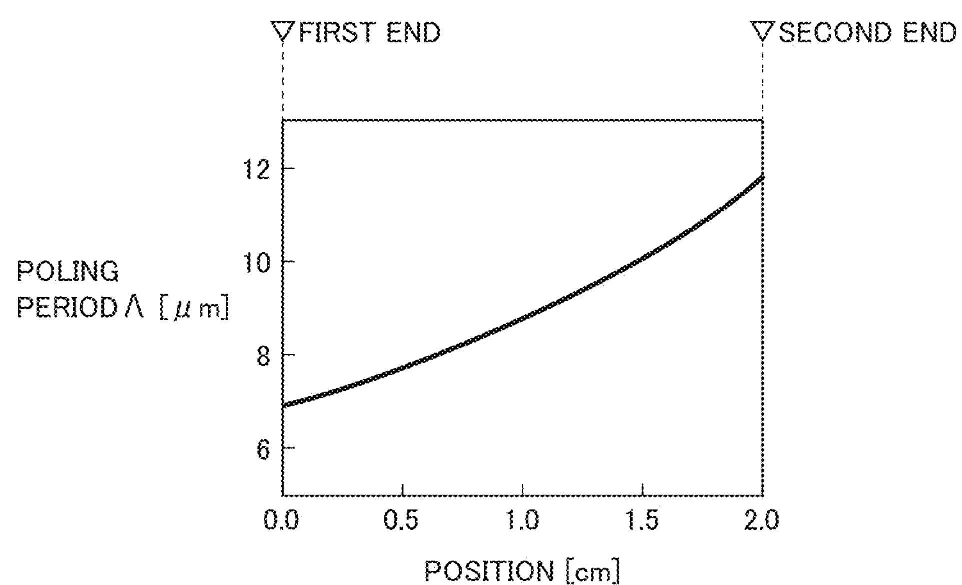
FIG. 21 is a diagram showing a poling period at each position of a nonlinear optical crystal.

FIG. 21 is a diagram showing a poling period Λ at each position of nonlinear optical crystal 72. A horizontal axis represents a position in a direction from a first end 721 (incidence end) toward a second end 722 (emission end) of nonlinear optical crystal 72 (see FIG. 7). A vertical axis represents poling period Λ at each position.

The number of sections of the poling structure of nonlinear optical crystal 72 was sufficiently large, and it was assumed that the spatial frequency (inverse of poling period Λ) of nonlinear optical crystal 72 linearly and continuously changes (chirps) between first end 721 and second end 722.

Polarization inversion period Λ at first end 721 of nonlinear optical crystal 72 was set to 7 μm, and poling period Λ at second end 722 of nonlinear optical crystal 72 was set to 11.9 μm. Polarization inversion period Λ is designed to satisfy the following two phase matching conditions for both the ends of nonlinear optical crystal 72, The first phase matching condition is a phase matching condition related to an SPDC in which a signal photon having a wavelength of 900 nm and an idler photon having a wavelength of 1300 nm are generated at first end 721 of nonlinear optical crystal 72. The second phase matching condition is a phase matching condition related to an SPDC in which a signal photon having a wavelength of 600 nm and an idler photon having a wavelength of 4700 nm are generated at second end 722 of nonlinear optical crystal 72.

Figure 22:
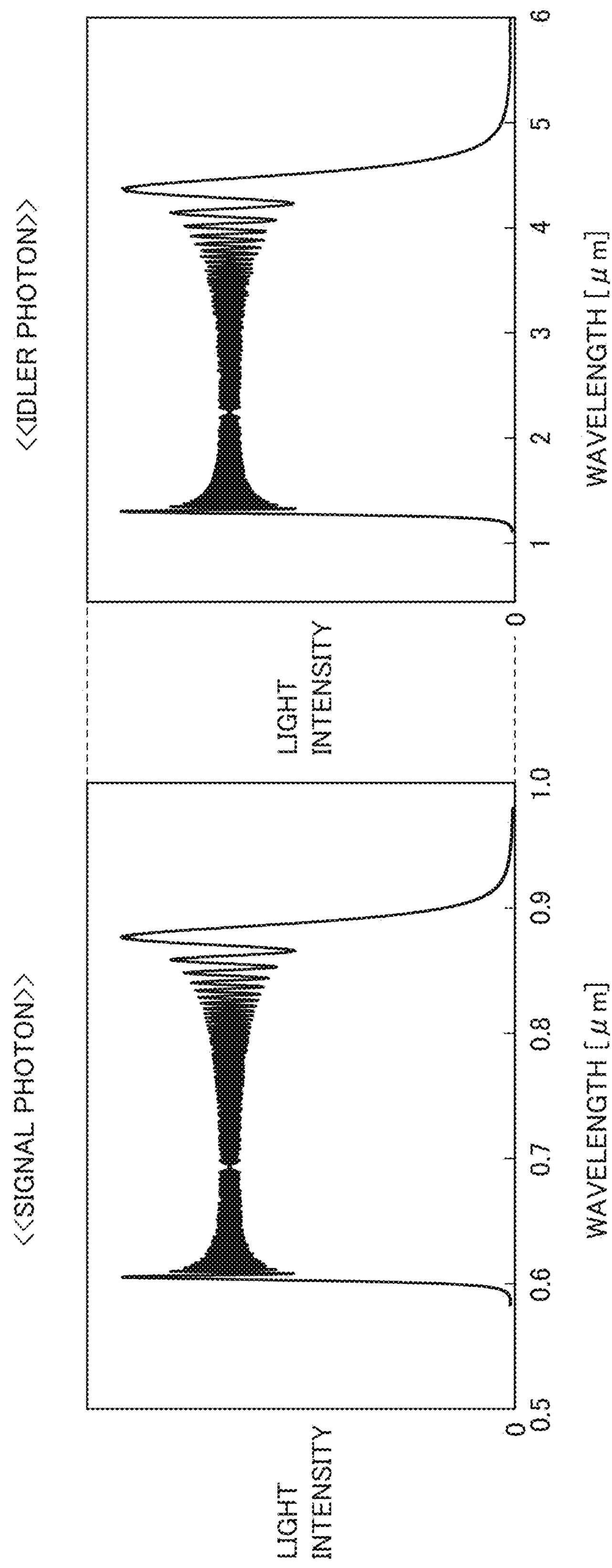
FIG. 22 is a diagram showing an example of the simulation results of the spectrum of a quantum entangled photon pair generated using a quasi-phase-matched device.

FIG. 22 is a diagram showing an example of the simulation results of the spectrum of a quantum entangled photon pair generated using QPM device 7. The spectrum of the signal photon is shown on the left side and the spectrum of the idler photon is shown on the right side. As shown in FIG. 22, the simulation results of being able to generate the idler photon over a wide infrared range of about 1.5 μm to 4.5 μm were obtained. The absorption by nonlinear optical crystal 72 on the longer wavelength side than 4.7 μm was not taken into consideration.

Figure 23:
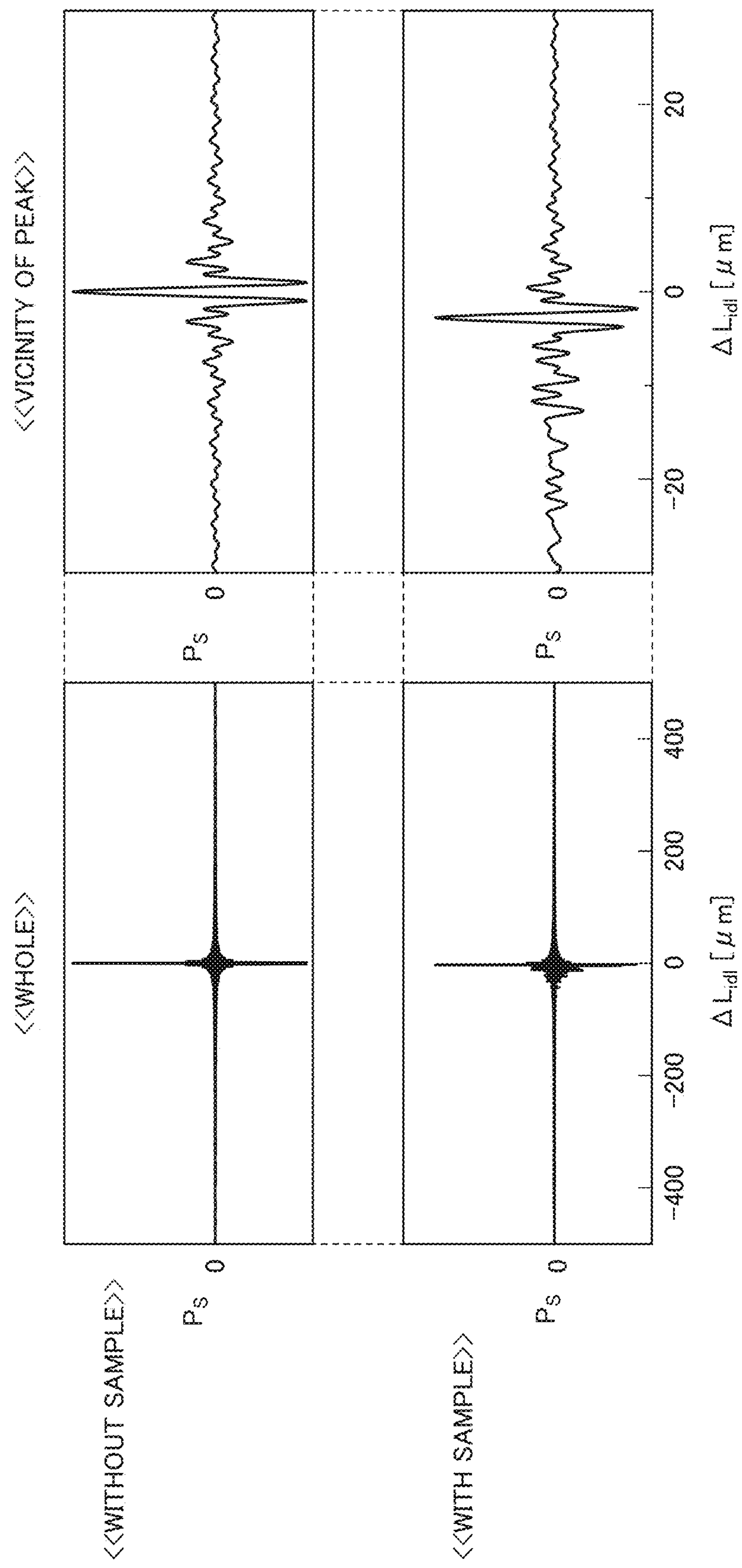
FIG. 23 is a diagram showing the simulation results of a quantum interference signal obtained when the quantum entangled photon pair having the spectrum shown in FIG. 22 is used.

FIG. 23 is a diagram showing the simulation results of a quantum interference signal obtained when the quantum entangled photon pair having the spectrum shown in FIG. 22 is used. The overall view of the quantum interference signal is shown on the left side, and the enlarged view of the vicinity of the peak of the quantum interference signal is shown on the right side. The upper side is a case where the sample is not disposed, and the lower side is a case where the sample is disposed. The method for calculating the quantum interference signal can be described in detail with reference to the above formula (9), formula (14), or formula (15) or the like.

In this simulation, the complex dielectric constant ε of the sample was assumed as in the following formula (22). Complex dielectric constant ε is the square of complex refractive index N($\varepsilon=N^2$). εb represents a background dielectric constant, Ki represents a resonance wave number, $f_i$ represents oscillator strength, and $\gamma_i$ represents a line width. The influence of multiple reflection in the sample was assumed to be negligible.

[Expression 22]

$$\varepsilon(k) = \varepsilon_b + \sum_{i=1}^{3} \frac{f_i}{K_i^2 - k^2 - 2\pi\gamma_i} \tag{22}$$

As can be seen from FIG. 23, when the quantum interference signal in a case where the sample is disposed is compared with the quantum interference signal in a case where the sample is not disposed, a peak shift associated with the infrared absorption by the sample occurs although vibration cycles (intervals of interference fringes) are equivalent.

Although lithium niobate ($LiNbO_3$) has been described as an example of the materials of nonlinear optical crystal 72, other materials can also be employed. For example, gallium phosphide (GaP), gallium arsenide (GaAs), lithium tantalate ($LiTaO_3$), or zinc selenide (ZnSe) or the like can be employed. The material of nonlinear optical crystal 72 may be an organic material. The material of nonlinear optical crystal 72 may be, for example, DAST(4-N,N-dimethylamino-4'-N' methylstilbazolium tosylate), DLD164, or a compound in which some functional groups of these compounds are substituted with other atoms or atomic groups.

Figure 24:
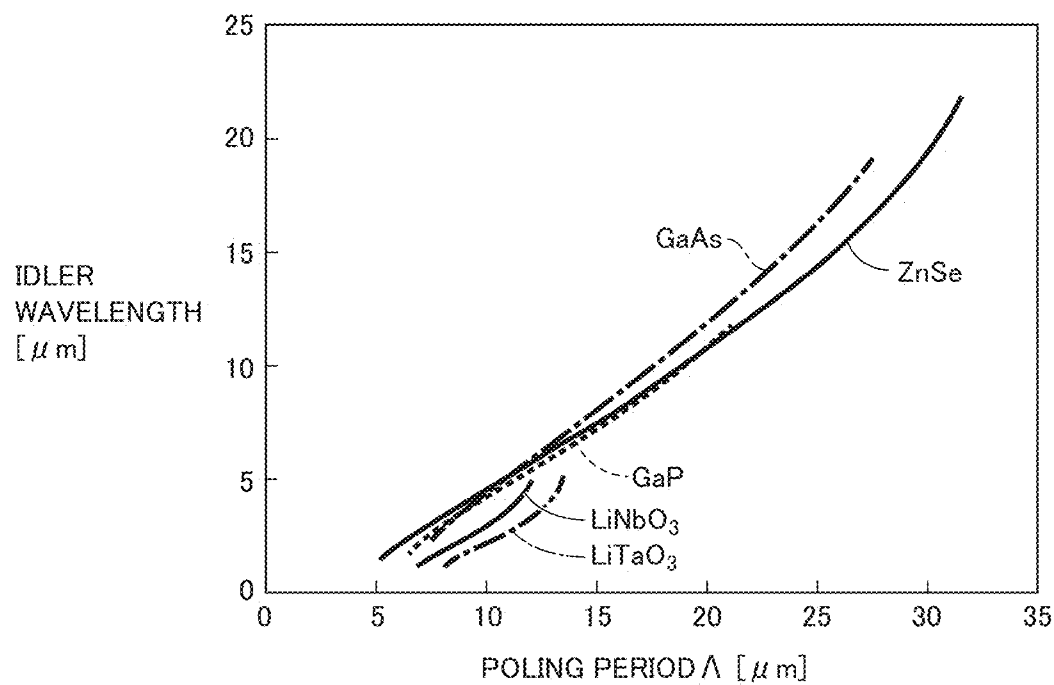
FIG. 24 is a diagram showing a relationship between a poling period and the generation wavelength range of idler light for each material of the nonlinear optical crystal.

FIG. 24 is a diagram showing a relationship between poling period Λ and the generation wavelength range of idler light for each material of nonlinear optical crystal 72. A horizontal axis represents poling period Λ of nonlinear optical crystal 72, and a vertical axis represents the wavelength of the idler photon. FIG. 24 shows the simulation results when the material of nonlinear optical crystal 72 is lithium niobate (wavelength of pump light: 532 nm, room temperature), gallium phosphide (wavelength of pump light: 800 nm, 55° C.), gallium arsenide (wavelength of pump light: 1064 nm, 55° C.), lithium tantalate (wavelength of pump light: 532 nm, room temperature), or zinc selenide (wavelength of pump light: 633 nm, room temperature). For zinc selenide, it was assumed that the Sellmeier equation whose effectiveness has been confirmed up to a wavelength of 16 μm can be applied up to a wavelength of 22 μm.

By appropriately designing the range of poling period Λ in any material, the wavelength range of the idler photon generated by nonlinear optical crystal 72 can be adjusted. Specifically, in lithium niobate, the wavelength range of the idler photon can be adjusted to the range of 1 μm to 5 μm by designing poling period Λ to change in the range of 7 μm to 12 μm. In gallium phosphide, the wavelength range of the idler photon can be adjusted to a range of 1.6 μm to 12 μm by designing poling period Λ to change in a range of 6.5 μm to 21 μm. In gallium arsenide, the wavelength range of the idler photon can be adjusted to a range of 2 μm to 18 μm by designing poling period Λ to change in a range of 7.5 μm to 27.5 μm. In lithium tantalate, the wavelength range of the idler photon can be adjusted to a range of 1 μm to 5 μm by designing poling period Λ to change in a range of 8 μm to 13.5 μm. In zinc selenide, the wavelength range of the idler photon can be adjusted to a range of 1.3 μm to 22 μm by designing poling period Λ to change in a range of 5 μm to 31.5 μm. The features of materials capable of being employed for nonlinear optical crystal 72 are arranged, and shown in FIG. 25.

Fourth Example

Figure 26:
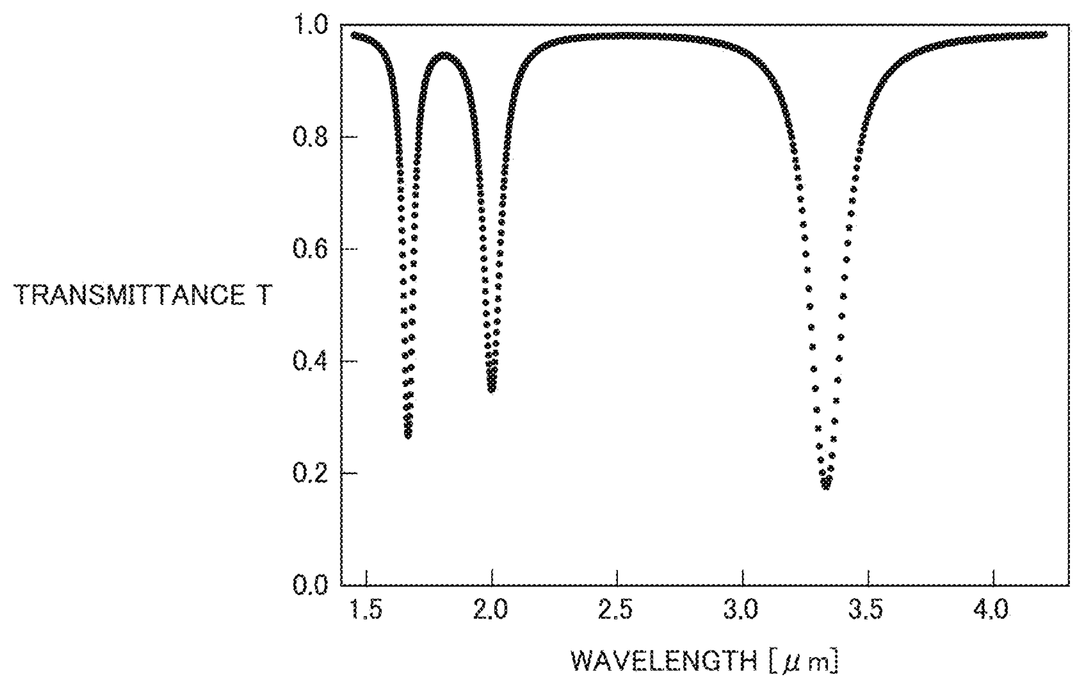
FIG. 26 is a diagram showing an example of the simulation results of obtaining a complex transmittance spectrum over a wide wavelength range.

In Fifth Example, the simulation results of a complex transmittance spectrum when an idler photon distributed over a wide wavelength range is generated using a QPM device 7 will be described. The true value of the complex refractive index of a sample was assumed to be known. More specifically, the true value of the complex refractive index of the sample was determined according to complex dielectric constant ε in the above formula (12). The simulation results were compared with the true value. Also in this simulation, the system configuration of a quantum absorption spectroscopy system 300A according to the first modification of the third embodiment (see FIG. 9) was assumed, FIG. 26 is a diagram showing an example of the simulation results of obtaining a complex transmittance spectrum (spectrum of a transmittance T which is an absolute value) over a wide wavelength range. The simulation results are obtained by performing measurement in two ways with and without the sample disposed as described above and taking the amplitude ratio of two Fourier spectra $A_s$ and $A_s^0$. The sweep width $\Delta L_{idi}$ of an idler optical path was set to 2000 μm (range of ~1000 μm to 1000 μm), The wave number resolution of the Fourier spectrum was set to 5 $cm^{-1}$.

Figure 27:
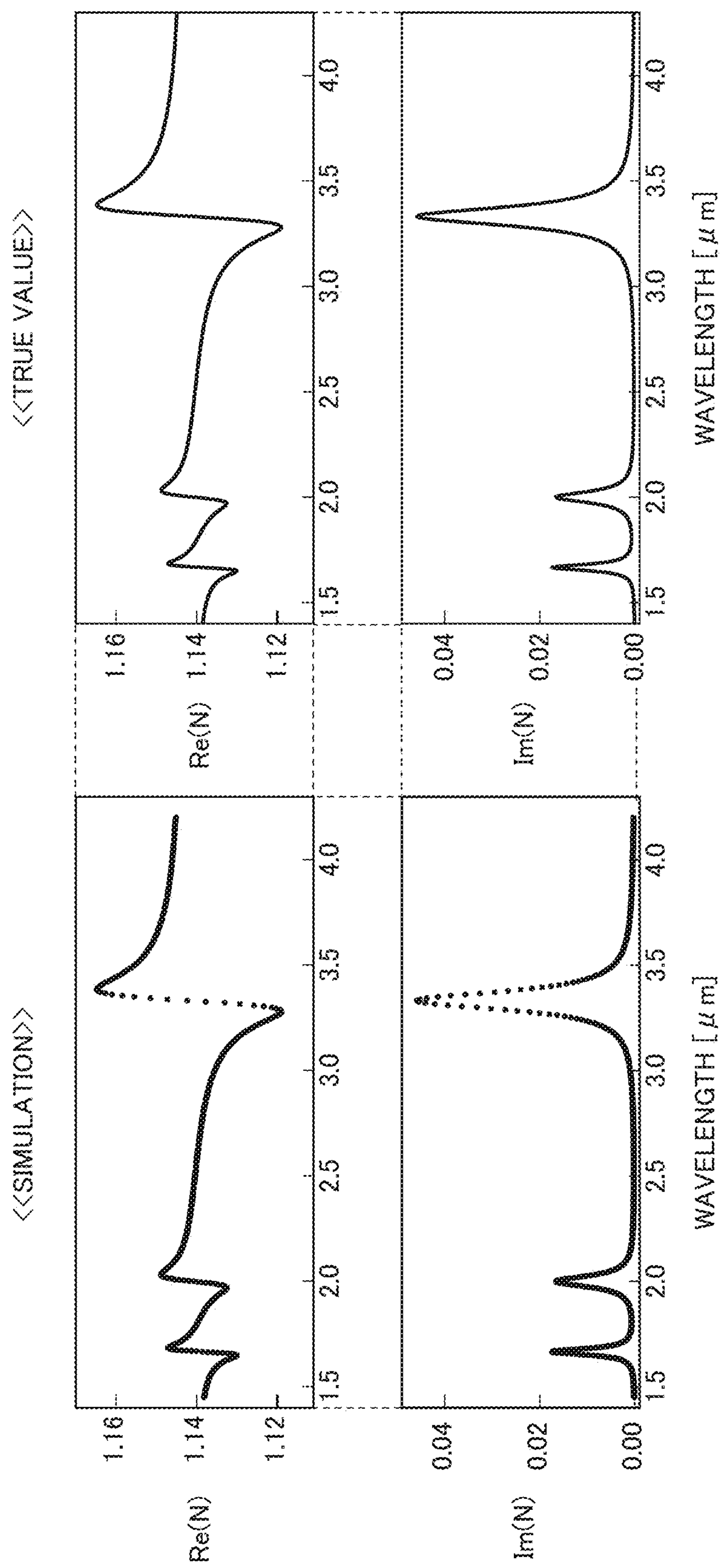
FIG. 27 is a diagram showing the simulation results of obtaining a complex refractive index of a sample from the complex transmittance spectrum shown in FIG. 26.

FIG. 27 is a diagram showing the simulation results of obtaining a complex refractive index N of a sample from the complex transmittance spectrum shown in FIG. 26. A real part Re (N) of complex refractive index N is shown on the upper side, and an imaginary part Im (N) of complex refractive index N is shown on the lower side. The simulation results of the complex refractive index are shown on the left side, and the true value of the complex refractive index is shown on the right side. The complex refractive index obtained by the simulation considerably coincided with the true value.

Fourth Example

In Sixth Example, the measurement results of a complex transmittance over a wide wavelength range will be described. As a sample, a bandbass filter (FBH1550-12 manufactured by Thorlabs Inc.) having a transmission band with a width of 12 nm in the vicinity of 1550 nm was used. A quantum interference signal was measured in both a case where the sample was disposed on an idler optical path and a case where the sample was not disposed. Sweep width $\Delta L_{idl}$ of the idler optical path in the case where the sample was disposed was set to 2000 μm, and sweep width $\Delta L_{idl}$ of the idler optical path in the case where the sample was not disposed was set to 200 μm. In each case, the step width of 100 nm of the idler optical path was common, and the detected signal photons were integrated for 50 milliseconds in each step. The measurement was performed using the system configuration of quantum absorption spectroscopy system 300 according to the third embodiment (see FIG. 8).

Figure 28:
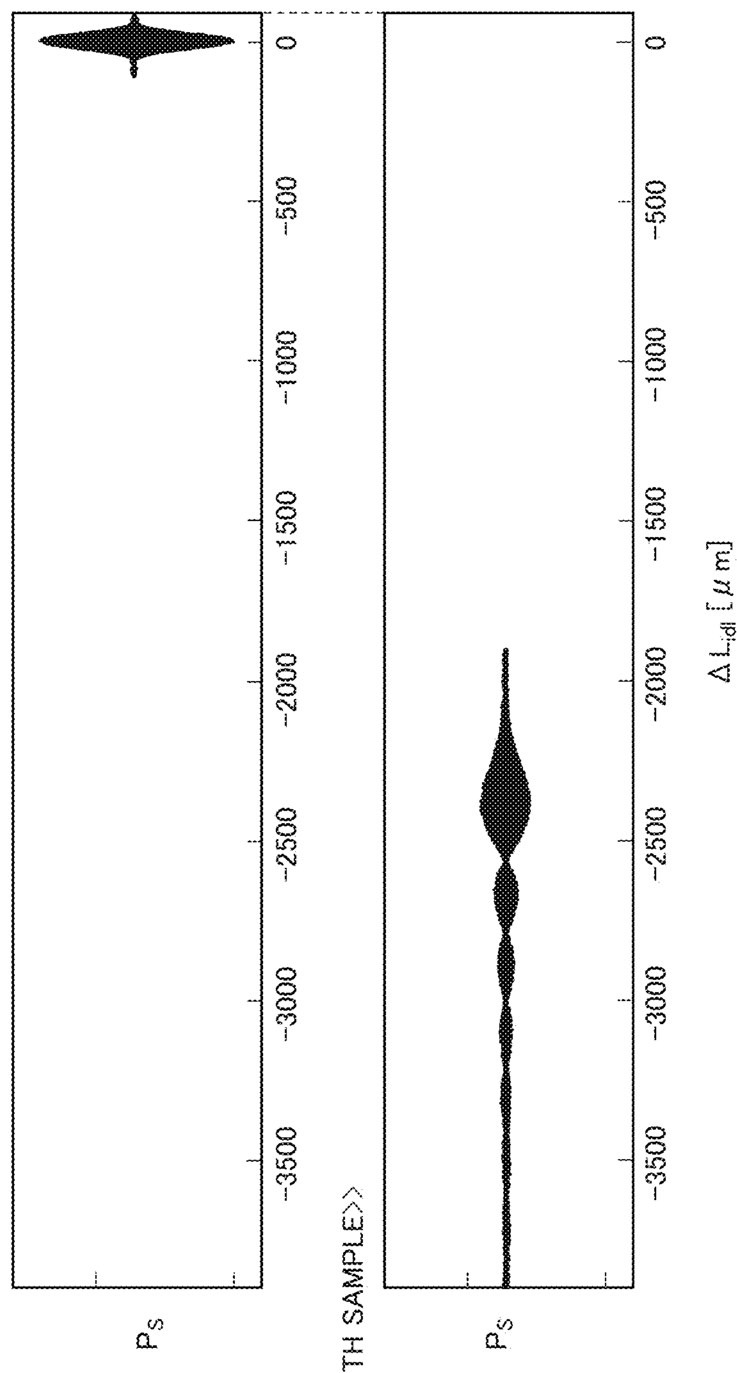
FIG. 28 is a diagram showing an example of the measurement results of a quantum interference signal over a wide wavelength range.

FIG. 28 is a diagram showing an example of the measurement results of a quantum interference signal over a wide wavelength range. A quantum interference signal when the sample is disposed above is shown, and a quantum interference signal when the sample is not disposed below is shown. When the sample was disposed, the peak of the quantum interference signal shifted by about 2000 μm as compared with that when the sample was not disposed.

Figure 29:
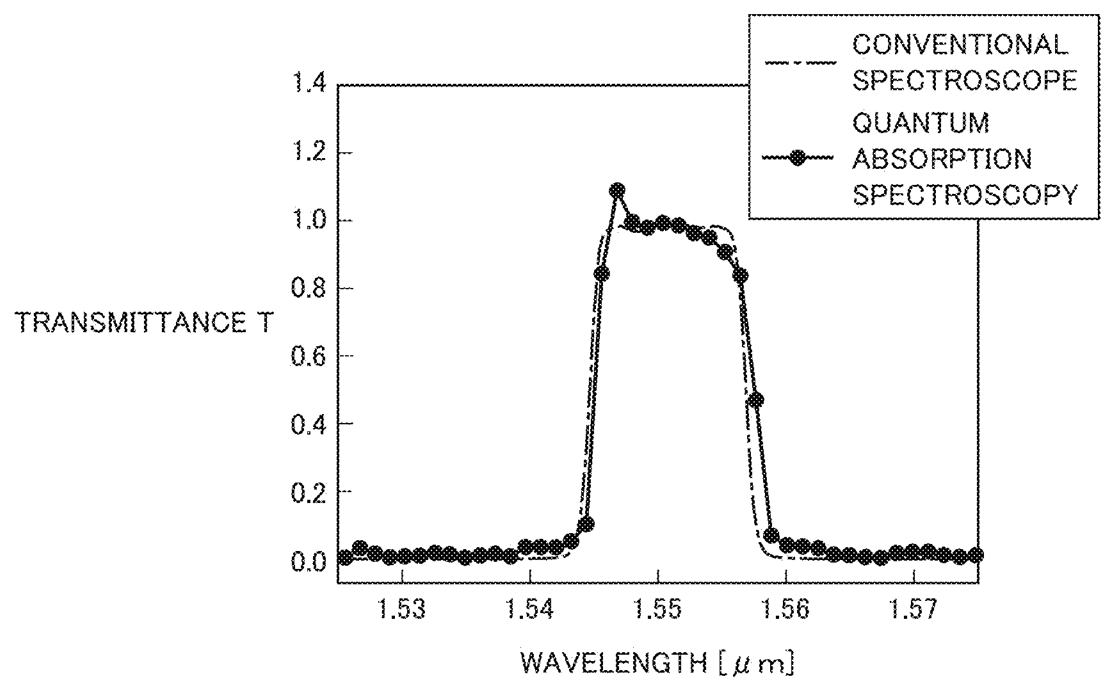
FIG. 29 is a diagram showing the results of obtaining the complex transmittance spectrum of a sample from the quantum interference signal shown in FIG. 28.

FIG. 29 is a diagram showing the results of obtaining a complex transmittance spectrum (spectrum of a transmittance T) of a sample from the quantum interference signal shown in FIG. 28. Specifically, the amplitude ratio of Fourier spectra A and $A_s^0$ with/without the sample was calculated (seethe above formula (12)). FIG. 29 also shows the measurement results of a transmittance spectrum using a commercially available conventional spectroscope (UV3600-Plus manufactured by Shimadzu Corporation) for comparison. In terms of intensity and bandwidth, it can be seen that the complex transmittance spectrum obtained from the quantum interference signal satisfactorily coincides with the complex transmittance spectrum obtained using the conventional spectroscope.

Seventh Example

In Seventh Example, the simulation results when a signal optical path is swept will be described. This simulation assumes the system configuration of quantum absorption spectroscopy system 400 according to the fourth embodiment (see FIG. 12), FIG. 30 is a diagram showing a quantum interference signal obtained by the simulation of sweeping an idler optical path or a signal optical path. A horizontal axis represents the sweep width $\Delta L_{idl}$ of the idler optical path (the change amount of an idler optical path length) or the sweep width $\Delta L_{sig}$ of the signal optical path (the change amount of a signal optical path length). A vertical axis represents a signal photon count rate $P_s$. The overall view of the quantum interference signal is shown on the left side, and the enlarged view of the quantum interference signal in the vicinity of a sweep width=0 is illustrated on the right side.

In this simulation, it was assumed that a quantum entangled photon pair of a signal photon having a wavelength of 810 nm (wave number of 12346 $cm^{-1}$) and an idler photon having a wavelength of 1550 nm (wave number of 6451 $cm^{-1}$) is generated by irradiation with pump light having a wavelength of 532 nm (wave number of 18797 $cm^{-1}$). The spectral width of the idler photon was set to $a/2\pi c$=40 $cm^{-1}$. Both the maximum value of the sweep width $\Delta L_{idl}$ of the idler optical path and the maximum value of the sweep width $\Delta L_{sig}$ of the signal optical path were set to 500 μm. The step width (interval between plots indicated by circles in the enlarged view) when each optical path was swept was set to 100 nm. In this case, 5000 points are plotted for each simulation.

As shown in the overall view on the left side, the width of the quantum interference signal when the idler optical path was swept was equal to the width of the quantum interference signal when the signal optical path was swept. As shown in the enlarged view on the right side, the quantum interference signal when the idler optical path was swept was sparse, whereas the quantum interference signal when the signal optical path was swept was dense. It can be read that the oscillation period (interval of interference fringes) of the quantum interference signal when the idler optical path is swept corresponds to the wave number of the idler photon, and the oscillation period of the quantum interference signal when the signal optical path is swept corresponds to the wave number of the signal photon.

Figure 31:
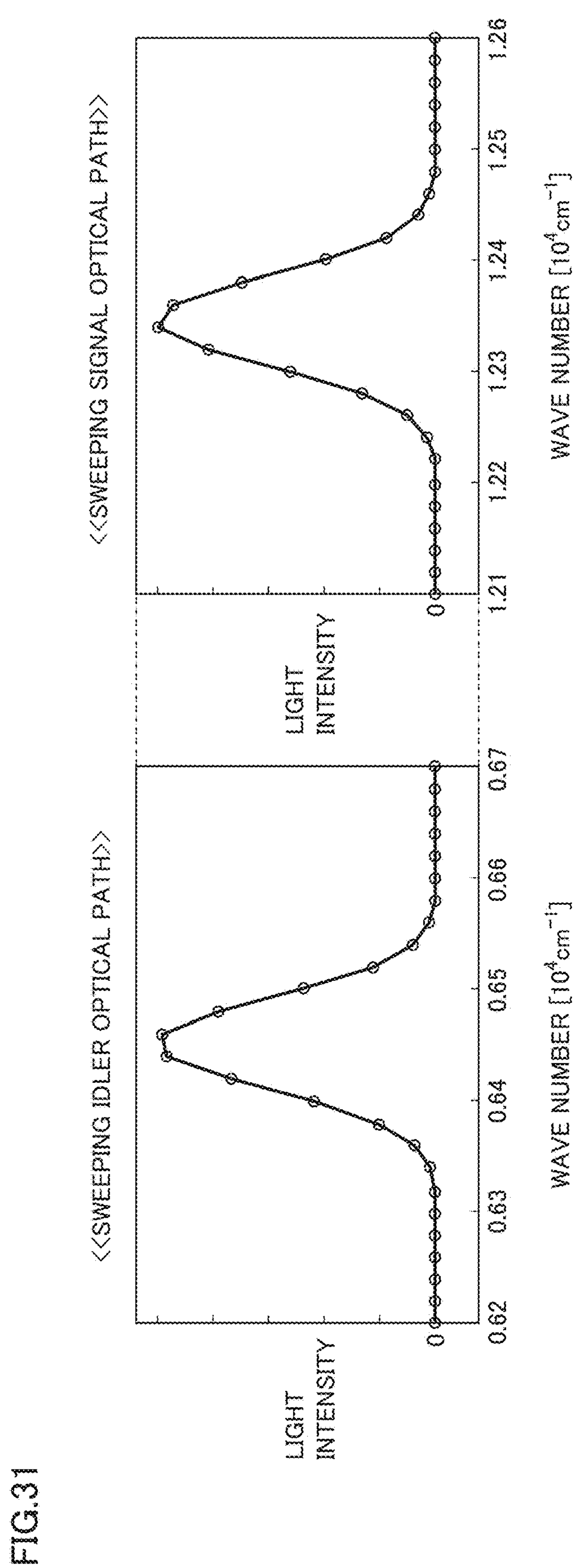
FIG. 31 is a diagram showing a Fourier spectrum obtained by performing Fourier transform on the quantum interference signal shown in FIG. 30.

FIG. 31 is a diagram showing a Fourier spectrum obtained by Fourier transform of the quantum interference signal shown in FIG. 30. As can be seen from FIG. 31, the Fourier spectrum having the same shape can be obtained in both the case of sweeping the idler optical path and the case of sweeping the signal optical path, and the wave number resolution (interval between plots) of the Fourier spectrum is equal. As described above, if the sweep widths (maximum values of $\Delta L_{idl}$ and $\Delta L_{sig}$) of the optical paths are set to a common value, the wave number resolution equal to that when the idler optical path is swept can be achieved even when the signal optical path is swept. When the sweep widths of both the optical paths were set to 500 μm, the wave number resolution of the Fourier spectrum was 20 $cm^{-1}$.

Furthermore, as read from FIG. 31, the center wave number of each Fourier spectrum has a value corresponding to the wave number of the photon propagating through the swept optical path. That is, the center wave number $k_{i0}$ of the Fourier spectrum when the idler optical path was swept corresponded to the wave number of the idler photon, and in this example, $k_{i0}$ was 6452 $cm^{-1}$. The center wave number $k_{s0}$ of the Fourier spectrum when the signal optical path was swept corresponded to the wave number of the signal photon, and in this example, $k_{s0}$ was 12346 $cm^{-1}$.

Figure 32:
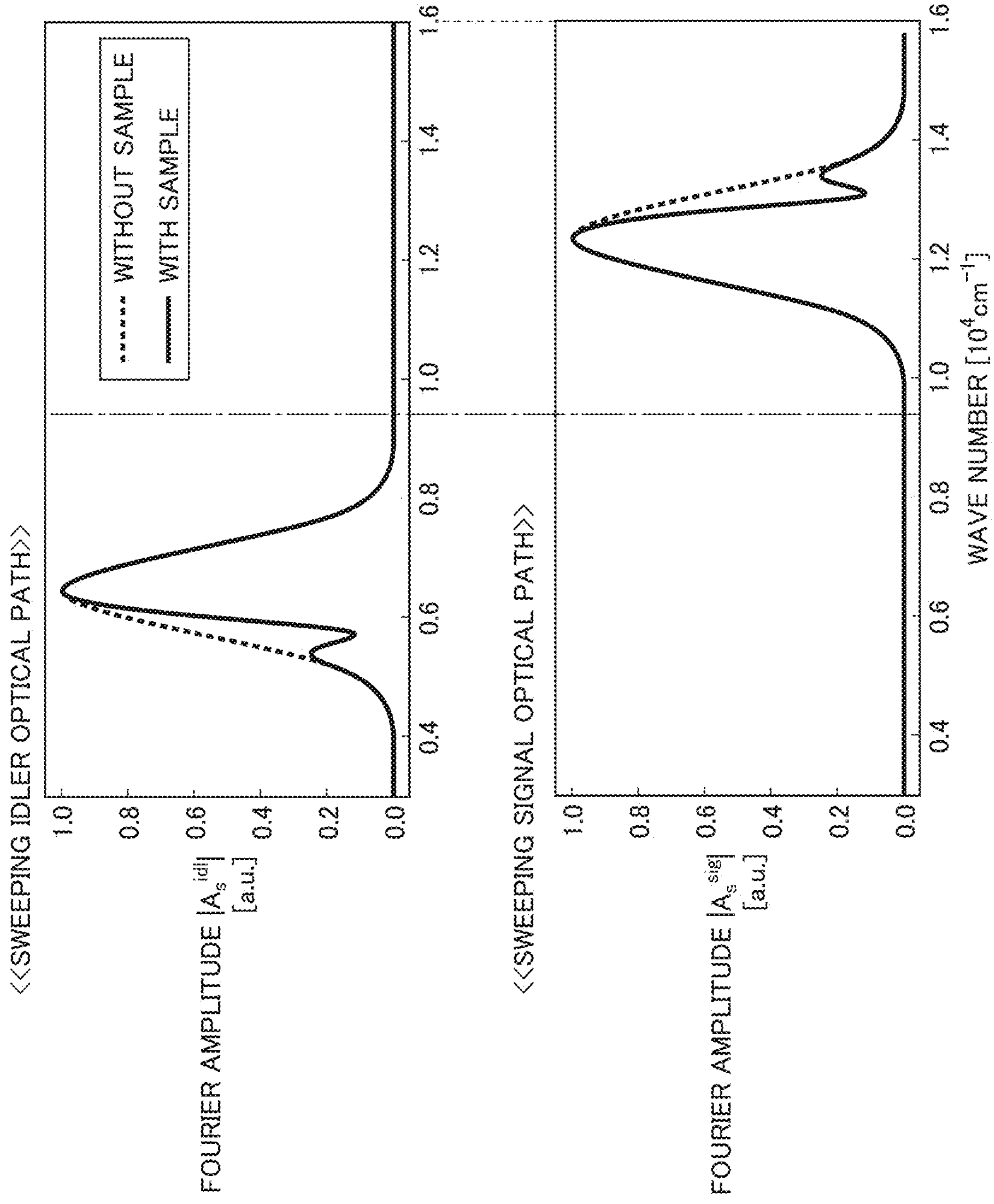
FIG. 32 is a diagram showing a Fourier spectrum obtained by the simulation of sweeping an idler optical path or a signal optical path in a state where a sample that is an infrared absorber is disposed on an idler optical path.

FIG. 32 is a diagram showing a Fourier spectrum obtained by the simulation of sweeping an idler optical path or a signal optical path in a state where a sample that is an infrared absorber is disposed on an idler optical path. A horizontal axis represents a wave number, and a vertical axis represents the amplitude ($|A_z^{idl}|$, $|A_s^{sig}|$) of the Fourier spectrum.

Also in this simulation, it was assumed that a quantum entangled photon pair of a signal photon having a wavelength of 810 nm (wave number of 12346 $cm^{-1}$) and an idler photon having a wavelength of 1550 nm (wave number of 6451 $cm^{-1}$) is generated by irradiation with pump light having a wavelength of 532 nm (wave number of 18797 $cm^{-1}$). The spectral width of the idler photon was set to $\sigma/2\pi$=1114 $cm^{-1}$. The absorption band of the sample was set to a wavelength of 1750 nm (wave number of 5714 $cm^{-1}$).

In both the Fourier spectrum $A_s^{idl}$ when the idler optical path was swept and the Fourier spectrum $A_s^{sig}$ when the signal optical path was swept, a dip indicating absorption by the sample was confirmed. As read from FIG. 32, the Fourier spectrum $A_s^{idl}$ and the Fourier spectrum $A_s^{sig}$ are line-symmetric (mirror-symmetric) with respect to a symmetry axis. The wave number of the symmetry axis (indicated by an alternate long and short dash line) was 9396 $cm^{-1}$ as a half value of the wave number of the pump light.

Eighth Example

In Eighth Example, a configuration for measuring an absorption spectroscopy characteristic in an ultraviolet range will be described. In this measurement, a system configuration basically equivalent to that of quantum absorption spectroscopy system 400 according to the fourth embodiment (see FIG. 12) was used. However, quantum absorption spectroscopy system 400 generates the quantum entangled photon pair of the signal light in the visible range and the idler light in the infrared range, whereas a quantum absorption spectroscopy system according to the present Example generates a quantum entangled photon pair of signal light in a visible range and idler light in an ultraviolet range.

In order to generate the idler light in the ultraviolet range, four-wave mixing can be used as described below. Alternatively, the type of nonlinear optical crystal 23 may be changed. For example, known crystals such as $CsB_3OP_5$ (CBO) and $CsLiB_6O_{10}$ (CLBO) can be used.

Figure 33:
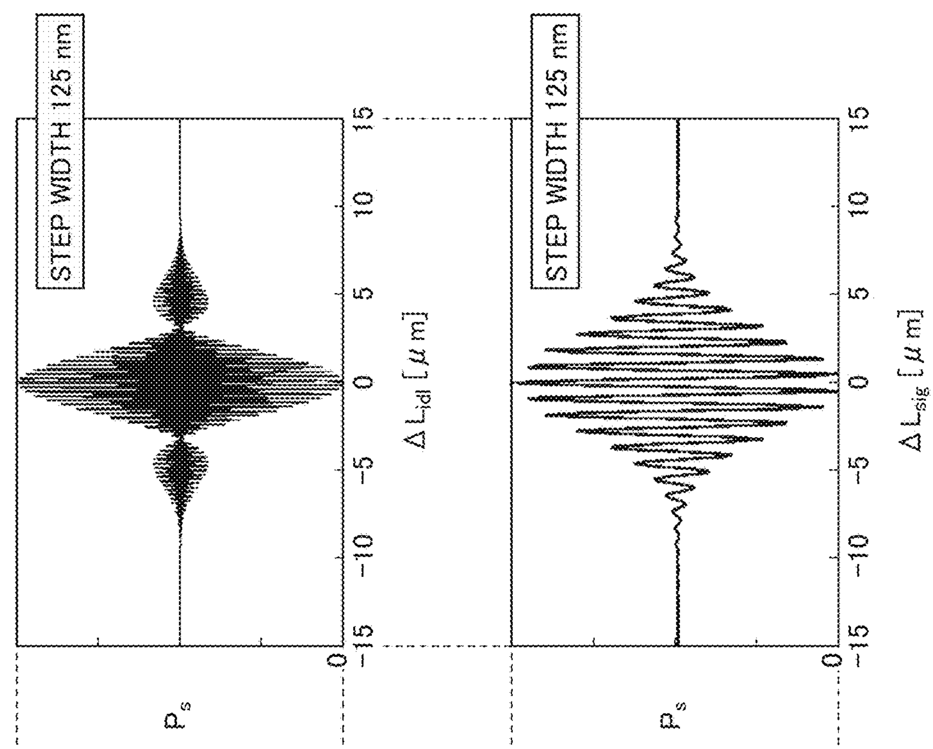
FIG. 33 is a diagram showing a quantum interference signal obtained by the simulation of sweeping an idler optical path or a signal optical path in a quantum absorption spectroscopy system for measuring an absorption spectroscopy characteristic in an ultraviolet range.

FIG. 33 is a diagram showing a quantum interference signal obtained by the simulation of sweeping an idler optical path or a signal optical path in a quantum absorption spectroscopy system for measuring an absorption spectroscopy characteristic in an ultraviolet range.

In this simulation, the use of the four-wave mixing was assumed. The four-wave mixing is a process in which two excitation photons are converted into a photon pair of a signal photon and an idler photon. Specifically, it was assumed that a quantum entangled photon pair of a signal photon having a wavelength of 927 nm (wave number of 10788 $cm^{-1}$) and an idler photon having a wavelength of 255 nm (wave number of 392157 $cm^{-1}$) is generated by irradiation with pump light having a wavelength of 400 nm (two pump photons for excitation). The spectral width of the idler photon was set to $\sigma/2\pi$=400 $cm^{-1}$. A sample was not installed.

Both the maximum value of the sweep width $\Delta L_{idl}$ of the idler optical path and the maximum value of the sweep width $\Delta L_{sig}$ of the signal optical path were set to 30 μm. Step widths for sweeping the optical paths were set to two ways of 10 nm and 125 nm. In the figure, the simulation results when the step width is 10 nm are shown on the left side, and the simulation results when the step width is 125 nm are shown on the right side.

When the idler optical path was swept, a normal quantum interference signal was obtained when the step width was 10 nm, whereas distortion was confirmed in the quantum interference signal when the step width was 125 nm. Meanwhile, when the signal optical path was swept, a normal quantum interference signal was obtained in both the case where the step width was 10 nm and the case where the step width was 125 nm. The reason for this is described as follows.

When the sampling theorem is applied to the present Example, and the idler optical path is swept, a step width Δ is required to be smaller than the half wavelength (λ/2) of the idler photon ($\Delta<\lambda_i/2$). When the signal optical path is swept, the step width Δ is required to be smaller than the half wavelength ($\lambda_s/2$) of the signal photon ($\Delta<\lambda_s/2$). More specifically, the wavelength of each of the idler photon and the signal photon is distributed in a wavelength range having a predetermined width including a center wavelength. It is required to set the step width Δ to a value smaller than ½ of the lower limit value of this wavelength range.

In the present Example, the idler photon is an ultraviolet photon. Therefore, as the wavelength (center wavelength of 255 nm) of the idler photon is short, it is difficult $t_0$ satisfy the sampling theorem as compared with the case where the idler photon is an infrared photon. In this example, when the step width Δ=10 nm is set, because 10 nm<<255 nm/2, the sampling theorem is satisfied. Meanwhile, when the step width Δ=125 nm is set, because 125 nm≈255/2, taking into account that the wavelength distribution of the idler photon is typically about several tens of nanometers, it is considered that the sampling theorem is not satisfied (undersampling).

Thus, when the idler photon is the ultraviolet photon, and the idler optical path is swept, it is required to set the step width Δ to a very small value in order to avoid undersampling. Therefore, when the idler photon is the ultraviolet photon, the signal optical path may be swept instead of the idler optical path. Since the signal photon is a visible photon, the sampling theorem is more easily satisfied as the wavelength (center wavelength of 927 nm) is longer. In this example, when the step width Δ=10 nm is set, the sampling theorem is naturally satisfied. Also, when the step width Δ=125 nm is set, because 125 nm<<927 nm/2, the sampling theorem is satisfied.

Figure 34:
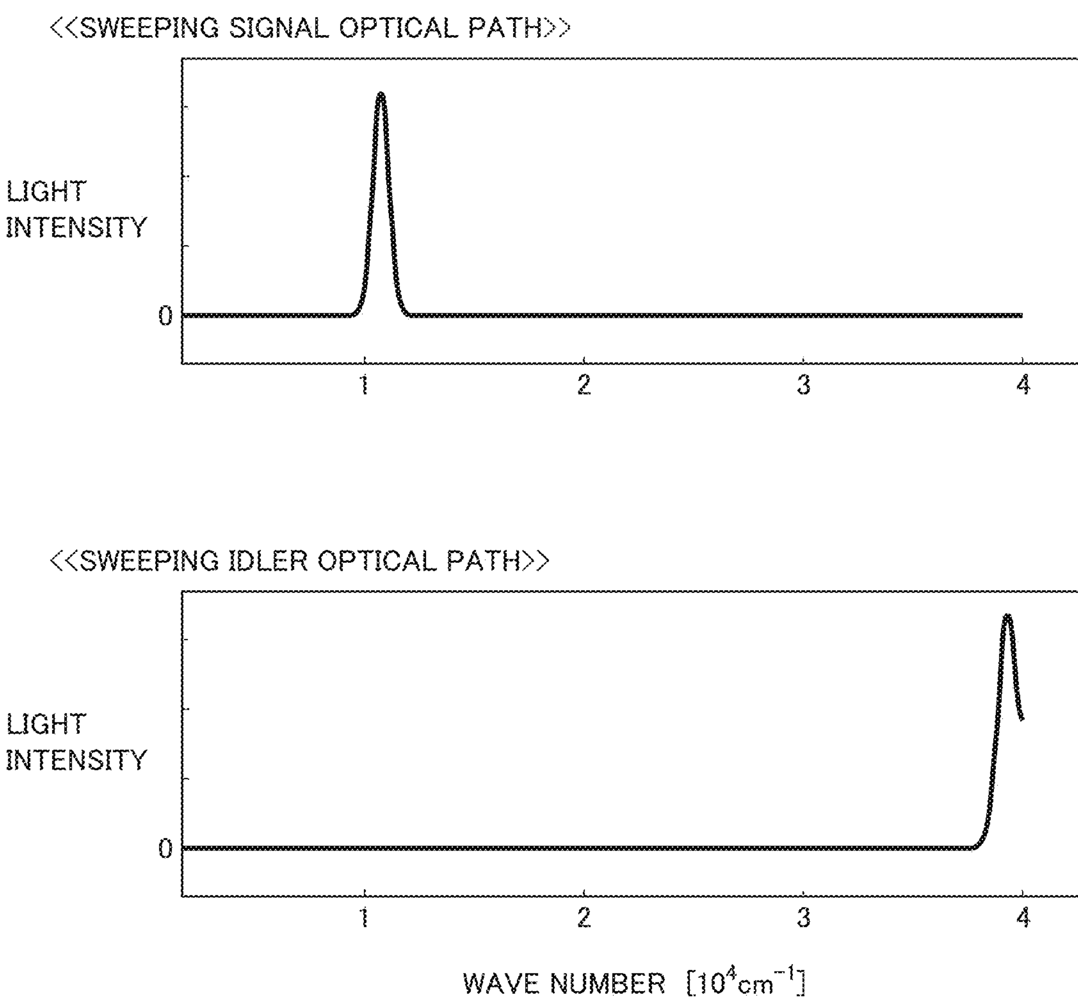
FIG. 34 is a diagram showing a Fourier spectrum obtained when a signal optical path is swept.

FIG. 34 is a diagram showing a Fourier spectrum obtained when a signal optical path is swept. The step width was set to 125 nm. It could be confirmed that a Fourier spectrum having a peak at an appropriate position can be acquired when the signal optical path is swept. Meanwhile, when the idler optical path was swept, apart of the peak of the Fourier spectrum reached the maximum wave number of 40,000 $cm^{-1}$ of the system, and only an incomplete Fourier spectrum could be acquired due to a limitation in the specification of the system. Thus, the optical path to be swept can also be selected according to the specification of the system.

It should be understood that the embodiments disclosed herein are illustrative and non-restrictive in all respects. The scope of the present disclosure is defined by the claims, rather than the embodiments above, and is intended to include any modifications within the meaning and scope equivalent to the claims.

REFERENCE SIGNS LIST

1: laser light source, 201 to 205: quantum optical system, 211 to 214: lens, 221 to 223: dichroic mirror, 23: nonlinear optical crystal, 231: first crystal, 232: second crystal, 24: sample holder, 25, 28: moving mirror, 250, 280: drive device, 271: faraday rotator, 272: 24 wave plate, 26, 29: fixed mirror, 31, 32: photodetector, 4: controller, 41: processor, 42: memory, 43: input/output port, 5: monitor, 401: light source control unit, 402: mirror control unit, 403: count rate calculation unit, 404: Fourier transform unit, 405: first storage unit, 406: second storage unit, 407: transmittance calculation unit, 408: absorption spectrum calculation unit, 409: monitor control unit, 6: dispersion optical element, 7: QPM device, 71, 74: lens, 72: nonlinear optical crystal, 73: long pass filter, 75: sharp cut filter, 8: ATR unit, 81, 83: lens, 82: prism, 100, 100A, 200, 300, 300A, 300B, 400, 400A: quantum absorption spectroscopy system.

What is claimed is:

1. A quantum absorption spectroscopy system comprising:

a light source;

a quantum optical system;

a photodetector; and a processor, wherein the light source emits pump light, the quantum optical system includes: a nonlinear optical element that generates a quantum entangled photon pair of a signal photon and an idler photon by irradiation with the pump light; and a phase converter that changes a phase of one photon of the signal photon and the idler photon, and causes quantum interference between a plurality of physical processes in which the quantum entangled photon pair is generated, the photodetector outputs a quantum interference signal corresponding to a number of detected signal photons when the phase of the one photon is changed by the phase converter in a state where a sample is disposed on an optical path of the idler photon, the processor calculates an absorption spectroscopy characteristic of the sample by performing Fourier transform on the quantum interference signal.

2. The quantum absorption spectroscopy system according to claim 1, wherein the processor calculates a Fourier spectrum by performing Fourier transform on the quantum interference signal in a state where the sample is disposed on the optical path of the idler photon, further calculates a reference Fourier spectrum by performing Fourier transform on the quantum interference signal in a state where the sample is not disposed on the optical path of the idler photon, and calculates a complex transmittance spectrum of the sample based on a ratio between the Fourier spectrum and the reference Fourier spectrum.

3. The quantum absorption spectroscopy system according to claim 2, wherein the processor calculates an absorption spectrum of the sample by squaring an absolute value of the complex transmittance spectrum of the sample.

4. The quantum absorption spectroscopy system according to claim 1, wherein the processor calculates the absorption spectroscopy characteristic of the sample by performing Fourier transform on the quantum interference signal, the quantum interference signal acquired without wavelength sweep of the quantum entangled photon pair and without the signal photon being wavelength-resolved in the quantum optical system.

5. The quantum absorption spectroscopy system according to claim 1, wherein the nonlinear optical element is a chirp-type or fan-type quasi-phase-matched element.

6. The quantum absorption spectroscopy system according to claim 1, wherein the nonlinear optical element is a quasi-phase-matched element including a nonlinear optical crystal, the quasi-phase-matched element is configured such that a wavelength of an idler photon group including the idler photon is distributed over a wide wavelength range determined according to a material and a poling period of the nonlinear optical crystal when the quantum entangled photon pair occurs a plurality of times.

7. The quantum absorption spectroscopy system according to claim 6, wherein the material of the nonlinear optical crystal contains lithium niobate, the poling period of the nonlinear optical crystal is defined such that the idler photon group includes a plurality of photons having wavelengths different from each other in a wavelength range of 0.4 μm to 5.2 μm.

8. The quantum absorption spectroscopy system according to claim 6, wherein the material of the nonlinear optical crystal contains gallium phosphide, the poling period of the nonlinear optical crystal is defined such that the idler photon group includes a plurality of photons having wavelengths different from each other in a wavelength range of 0.7 μm to 12 μm.

9. The quantum absorption spectroscopy system according to claim 6, wherein the material of the nonlinear optical crystal contains gallium arsenide, the poling period of the nonlinear optical crystal is defined such that the idler photon group includes a plurality of photons having wavelengths different from each other in a wavelength range of 1 μm to 18 μm.

10. The quantum absorption spectroscopy system according to claim 6, wherein the material of the nonlinear optical crystal contains lithium tantalate, the poling period of the nonlinear optical crystal is defined such that the idler photon group includes a plurality of photons having wavelengths different from each other in a wavelength range of 0.3 μm to 5.5 μm.

11. The quantum absorption spectroscopy system according to claim 6, wherein the material of the nonlinear optical crystal contains zinc selenide, the poling period of the nonlinear optical crystal is defined such that the idler photon group includes a plurality of photons having wavelengths different from each other in a wavelength range of 0.4 μm to 22 μm.

12. The quantum absorption spectroscopy system according to claim 1, wherein the photodetector is a single-pixel photodetector.

13. The quantum absorption spectroscopy system according to claim 1, wherein the signal photon is a visible-range photon, the photodetector is a silicon-based photodetector.

14. The quantum absorption spectroscopy system according to claim 1, wherein the quantum optical system further includes a total reflection measuring device that performs total reflection measurement of the sample.

15. The quantum absorption spectroscopy system according to claim 1, wherein the phase converter includes a first moving mirror that is movable along a propagation direction of the signal photon, and a second moving mirror that is movable along a propagation direction of the idler photon, the quantum absorption spectroscopy system further includes a controller, the controller selectively moves one mirror of the first and the second moving mirrors.

16. The quantum absorption spectroscopy system according to claim 1, wherein the phase converter includes a moving mirror that is movable along a propagation direction of the signal photon.

17. The quantum absorption spectroscopy system according to claim 1, wherein the nonlinear optical element generates the idler photon in an ultraviolet range, the processor calculates an ultraviolet absorption spectroscopy characteristic of the sample.

18. A quantum absorption spectroscopy method comprising:

generating a quantum entangled photon pair of a signal photon and an idler photon by irradiating a nonlinear optical element with pump light in a quantum optical system that causes quantum interference between a plurality of physical processes in which the quantum entangled photon pair is generated;

acquiring a quantum interference signal corresponding to a number of detected photons by detecting the signal photon with a photodetector when a phase of one photon of the signal photon and the idler photon is changed by a phase converter in a state where a sample is disposed on an optical path of the idler photon; and calculating an absorption spectroscopy characteristic of the sample by performing Fourier transform on the quantum interference signal.

* * * * *

UNITED STATES PATENT AND TRADEMARK OFFICE
CERTIFICATE OF CORRECTION

| | |
|---|---|
| PATENT NO. | : 12,055,439 B2 |
| APPLICATION NO. | : 17/757100 |
| DATED | : August 6, 2024 |
| INVENTOR(S) | : Shigeki Takeuchi |

It is certified that error appears in the above-identified patent and that said Letters Patent is hereby corrected as shown below:

In the Specification

Column 1, Line 50, delete ""0.54 m" and insert -- "0.54 µm --.

Column 36, Line 28, delete "272: 24" and insert -- 272: $\lambda$/4 --.

Signed and Sealed this
Fifth Day of November, 2024

Katherine Kelly Vidal
*Director of the United States Patent and Trademark Office*